US011284605B1

(12) United States Patent
Carter

(10) Patent No.: US 11,284,605 B1
(45) Date of Patent: Mar. 29, 2022

(54) BIRDFEEDERS WITH MULTIPLE FEEDING PORTS

(71) Applicant: Ideam LLC, Denver, CO (US)

(72) Inventor: James S. Carter, Denver, CO (US)

(73) Assignee: Ideam LLC, Denver, CO (US)

( * ) Notice: Subject to any disclaimer, the term of this patent is extended or adjusted under 35 U.S.C. 154(b) by 158 days.

(21) Appl. No.: 16/914,024

(22) Filed: Jun. 26, 2020

(51) Int. Cl.
*A01K 39/01* (2006.01)
*A01K 39/02* (2006.01)

(52) U.S. Cl.
CPC ...... *A01K 39/0113* (2013.01); *A01K 39/0206* (2013.01)

(58) Field of Classification Search
CPC .. A01K 39/012; A01K 31/12; A01K 39/0113; A01K 39/026
USPC ....................................... 119/57.8, 57.9, 52.4
See application file for complete search history.

(56) References Cited

U.S. PATENT DOCUMENTS

| | | | | |
|---|---|---|---|---|
| 4,352,339 A | * | 10/1982 | Lewis | A01K 1/0356 119/475 |
| 4,541,352 A | | 9/1985 | Dehls | |
| 4,974,547 A | * | 12/1990 | Graham | A01K 39/0113 119/52.2 |
| 5,076,213 A | * | 12/1991 | Taylor | A01K 31/12 119/428 |
| 6,213,054 B1 | * | 4/2001 | Marshall | A01K 39/012 119/57.8 |
| 10,681,901 B2 | | 6/2020 | Chi | |
| 2005/0263085 A1 | | 12/2005 | Rich | |
| 2007/0006811 A1 | * | 1/2007 | Tippetts | A01K 39/012 119/52.2 |

FOREIGN PATENT DOCUMENTS

| | | |
|---|---|---|
| JP | 2005-006543 A | 1/2005 |
| KR | 1020110095575 A | 8/2011 |

OTHER PUBLICATIONS

International Search Report and Written Opinion issued in co-pending International Patent Application No. PCT/US2021/039066, Korea Intellectual Property Office, dated Oct. 18, 2021, 12 pages.

* cited by examiner

*Primary Examiner* — Yvonne R Abbott-Lewis
(74) *Attorney, Agent, or Firm* — Davis Graham & Stubbs LLP

(57) ABSTRACT

Various birdfeeder designs are provided for flowable bird feed such as seeds or nectar. In one design, the birdfeeder (100) has a housing including first and second receptacles (102 and 104). The receptacles (102 and 104) are intertwined to form a double helical configuration. A large number of feed ports (106) can be distributed across the receptacles (102 and 104) to attract a large number of birds in a small area. Partitions (116) within the receptacles (102 and 104) define a number of feed chambers (118) to supply feed at the feed ports (106).

19 Claims, 49 Drawing Sheets

BIRDFEEDERS WITH MULTIPLE FEEDING PORTS

FIELD OF THE INVENTION

The present invention relates generally to birdfeeders including nectar feeders, e.g., for hummingbirds, and seed birdfeeders for other birds. In particular, the present invention relates to birdfeeders that attract a large number of birds in a small spatial footprint, are visually attractive to birdwatchers or other users, are convenient to use, and discourage squirrels and other nuisance animals from attempting to access the feed.

BACKGROUND OF THE INVENTION

Birdfeeders are used to improve the health of bird populations and to attract birds for the enjoyment of people. Such birdfeeders include nectar birdfeeders that are filled with sugar water or nectar to attract nectar feeders such as hummingbirds, and seed birdfeeders that attract a wide variety of birds. Seed birdfeeders can be filled with a variety of seed types or combinations thereof to attract different species.

Nectar birdfeeders are generally filled by pouring the nectar into a nectar receptacle via an opening or fill port, with feed ports, dimensioned to allow penetration by a hummingbird beak or tongue, provided at or above the surface level of the nectar. Similarly, seed birdfeeders are filled by pouring seed into a seed receptacle via a fill port or opening at the top of the receptacle. The seed may then be accessed via a tray at the bottom of the birdfeeder or ports distributed around the receptacle. The ports may be at the same height on the receptacle or different heights. In the case of seed birdfeeders, the fill opening may be accessed by removing a cover at the top of the birdfeeder. In addition, roosts may be provided adjacent the feed ports to encourage birds to perch. Such nectar and seeds, or seed mixes, are flowable bird feed such that the feed can be added at the fill port and then flow to the feed ports, e.g., under the influence of gravity.

Designers of birdfeeders struggle to meet a number of desired objectives. First, birdfeeders should ideally attract a large number of birds in a relatively small area. Purchasers of birdfeeders often have a limited space for the birdfeeders, e.g., suspended near a chosen window or other convenient vantage point. Ideally, a large number of birds should be attracted to the birdfeeder at that location and be able to simultaneously use the birdfeeder. In addition, such birdfeeders should ideally be attractive or visually interesting. As noted above, the birdfeeders are generally positioned at prominent vantage points. Accordingly, the birdfeeders themselves should be appealing, even when not occupied by birds.

It is also important that the birdfeeders be easy to use. In many cases, birdfeeders are positioned for optimal viewing and not necessarily for ease of access for filling, refilling, or servicing. They may be hung from tree branches or outside of high windows such that a stool or ladder is needed to access the birdfeeders. It is therefore desirable that filling, refilling, and other servicing be convenient. It can be difficult to reconcile the dual objectives of providing many feeding ports with enabling ease of filling and refilling. Finally, the scourge of many birdfeeder owners is squirrels or other undesired animals who are attracted to birdfeeders. They can spill seed, make a mess, and damage birdfeeders. Yet they are ingenious in accessing birdfeeders despite efforts to discourage them. Again, design efforts to guard against squirrels are often confounded by the competing objective of providing multiple feed ports to attract birds.

SUMMARY OF THE INVENTION

The present invention relates to birdfeeders for flowable bird feed such as seeds or nectar. The invention encompasses a variety of designs for attracting a large number of birds in a small spatial footprint. In addition, the invention provides a convenient way to fill the birdfeeders, including birdfeeders that have many feed ports. These designs are attractive and interesting to users. Moreover, the invention provides functionality in several iterations for discouraging squirrels or other nuisance animals from accessing the feed, thereby avoiding spillage, waste, and damage to the birdfeeders.

In accordance with one aspect of the present invention, a birdfeeder with multiple feed chambers is provided. The birdfeeder includes a housing with at least one receptacle for receiving a flowable bird feed such as seeds or nectar. The receptacle defines a feed flow path from a top portion to a bottom portion of the receptacle. For example, the feed flow path may be helical, spiral, stair steps or other possible configurations. A number of partitions are disposed in the feed flow path to define a number of feed chambers. Each of the partitions extends across a lower portion of the feed flow path and defines an opening so as to determine a feed level of the feed chamber. For example, the partition may extend only across a lower portion of the feed flow path or it may extend across the feed flow path with an opening formed in the partition above the lower portion of the feed flow path.

The birdfeeder further includes a number of feed ports, each associated with a different one of the feed chambers. The feed ports are positioned to provide access to the flowable bird feed relative to the feed level of a respective one of the chambers. In this regard, for nectar birdfeeders, the feed port may be positioned above the feed level such that a hummingbird can access nectar in the chamber via the feed ports. In the case of seed birdfeeders, the feed ports may be positioned at or below the feed level. A fill port is provided adjacent a top end of the receptacle for adding flowable bird feed such that the flowable bird feed is supplied to each of the feed chambers by cascading flow of the flowable bird feed along the flow path across the partitions. In accordance with associated functionality of the present invention, flowable bird feed can be added via the fill port such that a first chamber fills to the opening in the partition, then the flowable bird feed cascades via gravity to a succeeding feed chamber, and so on.

As noted above, a variety of configurations are possible for the feed flow path. In this regard, the housing may be provided in the form of a helix, a staircase, a pyramid, or other designs. In one such design, first and second receptacles are provided in the form of a double helix reminiscent of a DNA strand. Other possible designs include a cloverleaf and a lozenge.

The birdfeeder may further include a cover, extending across the fill port, to protect the receptacle against the elements. As noted above, birdfeeders are sometimes positioned in locations selected for their vantage point rather than for convenience of refilling. Conventional birdfeeders often include a cover that can be difficult to remove for refilling. Accordingly, the inventive birdfeeder may include a cover that is hingedly connected to the housing so that it can be moved to an open position for adding flowable bird feed and a closed position to protect receptacle against the elements. This may involve a living hinge or another hinge element. An associated functionality in accordance with the present invention involves pivoting the cover to the open position, pouring the flowable bird feed into the receptacle via the fill port to supply the flowable bird feed to the feed ports, and pivoting the cover to the closed position. Optionally, in implementations that include multiple receptacles for flowable bird feed, a central repository may be provided for feeding the flowable bird feed to first and second receptacles so as to facilitate refilling. Associated functionality involves pouring the flowable bird feed into the central repository such that the flowable bird feed is provided to each of the receptacles and continuing to add the flowable bird feed to the central repository until each of the receptacles is filled to a desired level. The central repository feeds at least two receptacles. More than two receptacles may be employed. For example, three or more receptacles may yield a design that is intrinsically stable when placed on a surface for filling.

In certain implementations, such as a single helix birdfeeder, where the birdfeeder may be unstable when placed on the ground or another surface, a support element may be provided to facilitate refilling when the birdfeeder is removed from its display position. In many cases, birdfeeders are removed from their display location for refilling or servicing. For example, if the birdfeeder is refilled from a heavy feed container, it may be convenient to place the birdfeeder on the ground while refilling. In such cases, it is convenient if the birdfeeder can stand on its own while being refilled or at least can be leaned against a wall. In this regard, the inventive birdfeeder may include support elements that can be deployed to stabilize the birdfeeder while being refilled and can be stowed when the birdfeeder is displayed. In some implementations, separate support elements may be provided that can be removably attached to the birdfeeder while it is being refilled. In another implementation, a movable support element may be connected to a housing of the birdfeeder. The movable support element is movable between a first position to support the birdfeeder during refilling and a second position where the support element is stowed so as to reduce or substantially eliminate any visual impact of the support element in the display configuration. The movable support element can thereby function like a kickstand to provide support when necessary.

In accordance with another aspect of the present invention, a nectar birdfeeder is provided with feed ports at different heights. Conventional nectar birdfeeders sometimes include multiple ports distributed at a single height around the bottom of the birdfeeder. In other cases, conventional nectar birdfeeders have included feed ports at different heights that are fed by different feed receptacles. The inventive nectar birdfeeder includes multiple feed ports at different heights fed by a single feed receptacle. In this manner, a large number of feed ports can be provided by taking advantage of the height dimension while still affording the convenience of a single fill port. Specifically, the inventive birdfeeder includes a housing having a first receptacle for receiving a liquid nectar bird feed where the receptacle defines a feed flow path from a top portion of the receptacle to a bottom portion thereof. A number of feed ports are disposed along the feed flow path at different elevations relative to an axis extending between the top portion and the bottom portion of the receptacle. The birdfeeder further includes a fill port adjacent to the top portion of the receptacle for adding the liquid nectar bird feed so that it is supplied to each of the feed ports. For example, the multiple feed ports may be fed liquid nectar bird feed by employing partitions disposed along the feed flow path to define a number of chambers to supply a reservoir of the liquid nectar bird feed at each of the feed ports.

According to a further aspect of the present invention, a birdfeeder is provided with multiple feed ports and a squirrel shield assembly. The birdfeeder generally includes a housing, a plurality of feed ports, and a squirrel shield assembly for shielding each of the feed ports from access by squirrels or other nuisance animals. For example, the squirrel shield assembly may include shield portions adjacent to each of the feed ports. The shield portions may be integrated into a single shield structure that extends over the birdfeeder. The shield assembly may be movable between an open configuration where the feed ports are exposed for access by birds and a closed configuration where the feed ports are blocked. The shield assembly can be movably supported in relation to the housing via a resilient element, e.g., a spring, such that the shield assembly moves to a closed configuration in response to weight placed on either the shield assembly or a roost associated with one of the feed ports. The shield assembly is preferably formed from a material, such as metal, that resists damage from nuisance animals. Alternatively, the shield assembly may be configured such that it does not include any edges that a squirrel can get its mouth around. In certain implementations, the housing and the squirrel shield are mounted on a central support, such as a pole, and the resilient element is disposed on the central support between a portion of the housing and a portion of the shield assembly.

In accordance with a still further aspect of the present invention, a birdfeeder is provided with multiple feed receptacles that overlap relative to a vertically extending axis. The birdfeeder includes a housing having first and second receptacles for receiving a flowable bird feed. The first and second receptacles defining respective first and second feed flow paths each extending from a top portion of the housing to a bottom portion. A first portion of the first receptacle and a second portion of the second receptacle are disposed in a vertically stacked relation such that the first portion and the second portion are aligned but spatially separated relative to an axis extending between the top portion and the bottom portion of the housing. The birdfeeder further includes one or more feed ports and at least one fill port for adding flowable bird feed so that the flowable bird feed is supplied to the feed ports. For example, each of the receptacles may have a helical, spiral or serpentine configuration. In one implementation, the first and second receptacles are formed using a helical partition within a cylindrical housing. An associated functionality in accordance with the present invention involves adding different bird seeds to the first and second receptacles to create an interesting appearance as well as attracting different bird species.

BRIEF DESCRIPTION OF THE DRAWINGS

For a more complete understanding of the present invention, and further advantages thereof, reference is now made to the following detailed description, taken in conjunction with the drawings, in which.

DETAILED DESCRIPTION

Figure 1A:
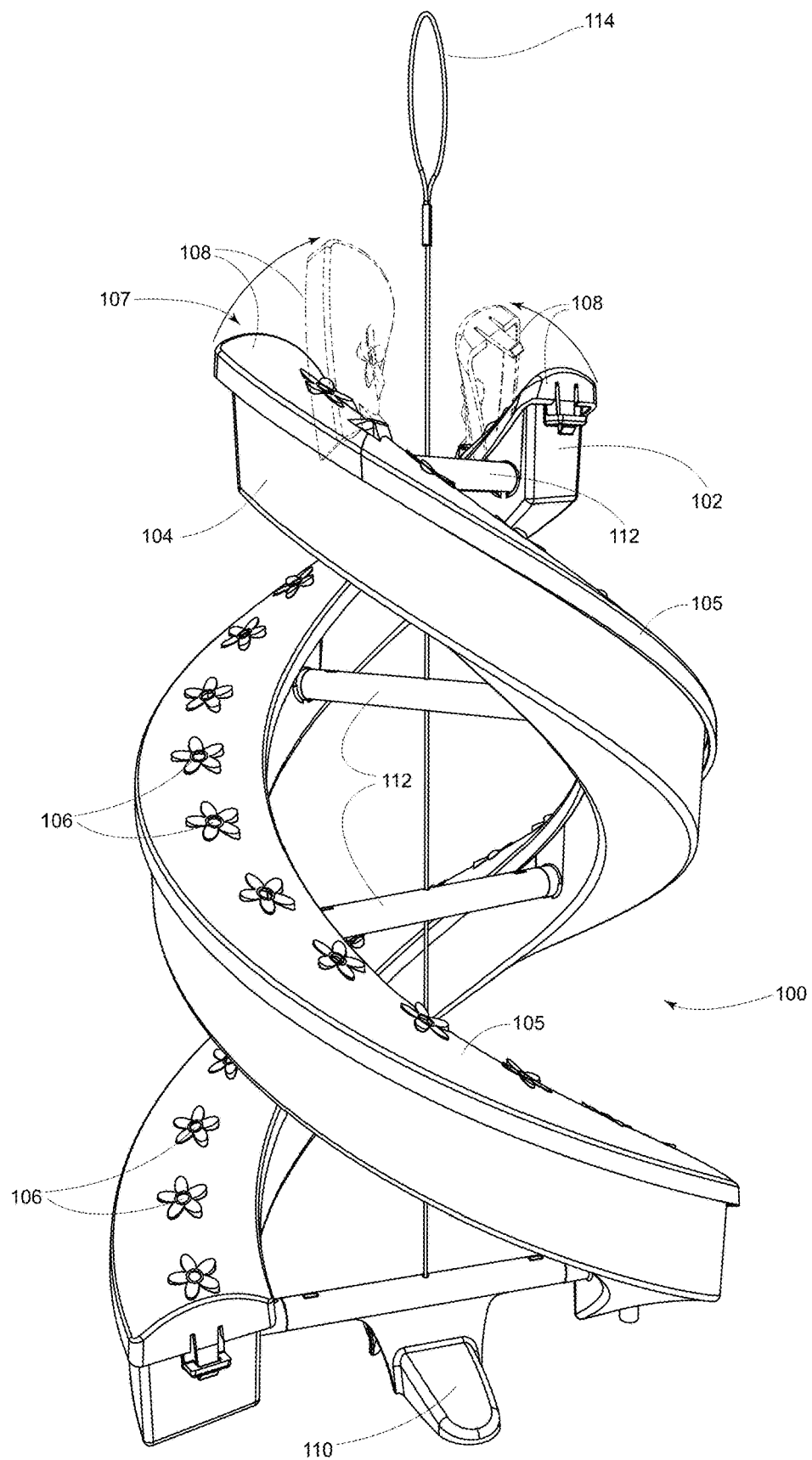
FIGS. 1A-1I show perspective, side elevational, and top views of a double helix nectar birdfeeder in accordance with one embodiment of the present invention as well as a sequence of diagrams illustrating a cascading fill process in accordance with the invention.
Figure 1B:
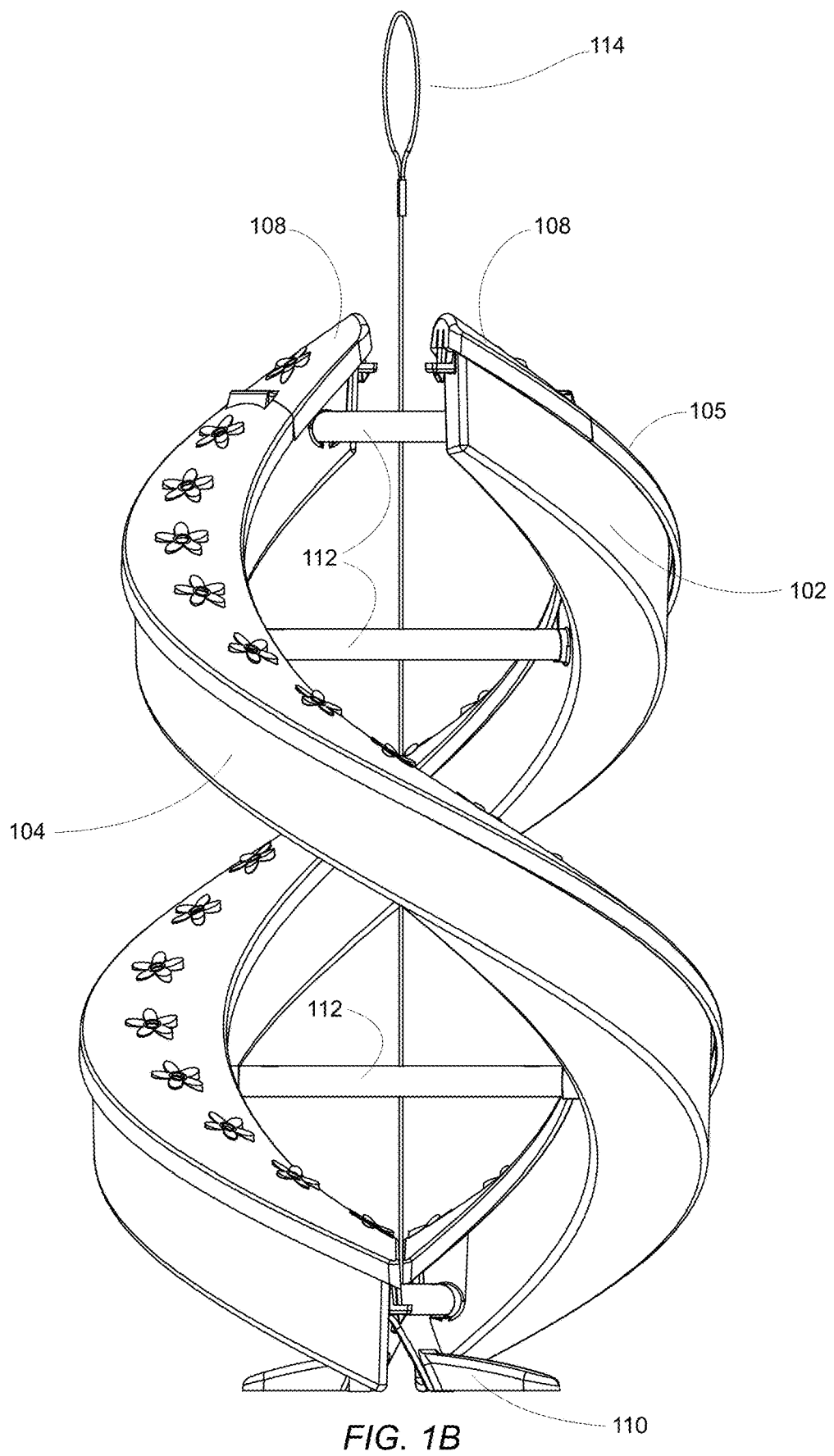
Figure 1C:
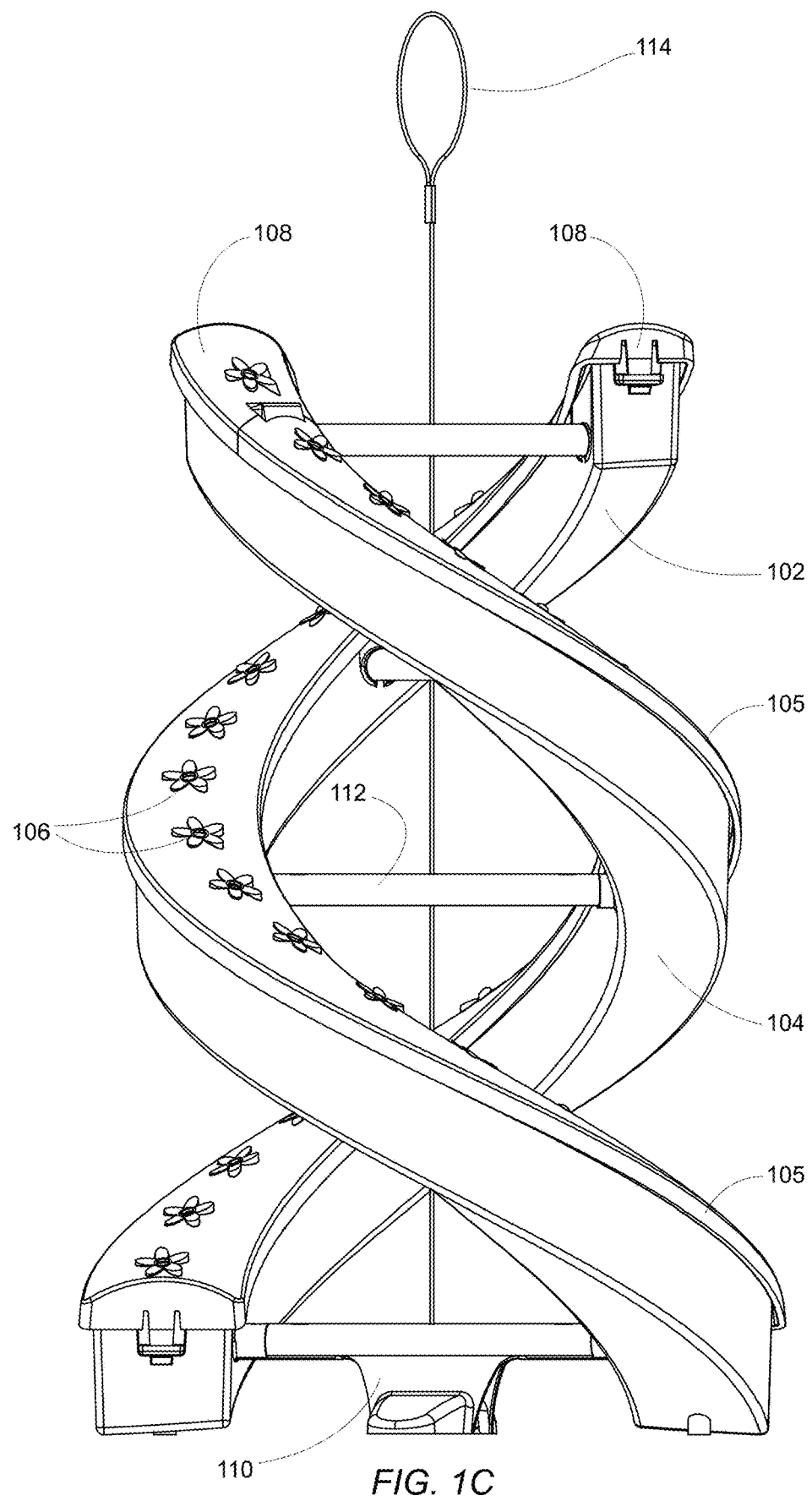
Figure 1D:
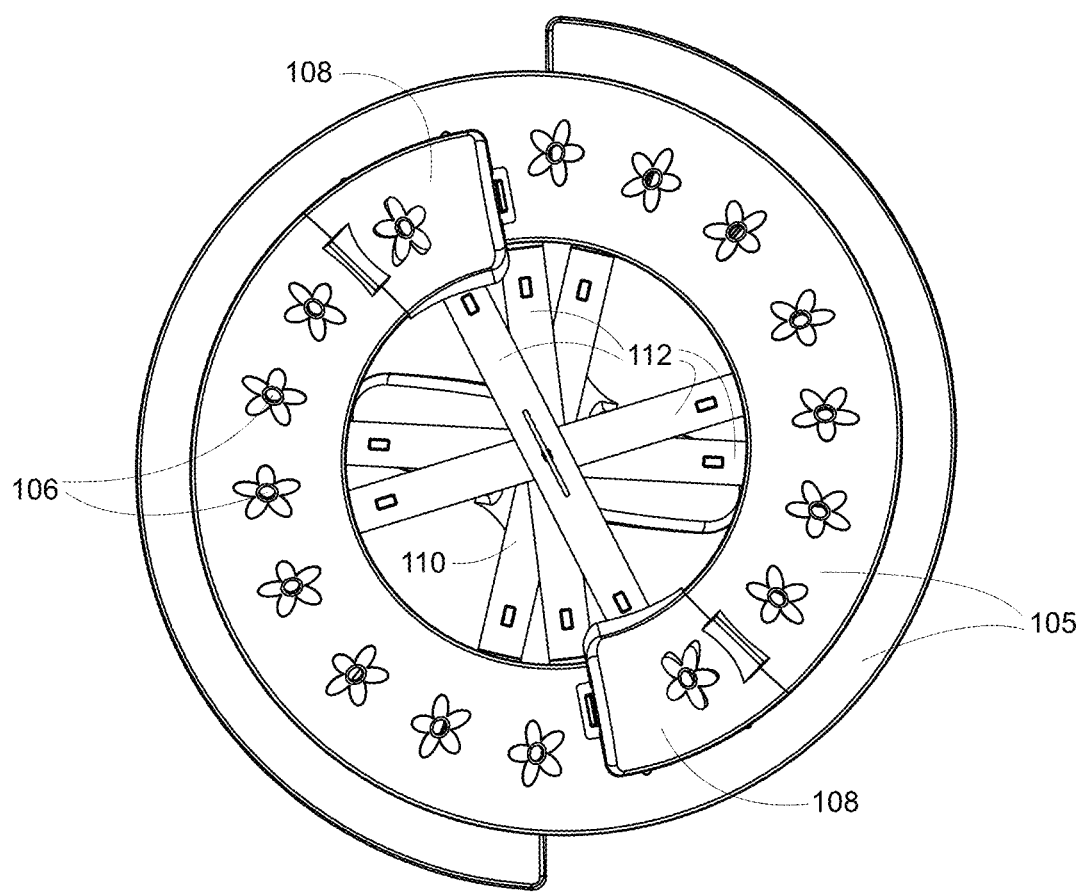

In the following description, various aspects of the invention are set forth in the context of specific birdfeeder designs for both seed and nectar birdfeeders. These designs are presented as examples of implementations of the present invention. It will be appreciated that many other examples are possible. In addition, though particular aspects or features of the invention are shown in the context of specific designs and have particular advantages in connection with those designs, in many cases, such aspects or features are more broadly applicable. Accordingly, the following description should be understood as exemplary, and not by way of limitation.

FIGS. 1A-1D show a double helix nectar birdfeeder 100 in accordance with the present invention. The birdfeeder 100 generally includes a housing including first and second receptacles 102 and 104. Each of the receptacles 102 or 104 is generally formed in a helical configuration. The receptacles 102 and 104 are intertwined to form a double helical configuration reminiscent of a DNA strand. The illustrated birdfeeder 100 also includes cross members 112 for spacing and rigidity as well as adding to the overall DNA-inspired shape. Also shown is a base 110 that allows the birdfeeder 100 to stand in a stable upright position, e.g., when feed is being added to the birdfeeder 100. The base 110 also provides a surface where weight may be added to stabilize the birdfeeder 100.

The illustrated birdfeeder 100 includes a number of feed ports 106 on the top cover 105 of the receptacles 102 and 104. The feed ports 106 include an opening dimensioned to allow a hummingbird to insert a portion of its beak or tongue to access feed in an interior of the receptacle 102 or 104. The feed ports 106 may be colored to attract hummingbirds and may be formed with a flower design for enhanced appearance and for attracting hummingbirds. As shown, the top cover 105 of each of the receptacles 102 and 104 may be colored to attract hummingbirds and/or to draw attention to the feed ports 106.

Nectar 101 can be added to the birdfeeder 100 at a top end of each of the receptacles 102 or 104. In this regard, each of the top covers 105 may include a fill port at the top end thereof. A cover 108 may be used to enclose the fill port when nectar is not being added so as to protect against the elements and pests. The illustrated covers 108 are pivotally connected to the top cover 105 of the receptacles 102 and 104. In this manner, the covers 108 can be pivoted to an open position to add nectar 101 to the receptacles 102 and 104 and then can be pivoted to a closed position when the birdfeeder 100 is displayed. For example, the covers 108 may be connected to the top covers 105 of the receptacles 102 and 104 by a living hinge or by a separate hinge. In the illustrated embodiment, the covers 108 are integrally formed with the top surfaces 105 and include a living hinge, defined by a line of narrowed material, to allow the covers 108 to move between the open and closed positions. If desired, an appropriate mechanism may be provided to secure the cover 108 in each of the open and closed positions. For example, each of the receptacles 102 and 104 may be formed so that the cover snaps into each of the open and closed positions. Alternatively, a separate mechanism such as hooks, Velcro, or other structure may be provided to secure the cover 108 in the open and closed positions.

Figure 1E:
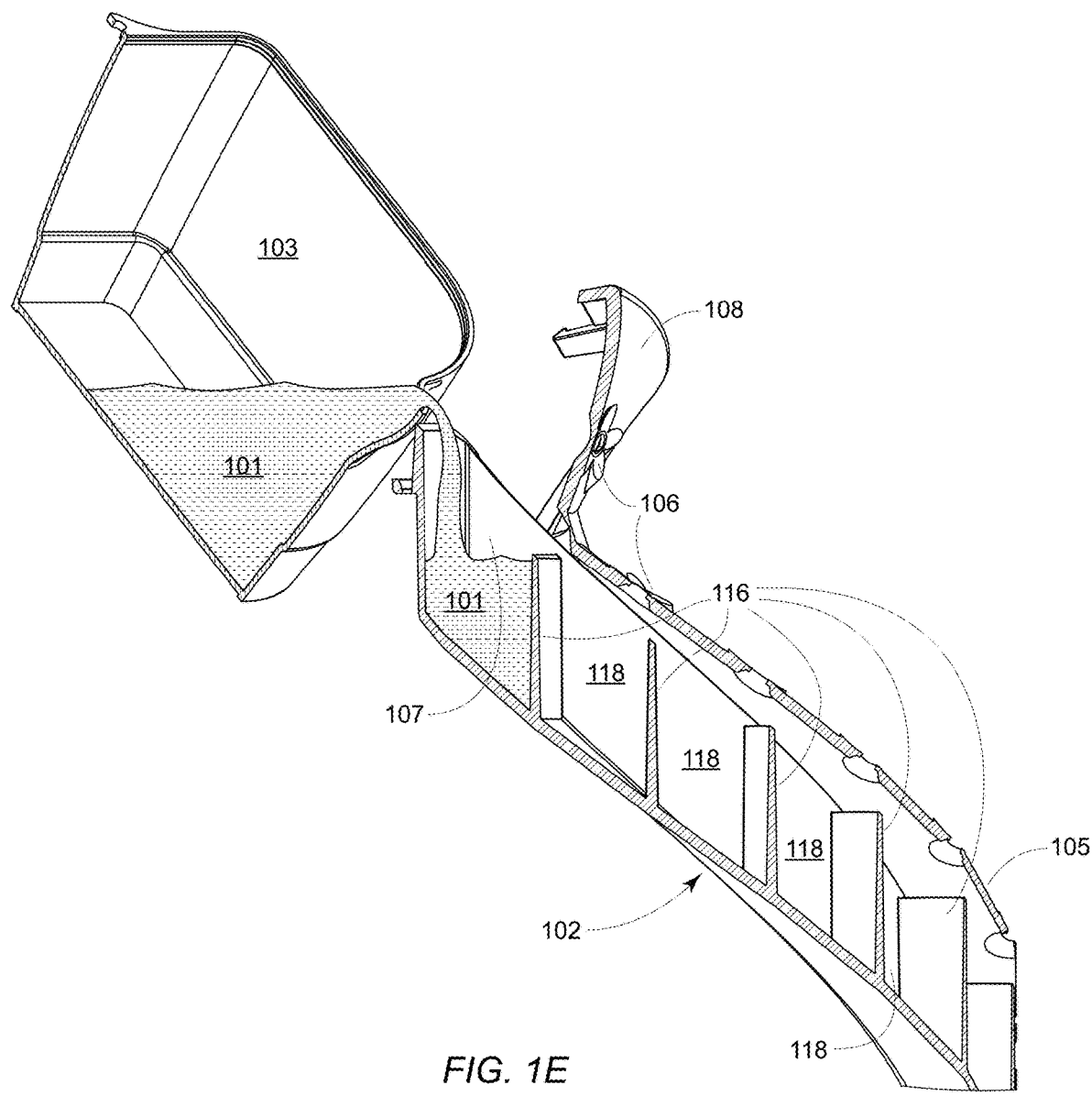
Figure 1F:
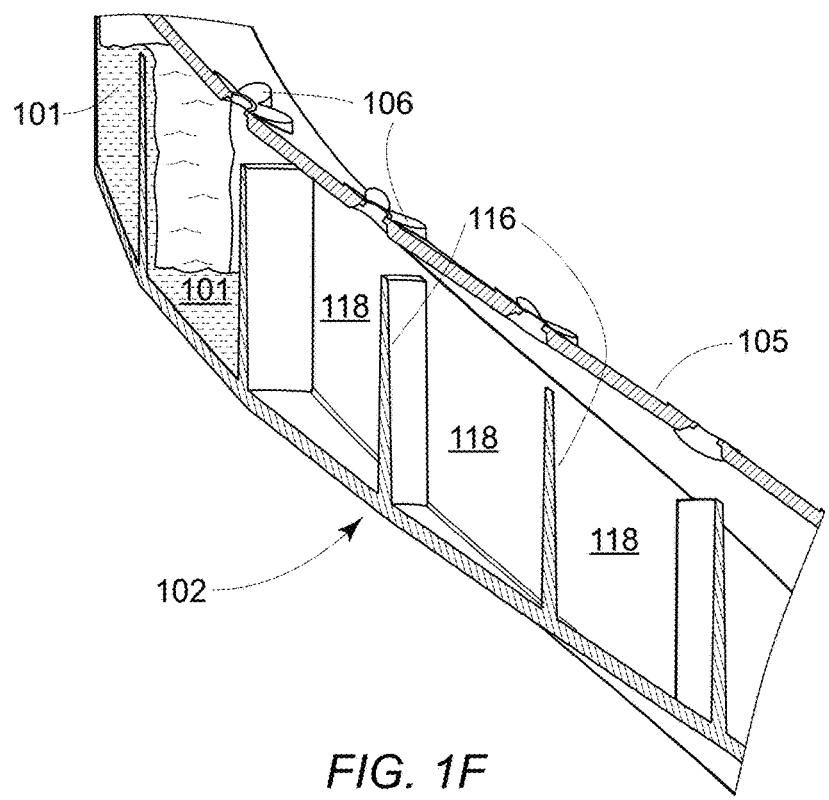
Figure 1G:
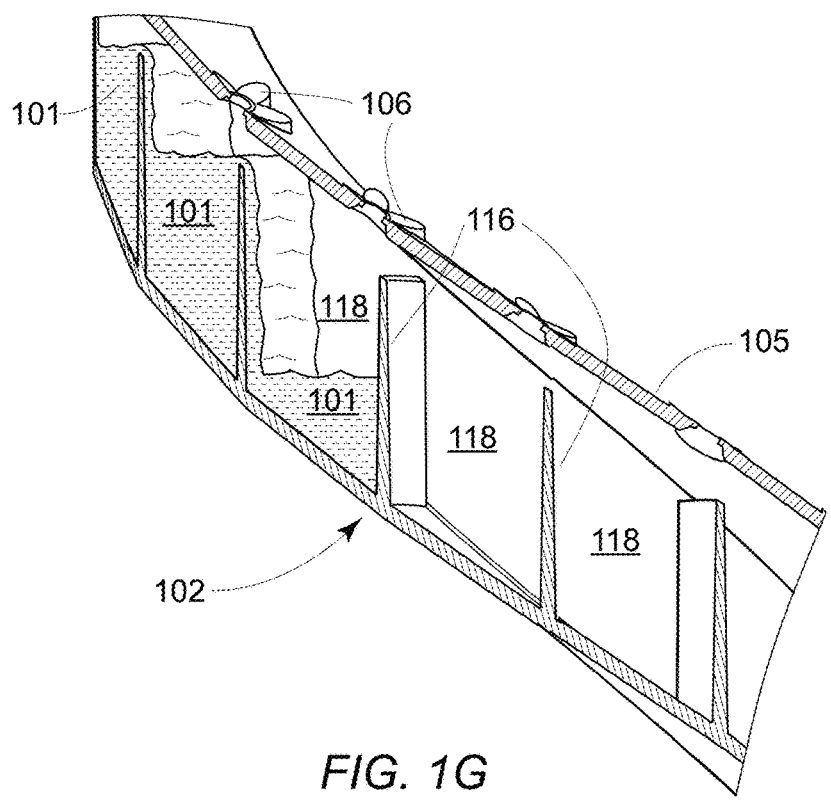
Figure 1H:
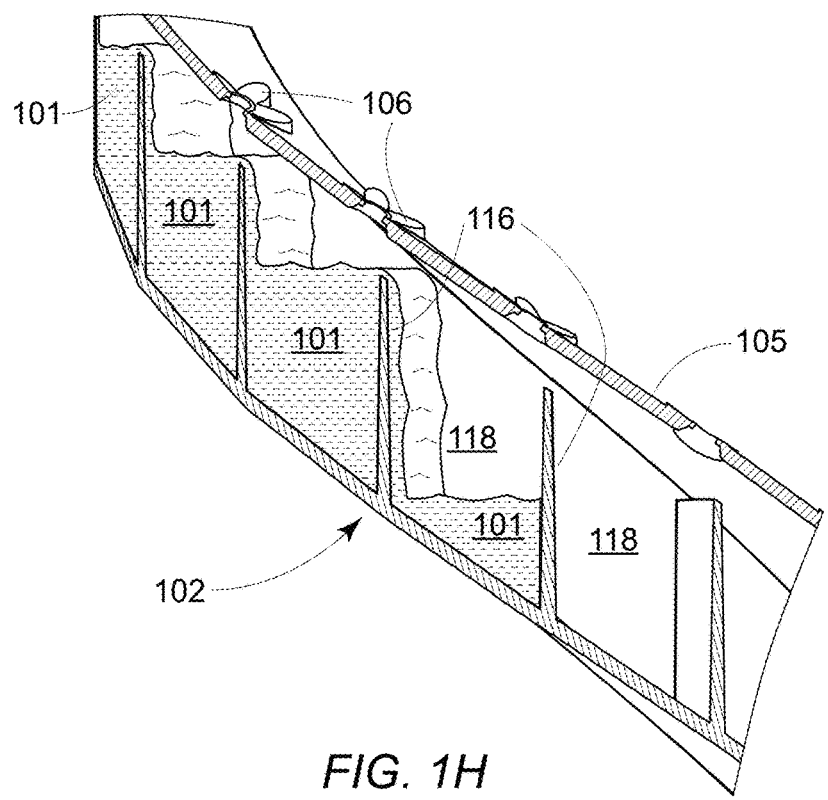
Figure 1I:
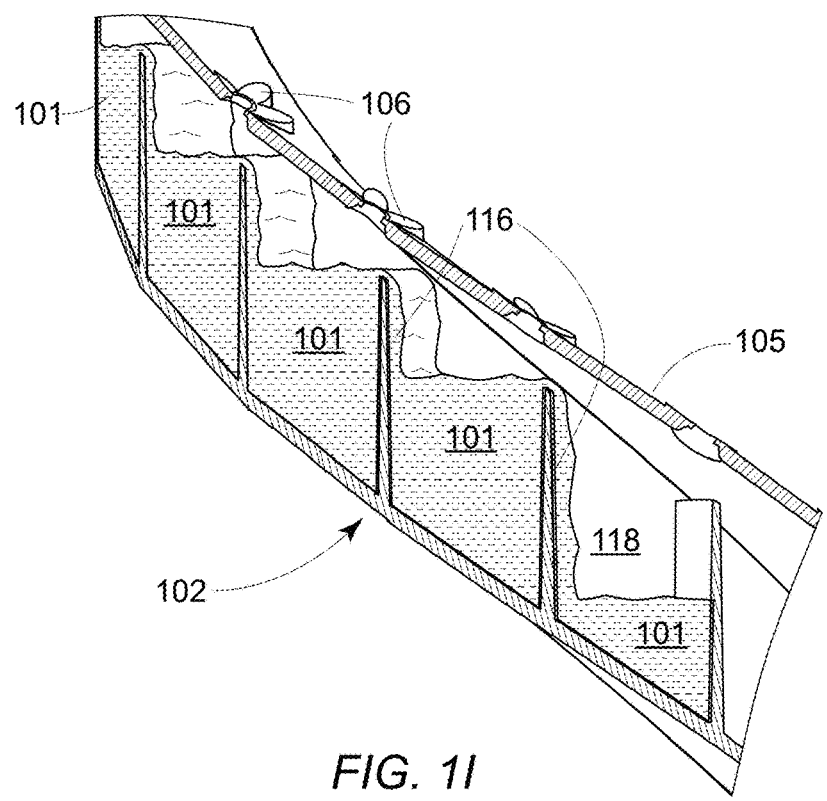

Referring to FIG. 1E, each of the receptacles 102 or 104 includes a number of partitions 116 disposed along a length thereof to define corresponding feed chambers 118 in the receptacles 102 and 104. It will be appreciated that, in the absence of partitions, the nectar would flow under the influence of gravity from the fill port 107 to the bottom of the receptacles 102 and 104 where the nectar would then pool. Consequently, in the absence of partitions, nectar may not be available at each of the feed ports 106. The illustrated partitions 116 extend across the width of the receptacles 102 and 104 and further extend across at least a lower portion of the receptacles 102 and 104. Each of the receptacles 116 further includes an opening to allow nectar to flow from a feed chamber 118 on an upstream side of the receptacle to a successive chamber 118 on a downstream side of the partition. Such an opening may be provided by way of a window formed in a partition, by dimensioning the partition so that it does not extend across the full height of the receptacle 102 or 104 at the location of the partition, or by providing a notch along a top edge of the partition or in a top corner of the partition to allow nectar to flow across the partition.

It will be appreciated that the height of or opening in the partition will define a feed level for the feed chamber on the upstream side of the partition. More specifically, as nectar 101 is added via the fill port 107, the nectar 101 will flow from chamber to chamber in a cascading fashion to progressively fill each chamber of the receptacle 102 or 104. Thus, as shown in FIGS. 1F-1I (which schematically illustrate nectar filling successive feed chambers), the uppermost feed chamber 118 of the receptacle 102 or 104 will fill with nectar 101 poured from an appropriately shaped vessel until the level of nectar in the chamber reaches the top of the partition 116. Referring to FIGS. 1F-1I, as the nectar 101 continues to be poured from vessel 103, it will then flow over the partition and into the next chamber downstream from the uppermost chamber. Again, the next chamber 118 will fill with nectar until the level of nectar in the chamber reaches the top of the next partition 116 and so on.

This cascading fill process serves a number of functions. First, as noted above, the configuration of the partitions and the openings in the partitions defines a feed level for each chamber. As shown, each chamber may also be associated with at least one feed port 106. By appropriate positioning of the feed ports 106 in relation to the feed level of each chamber, nectar can be made available at each feed port 106 on each level of the birdfeeder 100. In this manner, the birdfeeder 100 can attract a large number of birds by providing a large number of feed ports 106 while using all three dimensions to provide sufficient spacing between adjacent feed ports. While it depends somewhat on species and conditions, there is generally some amount of separation needed between feed ports for birds to feel comfortable feeding on each port and to do so without conflict. In the illustrated birdfeeder 100, the feed ports 106 may be separated by a distance of about 1-4 inches, for example, about 2 to 3 inches relative to a measurement between ports along the top surface 105. As shown, particularly when both receptacles 102 and 104 are taken into consideration, the illustrated birdfeeder 100 supports a large number of feed ports 106, e.g., 30-40 feed ports in the illustrated embodiment, in a relatively small spatial footprint, e.g., a width and depth of no more than about 1 foot and a height of no more than about 2 feet. However, any dimensions may be utilized in accordance with the present invention.

The chambers 118 and associated feed ports 106 also make nectar available at multiple feed ports 106 at multiple heights in relation to the birdfeeder vertical axis. As noted above, each chamber will have a feed level defined by the height of the downstream partition 116 of that feed chamber when the chamber is full. As is known, hummingbirds can reach a significant distance with their beaks through a feed port and then can reach a significant additional distance by extending their tongues. Thus, hummingbirds will be able to continue to access nectar in each chamber even as the feed level within the chamber recedes. In the illustrated embodiment, each chamber may have a height of about 2 to 3 inches measured at each partition along the major axis of the partition. The opening of the feed port may be circular or other shape and may have a maximum dimension of between about $1/16$-$3/16$ inches. The feed port 106 may be positioned near the downstream partition 116 of each chamber or slightly upstream from the downstream partition 116 so as to minimize the vertical distance between the feed port 106 and a feed level of the chamber. The bottom edge of the opening may be positioned, for example, between about $1/2$-1 inch from the top surface 105 of the receptacle 102 or 104 at the position of the partition 116 measured relative to the height axis of the partition 116. This enables access to nectar in the chamber across a range of heights of nectar in the chamber. While specific dimensions have been included for purposes of illustration, different dimensions may be used in accordance with the present invention.

The cascading fill process associated with the partitions 116 also provides a convenient mechanism for refilling each chamber of the receptacle 102 or 104. As noted above, nectar will cascade from chamber to chamber as nectar is added until each chamber is filled to the fill level defined by the height of the downstream partition. Accordingly, any chamber requiring the addition of nectar can be simply refilled by adding nectar at the fill port 107 at the top of the chamber 102 or 104. For example, if certain chambers along the flow path of the receptacle 102 or 104 are low on feed due to active feeding at those chambers, nectar can be added at the fill port 107. Any chambers that are full will allow immediate flow through of the nectar in cascading fashion until the nectar reaches the chambers requiring refilling. Those chambers will then collect nectar until the feed level reaches the opening of the downstream partition. In this manner, the fill process is largely self-regulating. The user need only monitor the filling process to observe when the lowermost chamber of the receptacle 102 or 104 is fully filled.

This cascading fill process is also visually appealing and entertaining. In this regard, at least the sidewalls of the receptacles 102 and 104 may be formed from translucent or substantially transparent materials. Many commercial nectars are colored to attract hummingbirds and users often add die to homemade nectars for the same purpose. Thus, as the nectar is added via the fill port 107 and cascades from chamber to chamber, an appealing and interesting visual effect is achieved.

The illustrated birdfeeder 100 further includes a hanger 114. The hanger 114 includes a loop for hanging the birdfeeder 100 on a hook, a branch, or other support. The hanger 114 may be attached to the birdfeeder 100 at one or more locations selected to allow the birdfeeder 100 to hang stably in the desired orientation. In the illustrated embodiment, the hanger 114 is formed from sturdy wire such as a braided steel wire. The hanger 114 extends through an opening in the base 110 and is secured at that location so as to support the weight of the birdfeeder 100. For example, the hanger 114 may include a nut, crimping device, or other mass that prevents the hanger 114 from pulling through the opening on the base 110. The illustrated hanger 114 further extends through openings formed in each of the cross members 112. In this manner, the birdfeeder 100 is stably supported in a vertical configuration. That is, the weight of the birdfeeder 100 tends to cause the birdfeeder to maintain an orientation where the hanger 114 is oriented vertically. Moreover, twisting or sloping of the hanger 114 is minimized by this configuration even when the chambers 102 and 104 are unevenly filled. Although not shown, perches may optionally be provided in connection with one or more of the feed ports 106 to allow birds to perch while feeding.

The various components of the birdfeeder 100 including the chambers 102 and 104, the cross members 112, and the base 110 are preferably formed from materials that can withstand the environment where the birdfeeder 100 is displayed and the forces that may be exerted on the birdfeeder by wind, birds, and the like. In addition, as noted above, at least the sidewalls of the receptacles 102 and 104 are preferably translucent or substantially transparent. The birdfeeder 100 is also preferably formed from materials that can be easily shaped and colored or otherwise decorated to attract hummingbirds. While many materials can be utilized in this regard, and different materials may be used for different components, the illustrated birdfeeder 100 may be primarily formed from plastic materials or may include a combination of materials. The components can be formed in a single molding process as an integral unit or can be formed in pieces which are then interconnected, e.g., by welding or snapping together. In the illustrated embodiment, at least the top cover 105 is formed in a separate molding process and then snaps into place on the respective receptacles 102 and 104.

Figure 2A:
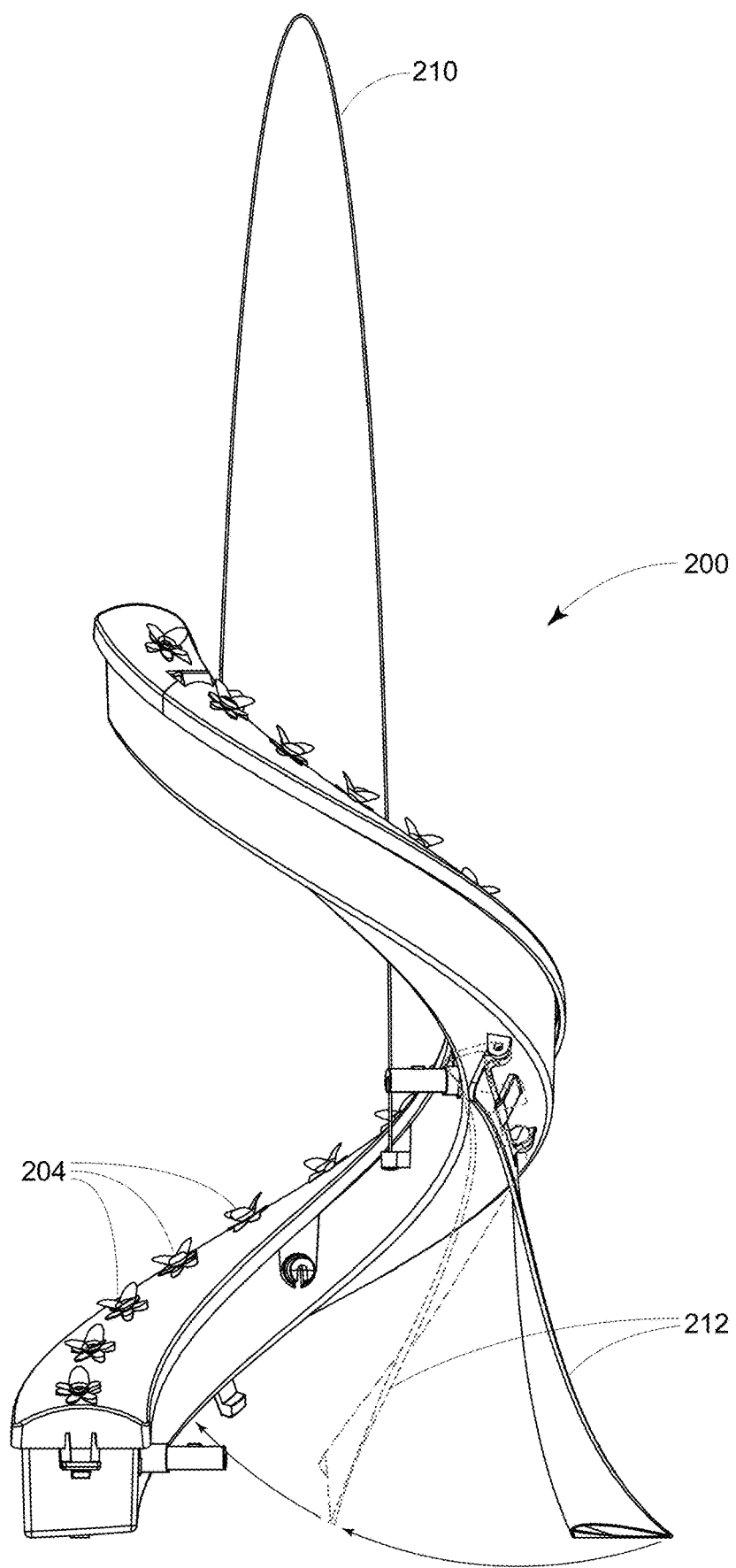
FIGS. 2A-2B show a single helix nectar birdfeeder including a kickstand in accordance with an alternative embodiment of the present invention.
Figure 2B:
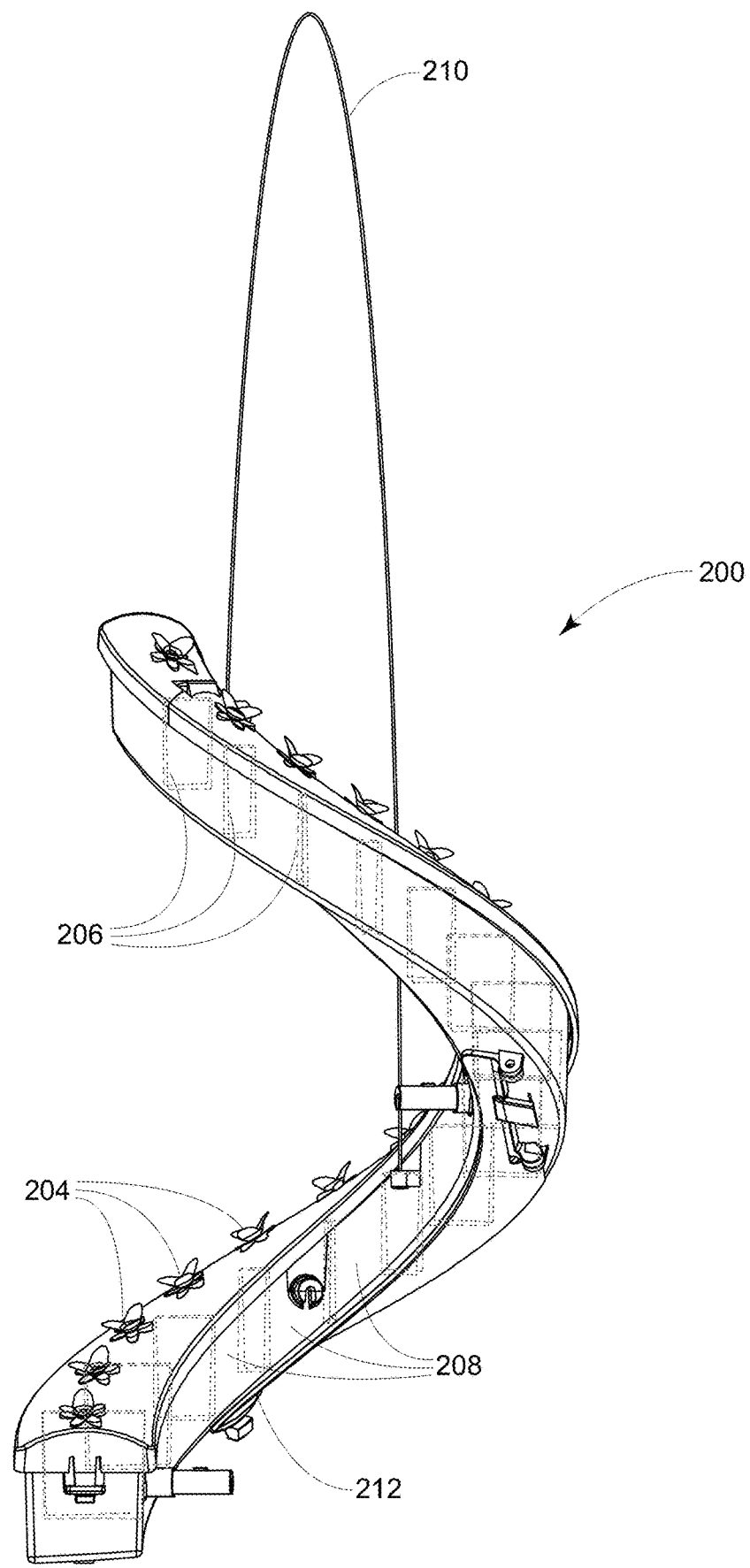

FIGS. 2A-2B show a single helix birdfeeder 200. The birdfeeder 200 generally includes a housing forming a single helical receptacle 202, a deployable kickstand assembly 212 and a hanger 210. The receptacle 202 includes a number of partitions 206 to form feed chambers 208. Each of the feed chambers is generally associated with at least one feed port 204. The receptacle 202 including the partitions 206 and chambers 208 may generally be similar to the corresponding components described above in connection with FIGS. 1A-1D and that description will not be repeated in detail in the interest of brevity.

There are, however, a number of differences between the birdfeeder of FIGS. 1A-1D and the birdfeeder of FIGS. 2A-2B. First, the birdfeeder 200 includes only a single helical receptacle 202 rather than the double helix design described above. Accordingly, certain elements such as the cross members have been eliminated. In addition, the birdfeeder 200 is shown with artificial flower petals in connection with each of the feed ports 204 that are provided with a color that contrasts from the upper surface of the receptacle 202. This may be more appealing to some users as well as more attractive to certain species. In addition, the illustrated birdfeeder 200 includes a hanger 210 that connects to the receptacle 202 at multiple locations, e.g., at two locations in the illustrated embodiment. It will be appreciated that the single helix design does not include a central attachment location for the hanger 210 and may be susceptible to asymmetric loading relative to a central axis. Accordingly, multiple attachment locations for the hanger 210 may be desired. The hanger may attach to the receptacle 202 via attachment loops formed in the upper surface of the receptacle 202, via openings formed in the upper surface of the receptacle 202 above the maximum local feed line, or by other techniques.

The illustrated birdfeeder 200 also includes a kickstand assembly 212. In some cases, a user may desire to stand the birdfeeder 200 on the ground or another surface, for example, in connection with refilling or servicing the feeder 200. In such cases, it is desirable for the feeder 200 to stand in a stable or partially stable (e.g., leaning against the wall) upright position. The kickstand assembly 212 assists in supporting the birdfeeder 200 in this regard.

The illustrated kickstand assembly 212 is movable between a stowed position as shown in FIG. 2B and a deployed position as shown in FIG. 2A. In the deployed position, the kickstand assembly 212 extends downwardly from the birdfeeder 200 to support the birdfeeder 200, in conjunction with the bottom of the receptacle 202, in a substantially level orientation. When the kickstand assembly 212 is and a stowed position, the assembly 212 is substantially flush with a bottom surface of the receptacle 202 so as to minimize interference with the appearance of the birdfeeder 200 when displayed. In this regard, the kickstand assembly 212 may be connected to a bottom surface of the receptacle 202 via a hinge. The hinge may be biased by a resilient member, such as a spring, towards the stowed position. Alternatively or additionally, the hinge may have a bi-stable configuration such that it snaps into each of the stowed and fully deployed positions. If desired, multiple kickstand assemblies 212 may be provided for enhanced stability.

Figure 3:
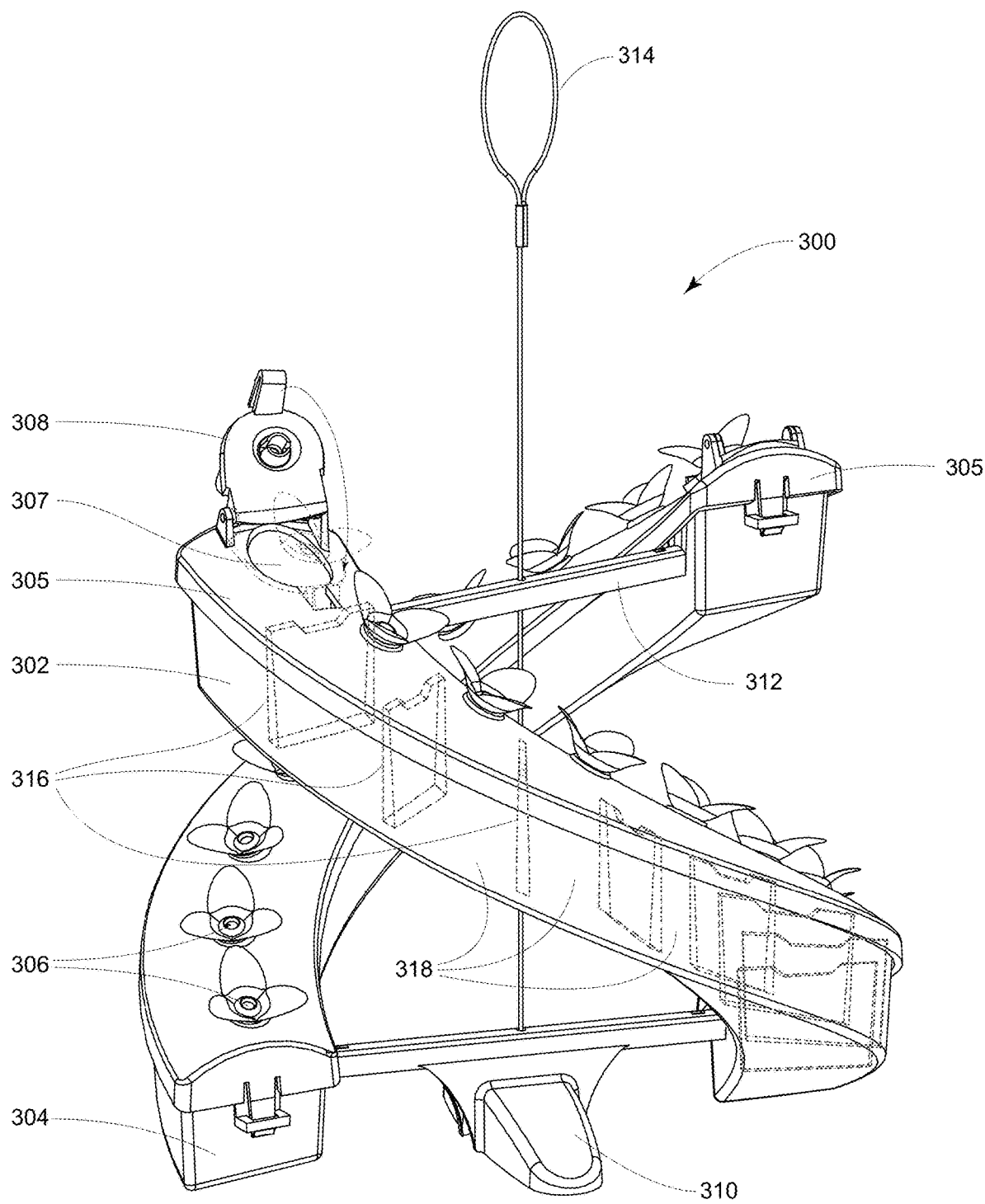
FIG. 3 is a perspective view of another double helix nectar birdfeeder in accordance with the present invention.

FIG. 3 shows another double helix nectar birdfeeder 300 in accordance with the present invention. The birdfeeder 300 includes first and second receptacles 302 and 304, top covers 305, articulating fill port covers 308, a base 310, cross members 312, and a hanger 314. In addition, each of the receptacles 302 and 304 includes a number of partitions 316 to define multiple feed chambers 318. Each of the feed chambers 318 may be associated with one or more feed ports 306 and each of the feed ports 306 may include artificial flower petals as shown. Each of the top covers 305 includes a fill port opening 307 into which the nectar is poured to fill the respective receptacles 302 and 304.

The birdfeeder 300 is generally similar to the double helix nectar birdfeeder described in connection with FIGS. 1A-1D. However, the birdfeeder 300 is shorter than the birdfeeder described in connection with FIGS. 1A-1D. Because it is shorter, the birdfeeder 300 only utilizes two crossmembers 312 in conjunction with the base 310 for spacing and stability. In general, double helix birdfeeders may be provided in a variety of heights as desired with appropriate modifications of the base and cross members.

Figure 4A:
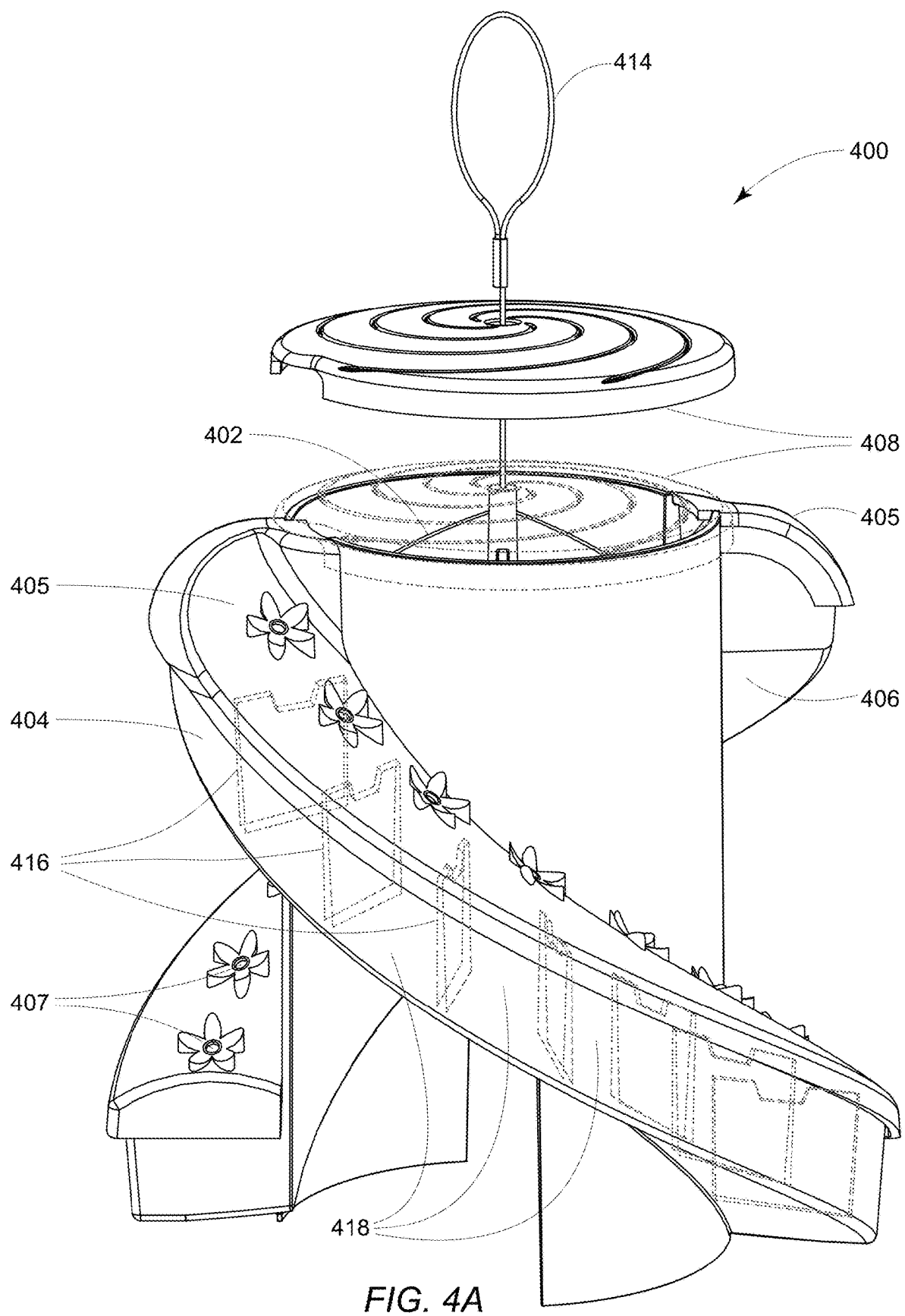
FIGS. 4A-4B show perspective and partial cross-sectional views of a double helix nectar birdfeeder with a central feed reservoir in accordance with the present invention.
Figure 4B:
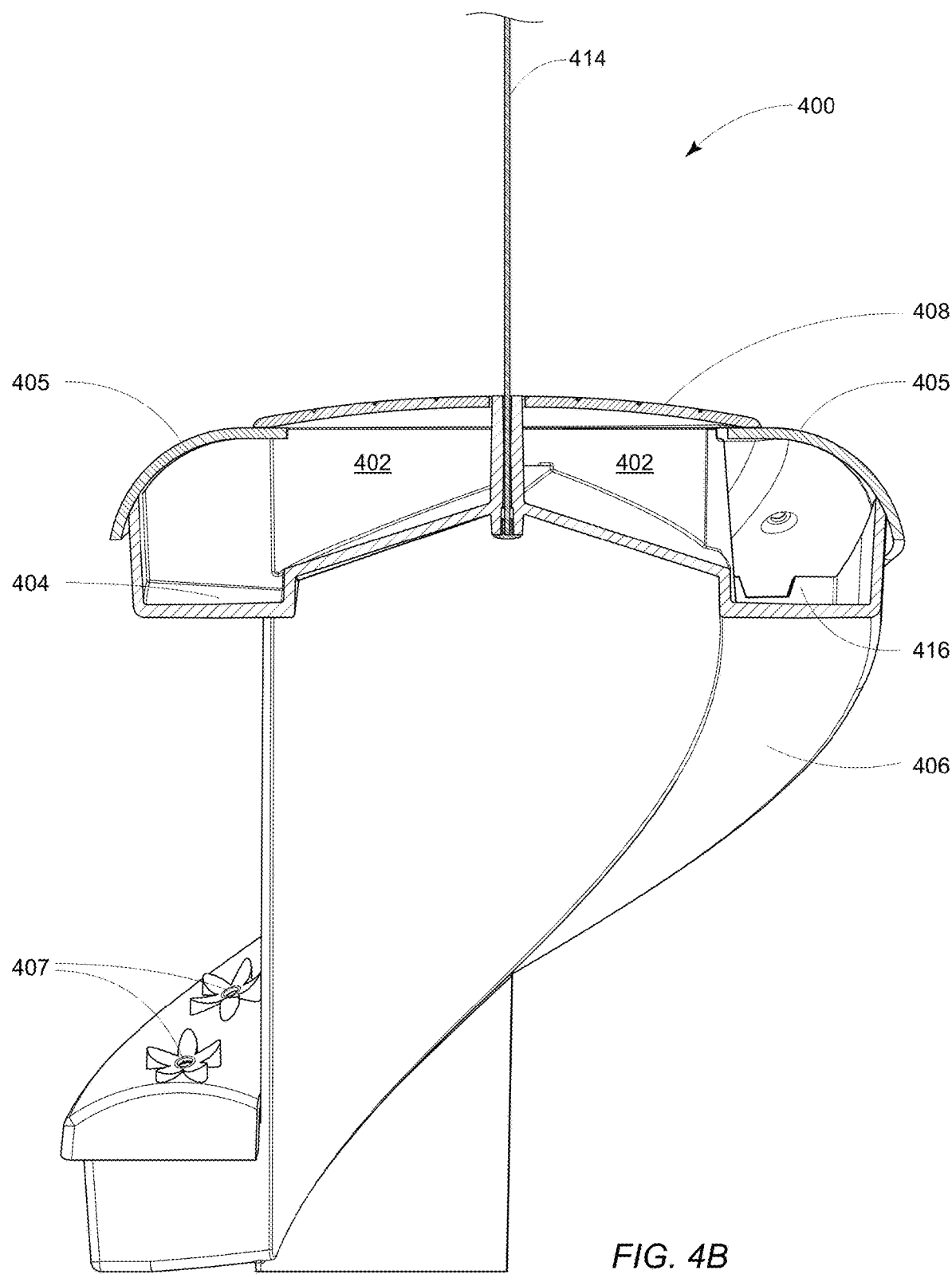

FIGS. 4A and 4B show a still further embodiment of a double helix nectar birdfeeder 400 in accordance with the present invention. The construction of the birdfeeder 400 is generally similar to that of the double helix nectar birdfeeders described above. However, the birdfeeder 400 includes a central nectar repository 402. The repository 402 has a single fill port cover 408 that can be lifted to add nectar to the repository 402. FIG. 4A shows cover 408 in both open and closed positions for clarity of intent. In addition, the repository 402 includes openings to allow nectar to flow from the repository 402 into each of the receptacles 404 and 406. Such openings are provided at the sides of the repository 402 and the bottom surface of the repository 402 may be sloped so that nectar flows to the openings. Covers 405 protect receptacles 404 and 406 from debris and are removable to permit ease of cleaning. It will be appreciated that the central repository 402 allows a user to simultaneously fill both chambers 404 and 406 while only requiring lifting of a single cover. In addition, each of the receptacles 402 and 404 includes a number of partitions 416 to define multiple feed chambers 418. Each of the feed chambers 418 may be associated with one or more feed ports 407.

FIG. 4B shows that the birdfeeder 400 includes first and second receptacles 404 and 406, top covers 405, removable fill port cover 408, and a hanger 414. The receptacles 404 and 406 are formed as a single structure with repository 402, which makes the bird feeder more robust. The integrated nature of the feeder is intrinsically stable, eliminating the need for a separate base and making the feeder less expensive to manufacture.

Figure 5A:
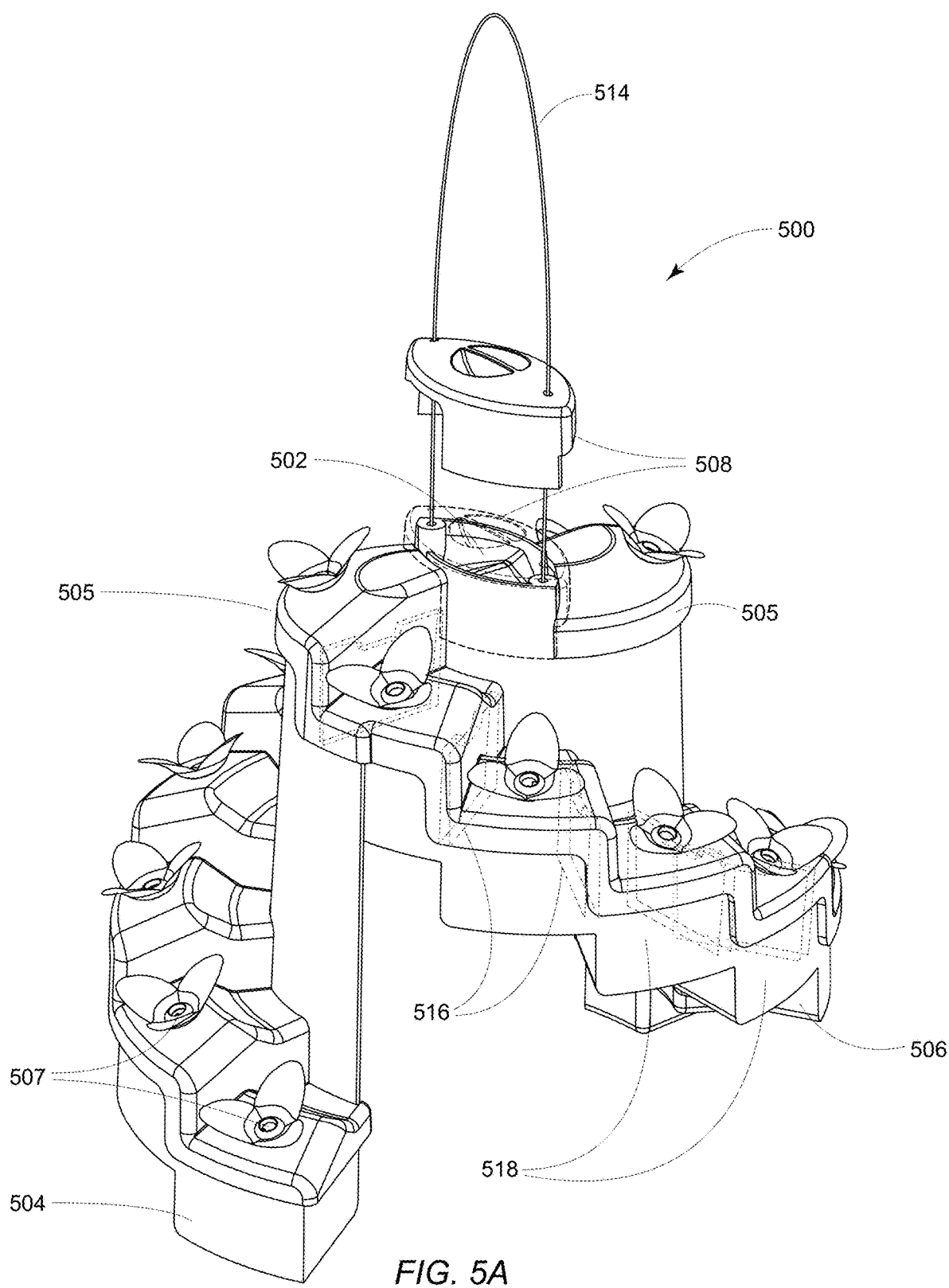
FIGS. 5A-5C show perspective, cross-sectional, and top views of a double spiral staircase nectar birdfeeder in accordance with the present invention.
Figure 5B:
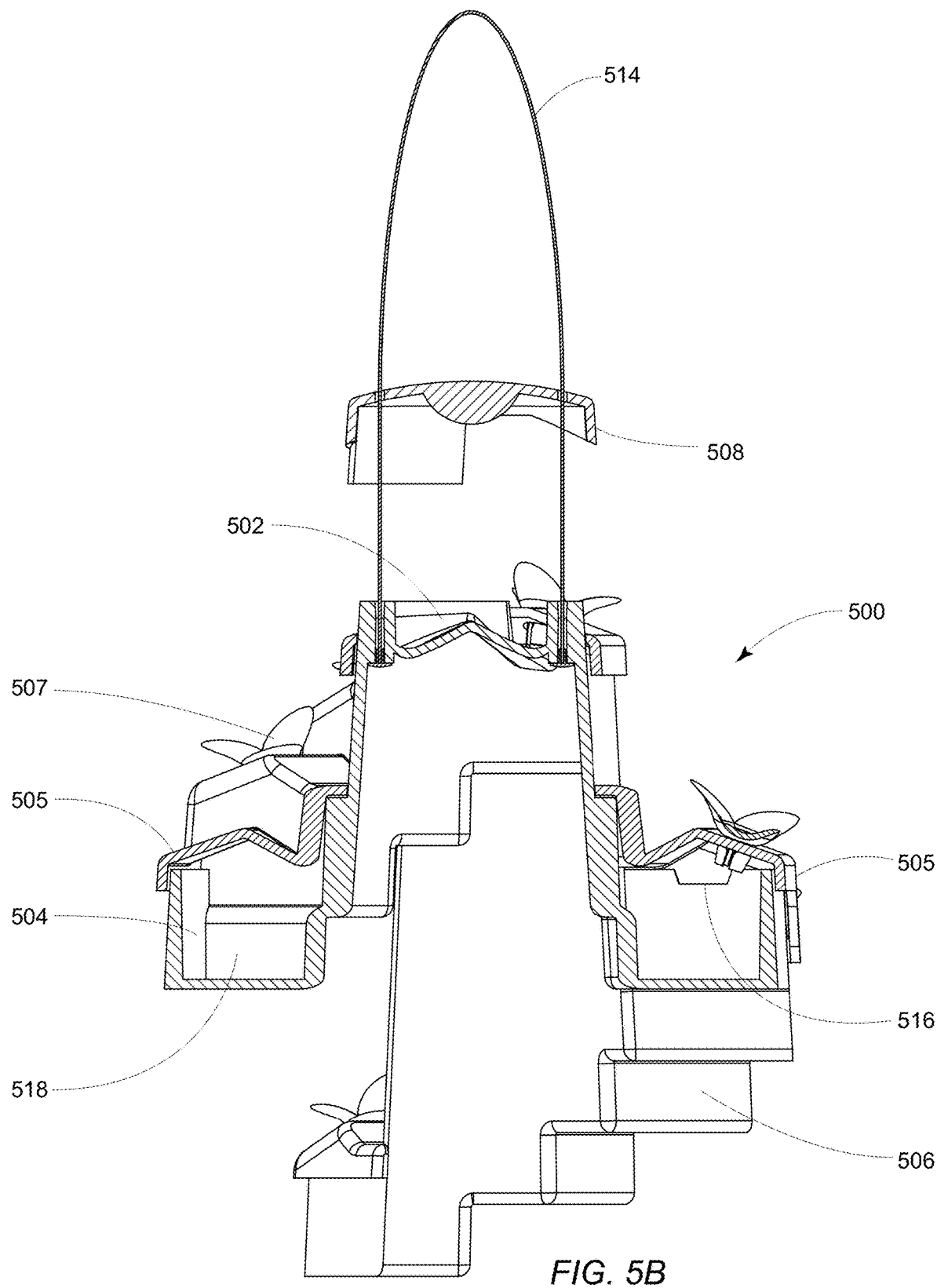
Figure 5C:
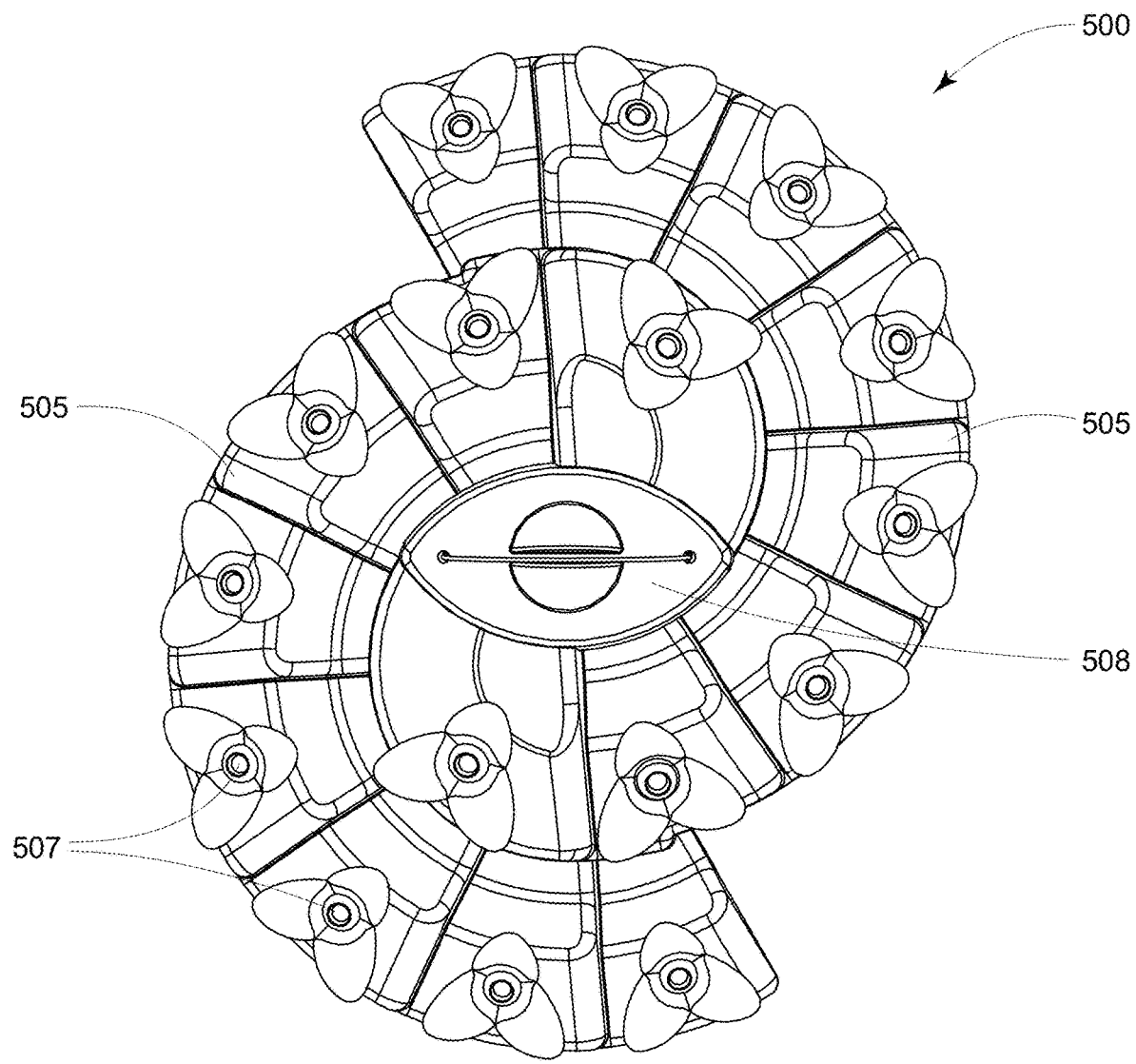

FIGS. 5A-5C show a further embodiment of a nectar birdfeeder 500 in accordance with the present invention. In this case, the birdfeeder 500 has a dual spiral staircase design. It will be appreciated that many different designs can be provided in accordance with the present invention. Generally, these designs will define one or more flow paths, each extending from a fill port at a top end of a feed receptacle to a bottom or lower portion of the receptacle. The flow path may extend across multiple feed ports. The birdfeeders are preferably configured so that feed flows along the flow path under the influence of gravity.

The illustrated birdfeeder 500 includes first and second receptacles 504 and 506 each configured as a spiral staircase.

Partitions 516 defining openings are adjacent a downstream end of each step on the staircase such that each step is associated with a feed chamber 518 and the chambers may be filled in cascading fashion as generally described above. Moreover, each step may include a feed port 507 associated with a corresponding feed chamber 518. Covers 505 protect receptacles 504 and 506 from debris and are removable to permit ease of cleaning. The illustrated feeder 500 further includes a central feed repository 502 which has a fill port cover 508 that can be lifted to add nectar to the repository 502. The feed will then flow from the repository 502 into each of the receptacles 504 and 506 via an opening therebetween. Alternatively, in addition to the lift-off cover 508 design illustrated, the cover may flip open, e.g., by operation of a hinge, to add nectar and then may flip to a closed position to protect the repository 502 against the elements and pests. The birdfeeder 500 further includes a hanger 514. In this case, the hanger attaches to the repository 502 at multiple locations for improved stability.

FIG. 5B shows that the birdfeeder 500 includes first and second receptacles 504 and 506, top covers 505, removable fill port cover 508, and a hanger 514. The receptacles 504 and 506 are formed as a single structure with repository 502, which makes the bird feeder more robust. The integrated nature of the feeder is intrinsically stable, eliminating the need for a separate base and making the feeder less expensive to manufacture.

Figure 6A:
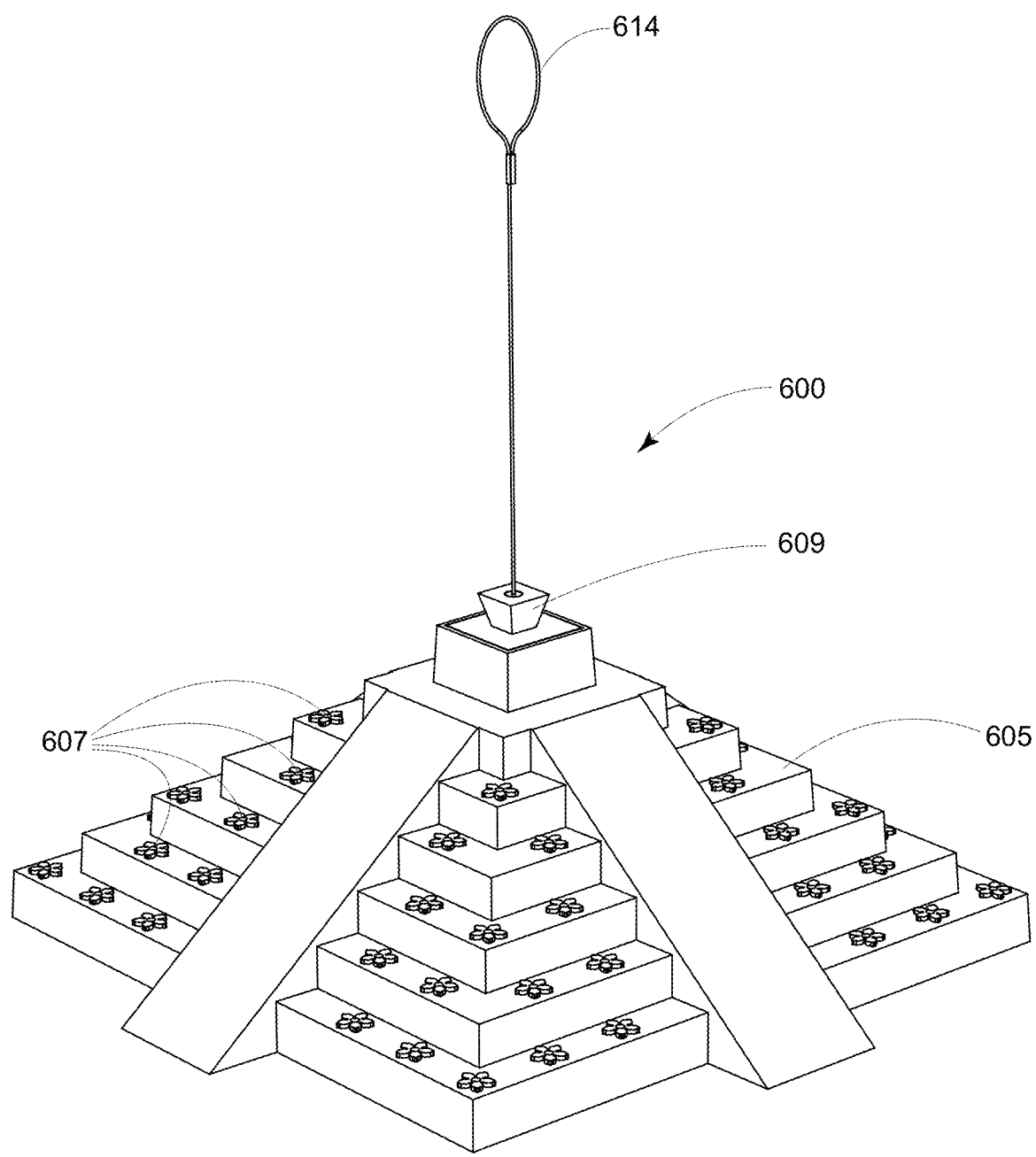
FIGS. 6A-6C show perspective views of a pyramid style nectar birdfeeder as well as a cross-sectional view depicting a cascading fill process in accordance with the present invention.
Figure 6B:
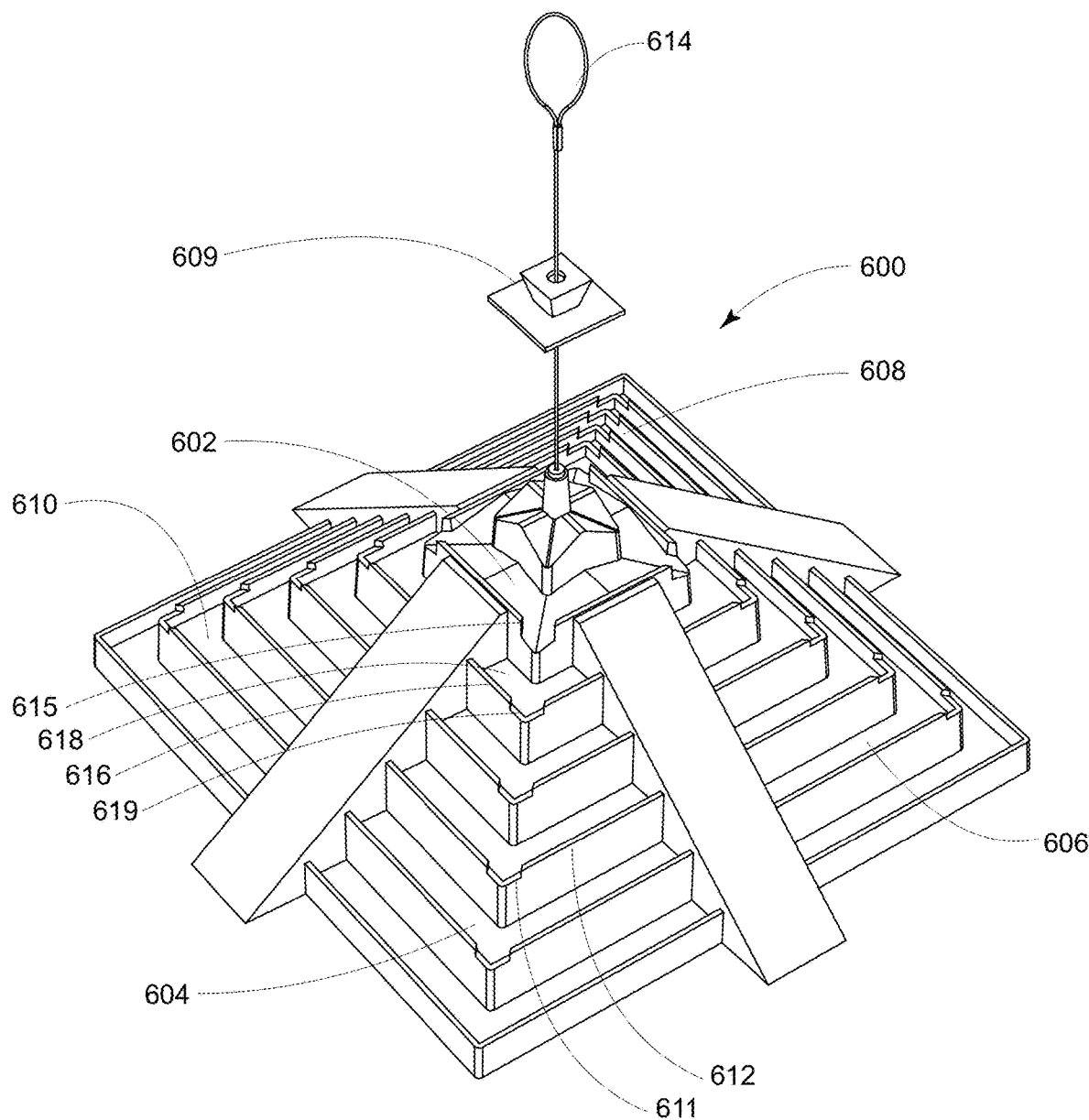
Figure 6C:
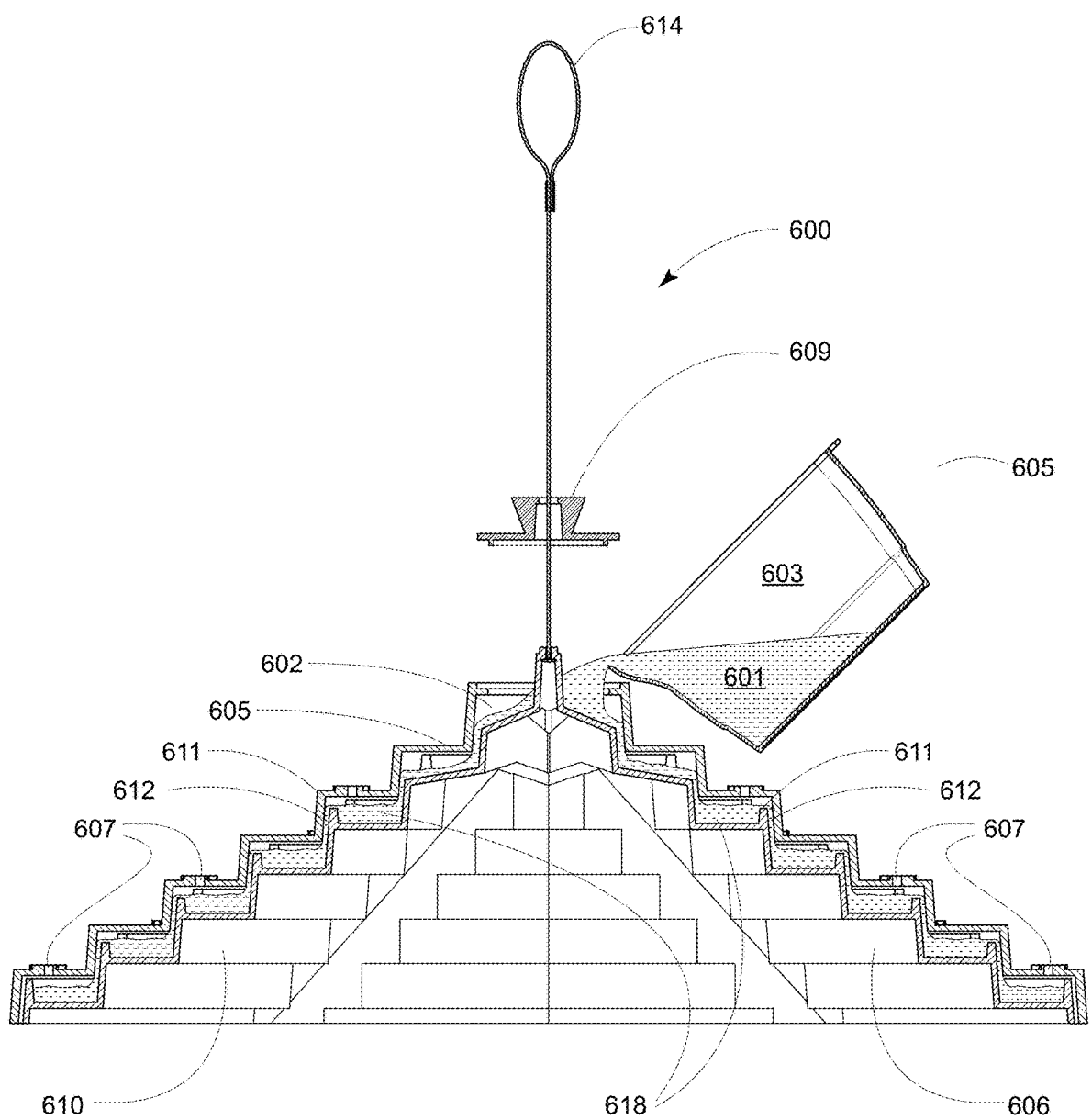

FIGS. 6A-6C show another nectar birdfeeder 600 in accordance with the present invention. The illustrated birdfeeder 600 includes a housing that is generally configured as a step pyramid. In this regard, the birdfeeder 600 includes receptacles 604, 606, 608, and 610, each generally extending about a quadrant of the pyramid. A main cover 605 is positioned over the entire feeder housing to protect against the elements and pests. One or more feed ports 607 may be provided at each step of the pyramid for each receptacle 604, 606, 608, or 610. As shown, the main cover 605 includes a central opening to allow passage of a hanger 614.

Referring to FIG. 6B, the birdfeeder 600, shown without main cover 605 for clarity, also includes a central repository 602. Feed can be added to the repository 602 by lifting the fill port cover 609. A notch 615 formed in the repository 602 allows nectar to flow from the repository 602 to the uppermost feed chamber 618 of the pyramid. A further partition 616, spaced from a wall of a housing of the uppermost feed chamber 618, includes notches 619 associated with each of the receptacles 604, 606, 608, and 610. Additional partitions 612 with notches 611 are provided at each step of the pyramid in each of the receptacles 604, 606, 608, and 610 so that nectar flows in cascading fashion through each of the receptacles 604, 606, 608, or 610.

Referring to FIG. 6C, a section view across the diagonal showing the fill port cover 609 lifted for filling access, the uppermost feed chambers 618 of the receptacles 604, 606, 608 or 610 will fill with nectar 601 poured from an appropriately shaped vessel 603 until the level of nectar in the chamber reaches the notch 611 in the partition 612. As the nectar 601 continues to be poured from vessel 603, it will then flow over the notch 611 and into the next chamber downstream from the uppermost chamber.

The birdfeeder 600 illustrates another interesting and attractive implementation of the present invention. In addition, the birdfeeder 600 illustrates a number of optional features of the invention. For example, as shown, the individual feed chambers of each receptacle 604, 606, 608, or 610, need not be disposed in succession along the feed flow path like beads on a necklace but, rather, may extend horizontally to define a variety of interesting configurations. Moreover, as shown, multiple feed ports 607 in the top cover 605 may be supported for each feed chamber of a receptacle 604, 606, 608, or 610. In this case, a large number of feed ports 607 can be supported in a small space with a convenient single fill port.

FIGS. 7A-7E illustrate a seed birdfeeder 700 in accordance with the present invention. The illustrated birdfeeder 700 is a single helix design with a kickstand assembly similar to that described above in connection with FIGS. 2A-2B. In particular, the illustrated birdfeeder includes a helical receptacle 702, a top cover 705, a deployable kickstand assembly 710, and a hanger 714. However, the birdfeeder 700 includes a number of modifications to accommodate birdseed. In particular, the feed ports 706 are formed as troughs extending outwardly from the receptacle 702. Seed from the receptacle 702 spills outwardly into the ports 706 for access by seed feeding birds. The illustrated birdfeeder 700 also includes a helical perch 708 to support birds while they are feeding at the ports 704. Although the illustrated perch 708 is a continuous helical rail, it will be appreciated that perches may alternatively be provided only at the locations of the ports 706.

Figure 7A:
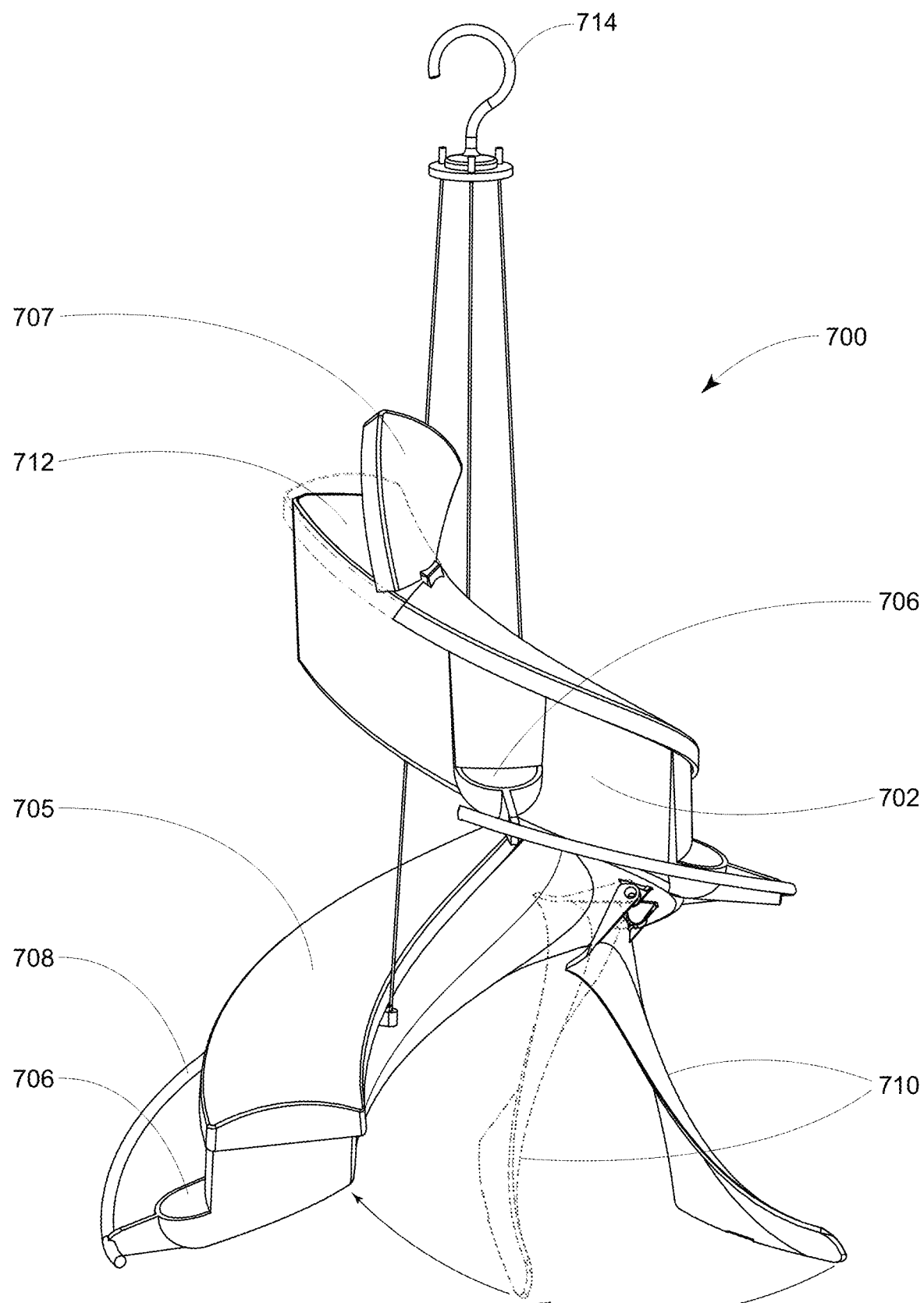
FIGS. 7A-7E show a single helix seed birdfeeder with a kickstand feature shown in the deployed and stowed configurations as well as a cascading flow fill process in accordance with the present invention.
Figure 7B:
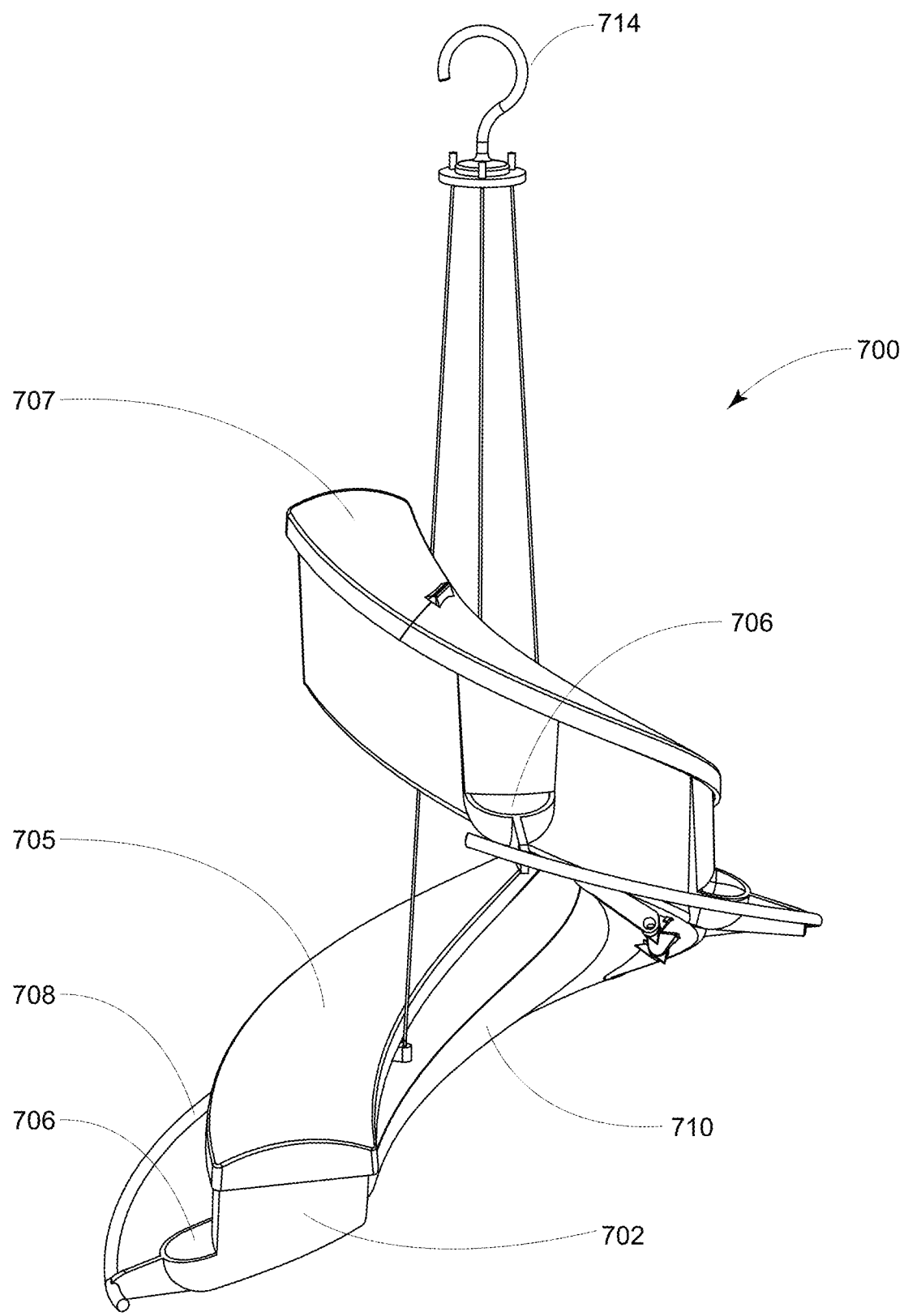

As described above, the deployable kickstand assembly 710 is movable between a deployed position as shown in FIG. 7A and a stowed position as shown in FIG. 7B. The assembly 710 is mounted to an underside of the receptacle 702 and may include an integral hinge or a separate hinge to enable the movement between the deployed and stowed positions. In the deployed position, the birdfeeder 700 can rest stably or semi-stably on the ground or another surface for refilling. The illustrated hanger 714 includes multiple wires, for example, three wires for enhanced stability.

The top cover 705 includes an articulating fill port cover 707 which, when hinged open, forms a fill port 712 for adding seed into the feeder. The bird feed is flowable and may be added at the fill port 712 at the top end of the receptacle 702 by raising the articulating fill port cover 707. Although the seed is generally flowable, its properties are somewhat different from a liquid nectar. In this regard, partitions 716 may optionally be provided adjacent but downstream from the feed ports 706. Where partitions are provided in seed birdfeeders, the partitions may be reduced in size relative to those provided for nectar birdfeeders. That is, such partitions may extend only across a minority of the height of the receptacle 702 at the location of the partition 716 such that the partitions promote the accumulation of seed at the feed ports 706 without significantly obstructing the flow of seeds through the receptacle 702. Alternatively, such partitions may be omitted entirely.

Figure 7C:
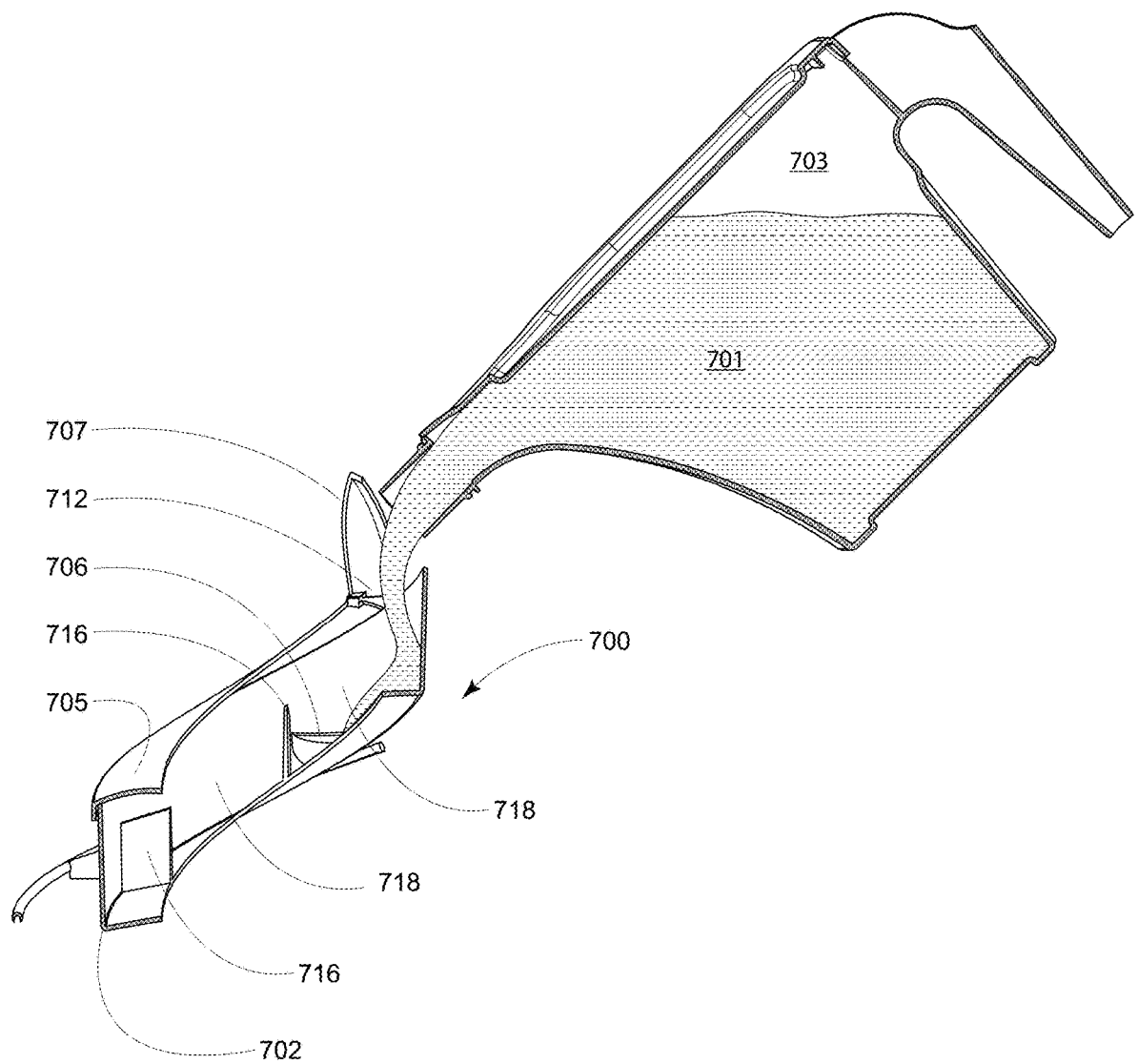
Figure 7D:
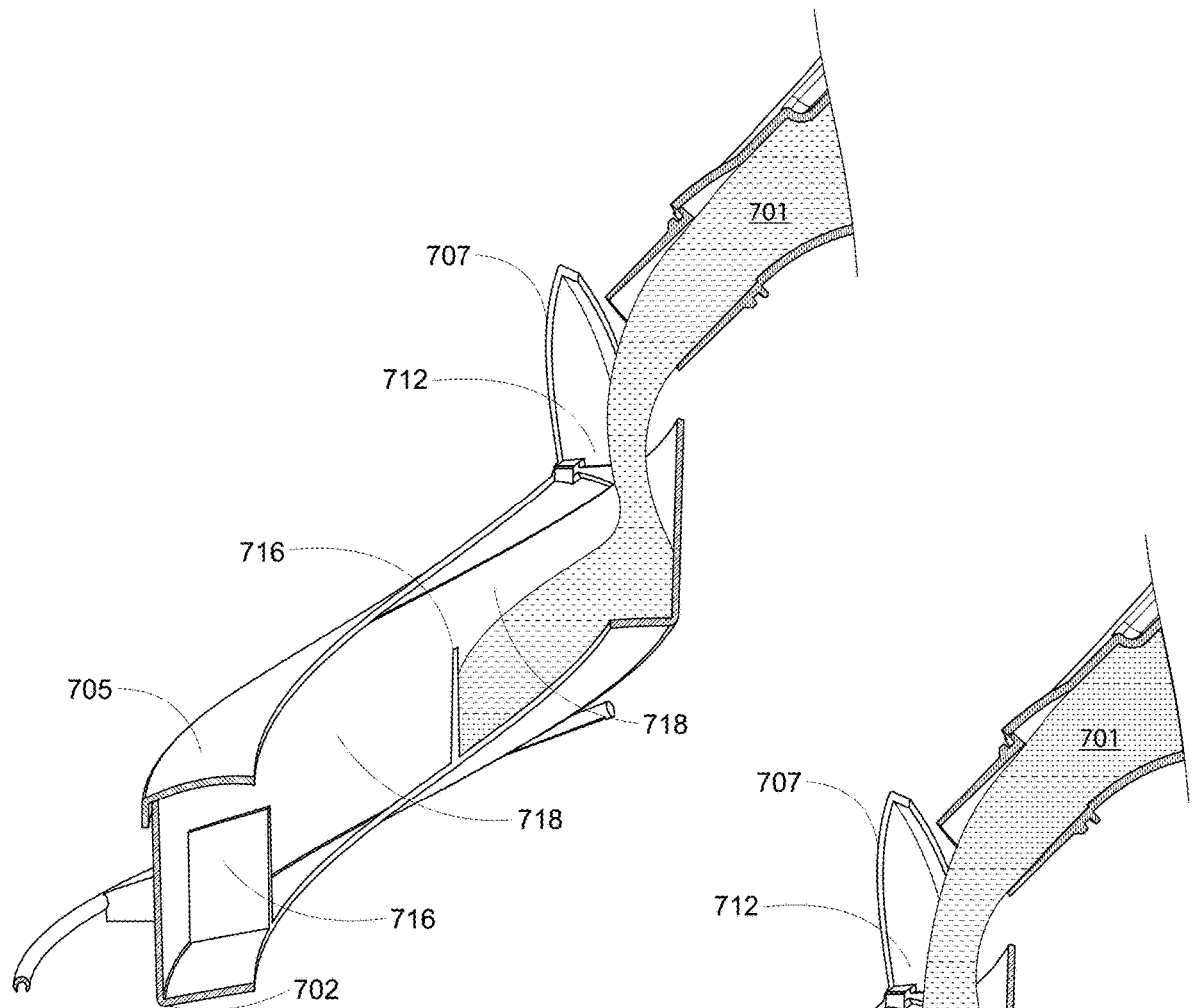
Figure 7E:
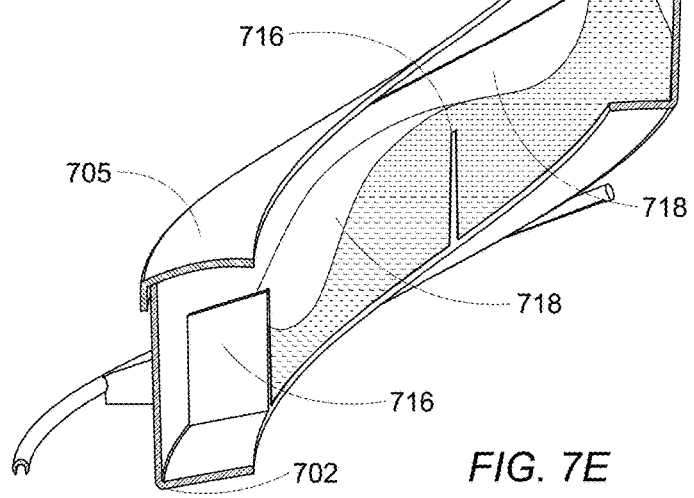

Referring to FIGS. 7C-7E, section cutaway views, the uppermost feed chamber 718 of the receptacle 702 will fill with seed 701 poured from an appropriately shaped vessel 703 into fill port 712 until the level of seed in the chamber reaches the top of first partition 716. As the seed 701 continues to be poured from vessel 703, it will then flow over the partition 716 and into the next chamber 718 downstream and so on. In each instance, seed 701 accumulates behind the partition and fills the associated feed port 706. In this way, as birds feed, seed will remain available at each feed port 706, allowing each port to be usable until the entire seed supply is exhausted, thereby encouraging more birds to feed simultaneously, a behavior highly desired by users of bird feeders.

Figure 8:
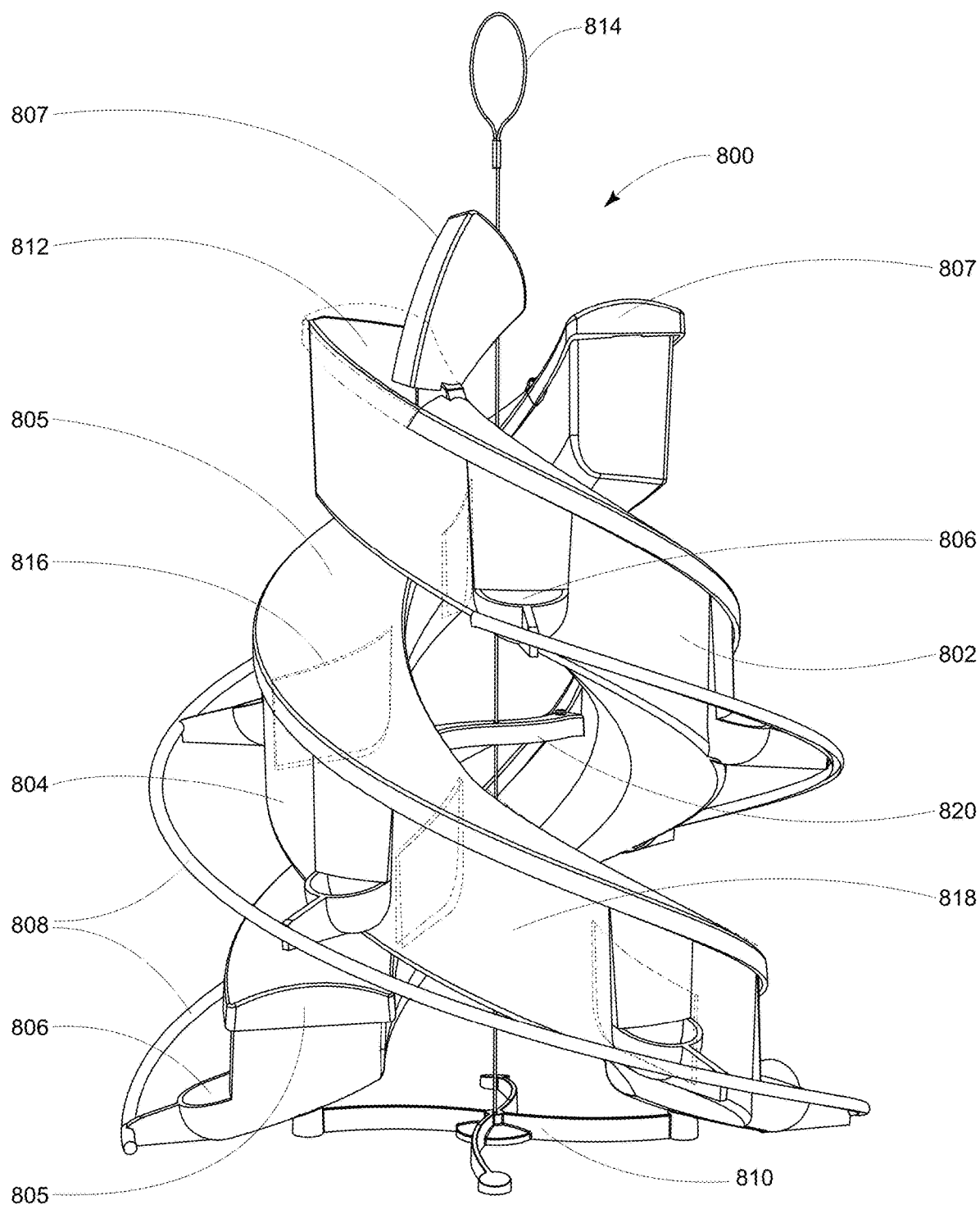
FIG. 8 shows a double helix seed birdfeeder in accordance with the present invention.

FIG. 8 shows a double helix seed birdfeeder 800. The birdfeeder 800 is generally similar to the double helix nectar birdfeeders described above in connection with FIGS.

1A-1D. In particular, the birdfeeder 800 includes a first helical receptacle 802 and a second helical receptacle 804 that are intertwined to form a double helix design reminiscent of a DNA strand. Each top cover 805 includes an articulating fill port cover 807 which, when hinged open, forms a fill port 812 for adding seed to the receptacles 802 and 804. The birdfeeder 800 further includes a number of seed feed ports 806 that can be accessed by birds supported on perches 808, in this case, formed as continuous helical rails. Finally, the birdfeeder 800 includes a hanger 814 for supporting the birdfeeder 800 on a hook, branch, or other support. The hanger 814 is connected to the base 810 and extends through cross members 820. In this manner, the birdfeeder 800 hangs stably even when the feeder is affected by winds or is unevenly filled. The base 810 allows the birdfeeder to stand stably in an upright position on the ground or another surface, for example, when seed is being added to the receptacles 802 and 804.

Figure 9A:
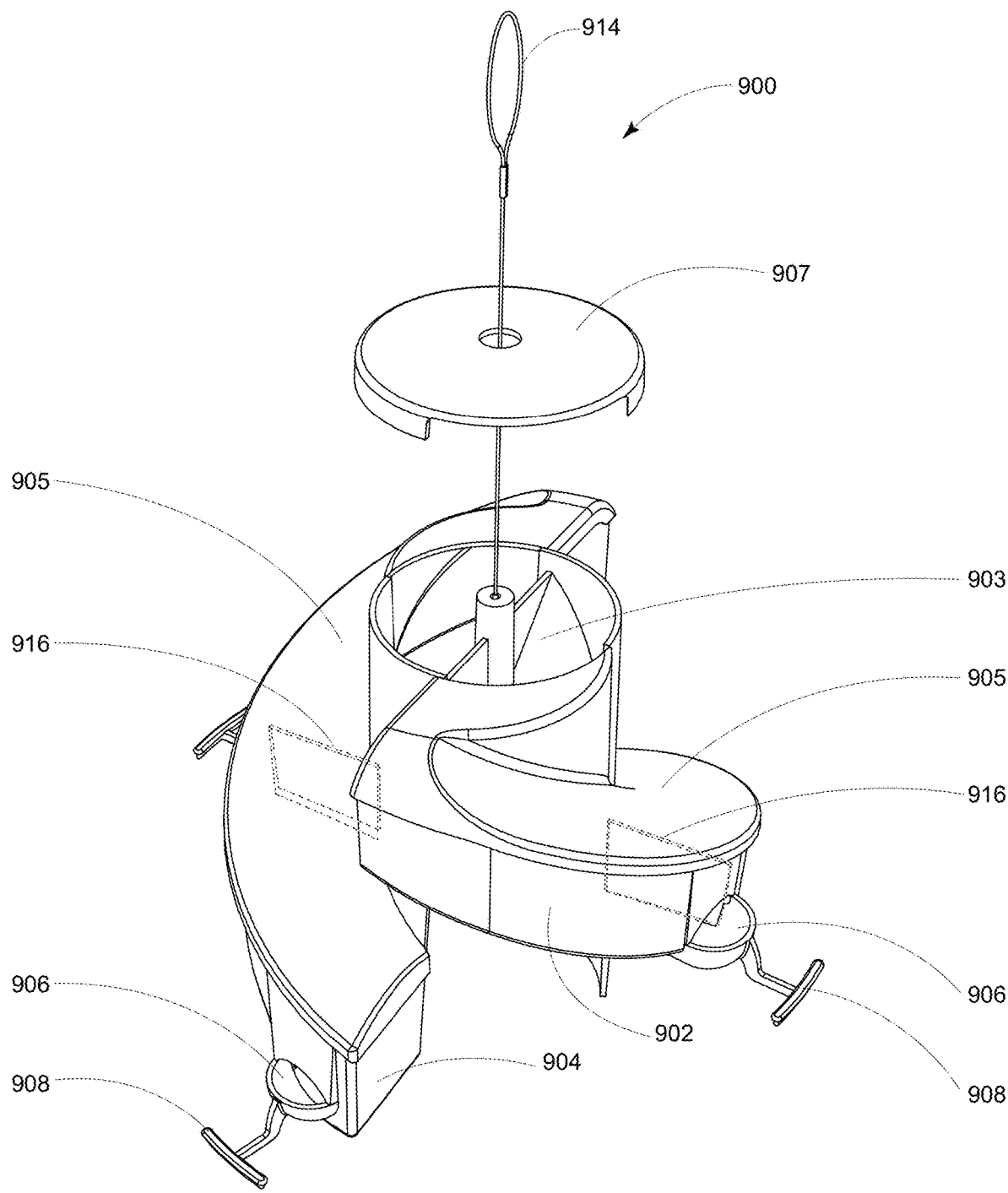
FIGS. 9A-9B show a double helix seed birdfeeder with a central feed reservoir in accordance with the present invention.
Figure 9B:
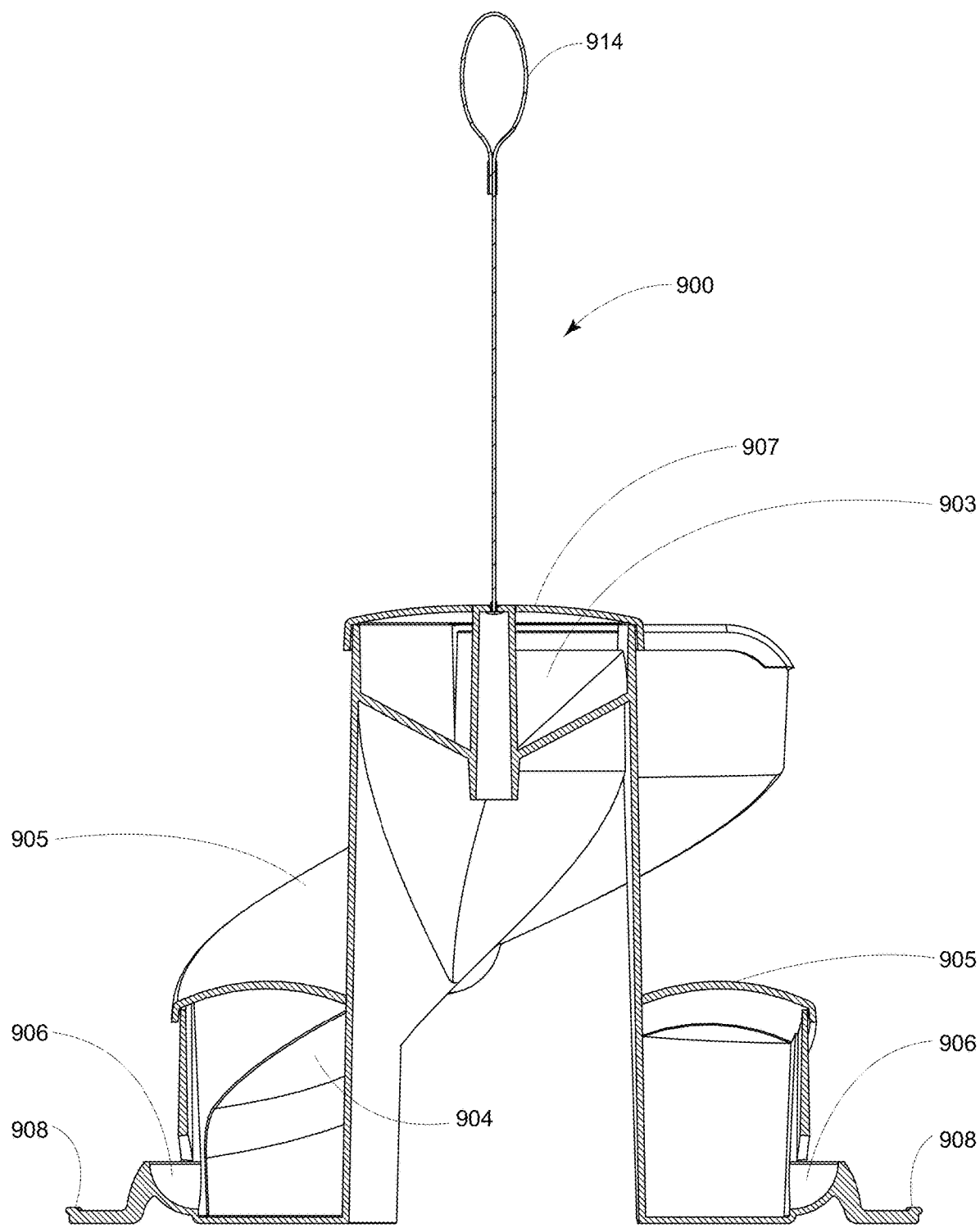

FIGS. 9A-9B show another double helix seed birdfeeder 900. The birdfeeder 900 is similar to the double helix seed birdfeeder described above but is shorter in overall height and has a unified housing design, allowing lower manufacturing costs. In addition, the birdfeeder 900 includes a central seed receptacle 903 that can be accessed via a removable cover 907. Seed can be conveniently added to the central repository 903 and then flows into the first and second receptacles 902 and 904 by way of openings between the central repository 903 and the respective receptacles 902 and 904. The illustrated birdfeeder 900 further includes a number of seed feed ports 906 that can be accessed by a bird resting on the perches 908. In this case, the perches 908 are provided only at the location of the feed ports 906 and are formed as T-shaped members extending from and supported by the feed ports 906.

The birdfeeder 900 has seed flow that is generally similar to the helix birdfeeder described above in connection with FIGS. 7A-7E in that seed is poured into repository 903 and flows downward into receptacles 902 and 904 where it accumulates against partitions 916, filling the upper ports 906. As seed continues to be poured, the seed flows over the top of partitions 916 so that the lower ports 906 are then filled.

Figure 10:
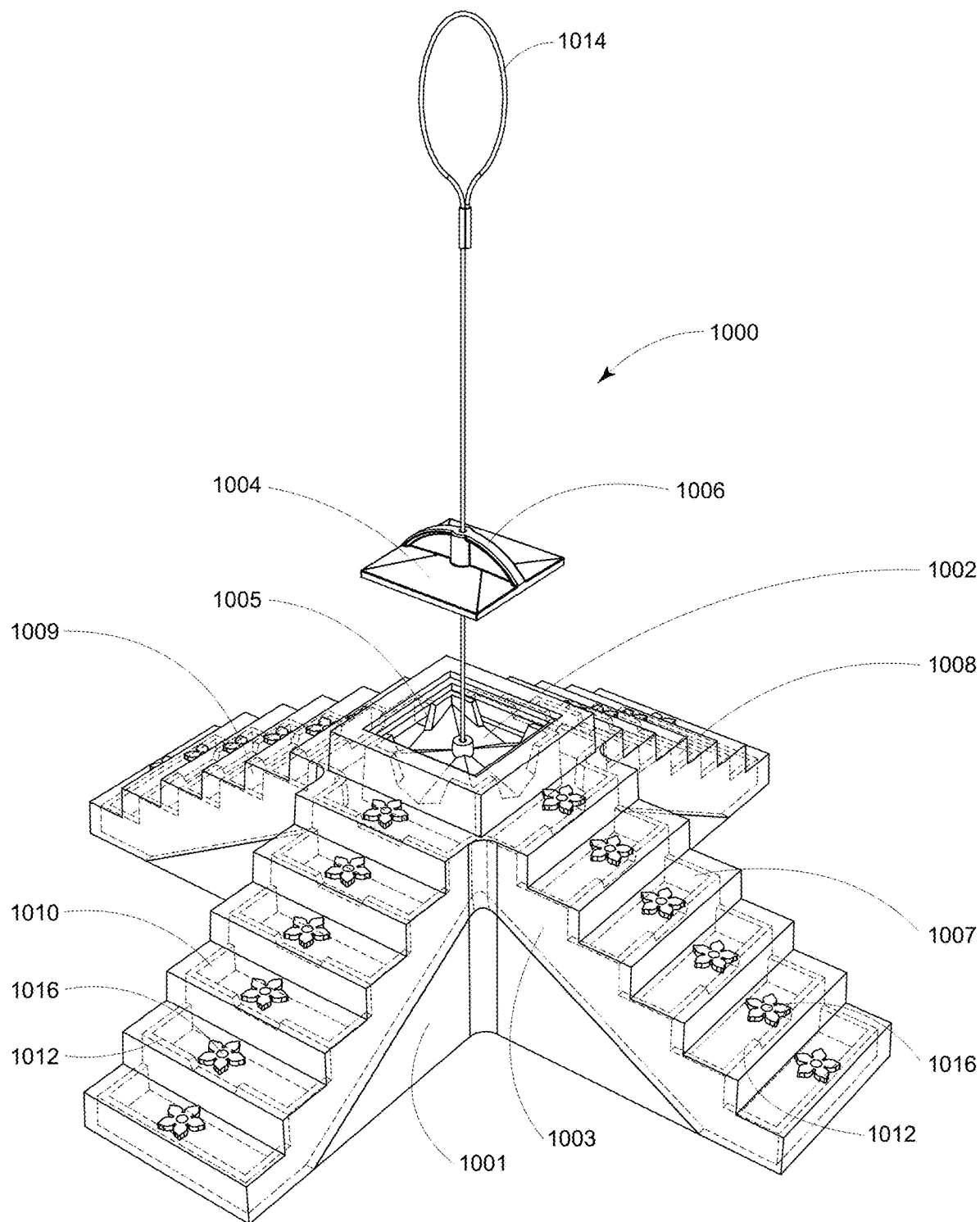
FIG. 10 shows a step pyramid nectar birdfeeder in accordance with the present invention.

FIG. 10 shows a still further embodiment of a nectar birdfeeder 1000 in accordance with the present invention. The birdfeeder 1000 includes a housing 1001 generally formed in the shape of a step pyramid. A cover 1003, also in the shape of a step pyramid, protects the nectar in the receptacles against the elements and pests and includes placements for the feed ports 1016. Nectar can be added to the birdfeeder 1000 via a central repository 1002. The repository 1002 can be accessed by lifting a cover 1004 using handle 1006. The handle 1006 includes a central opening through which a hanger wire 1014 can extend.

Figure 11A:
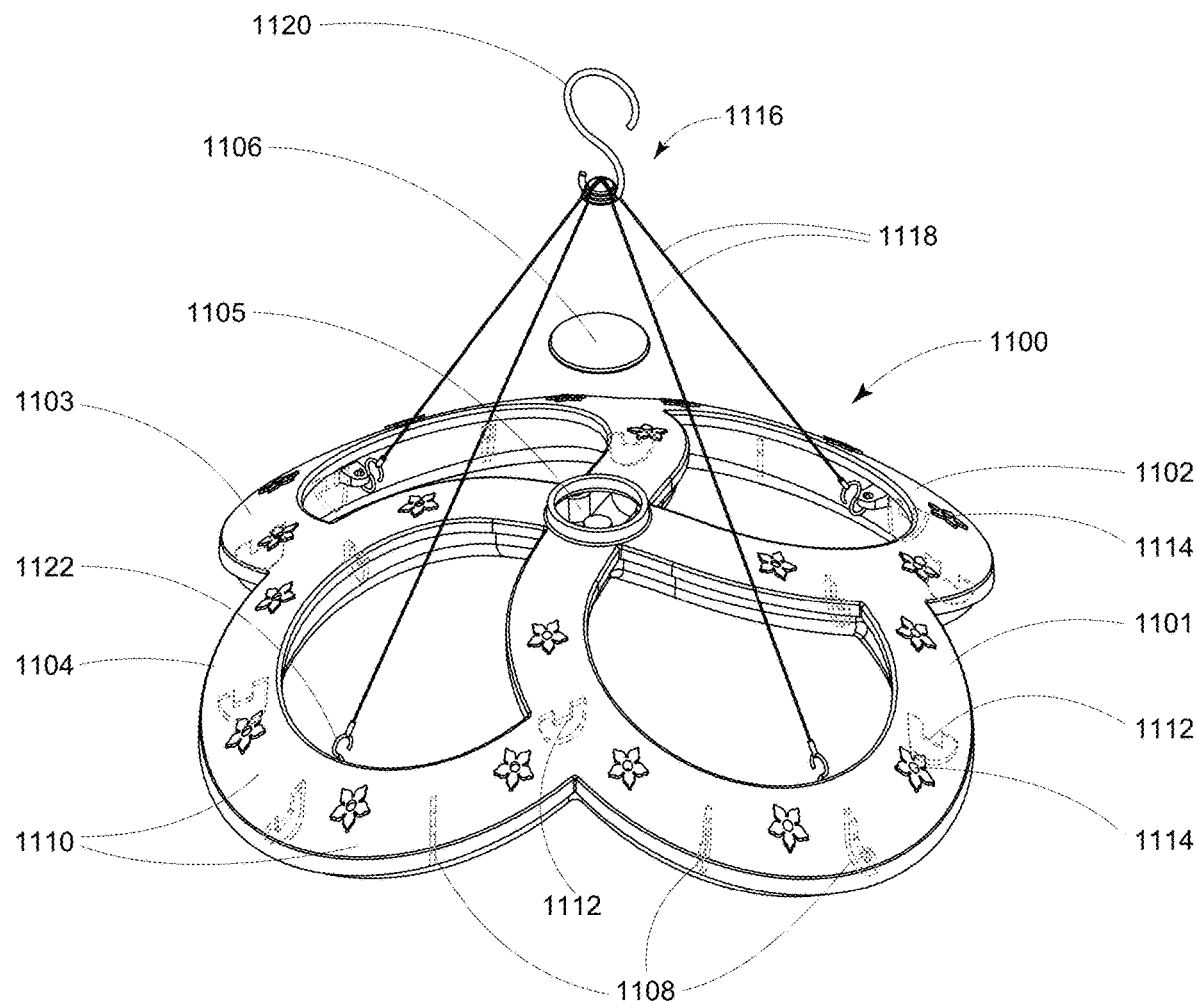
FIGS. 11A-11C show perspective and elevational views of a cloverleaf nectar birdfeeder in accordance with the present invention.
Figure 11B:
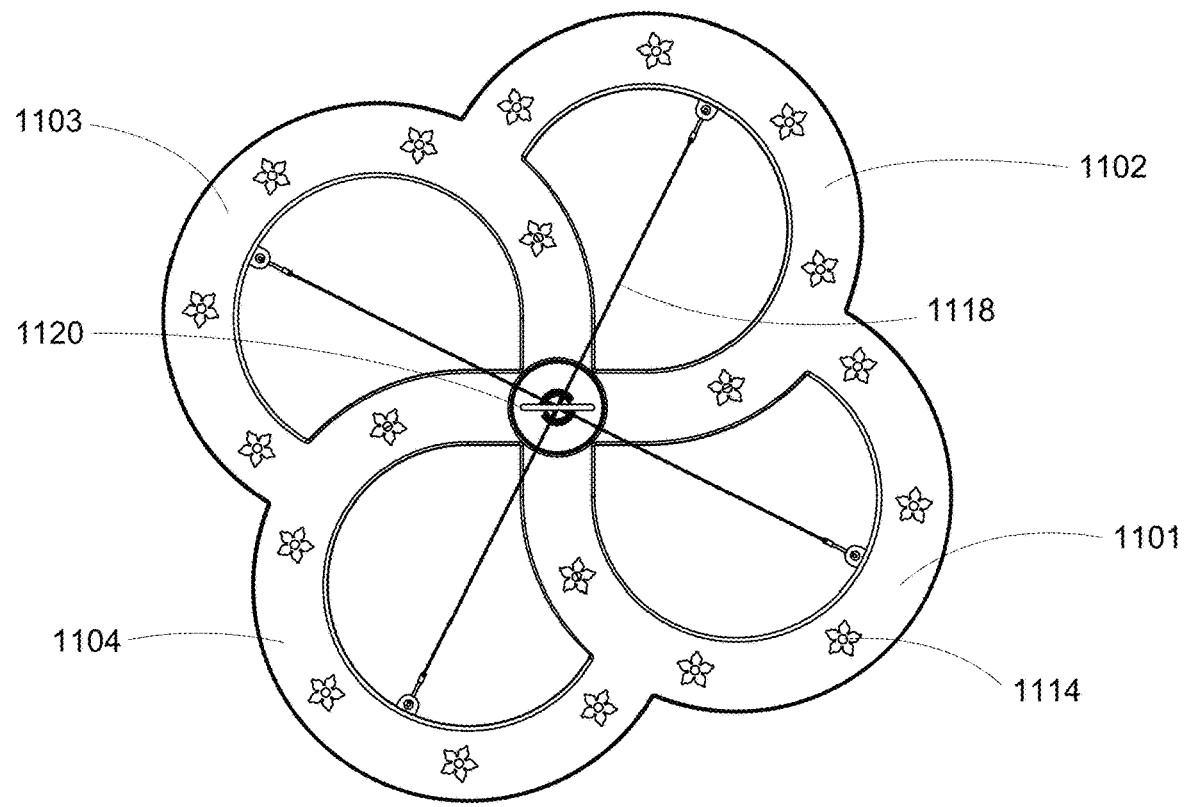
Figure 11C:
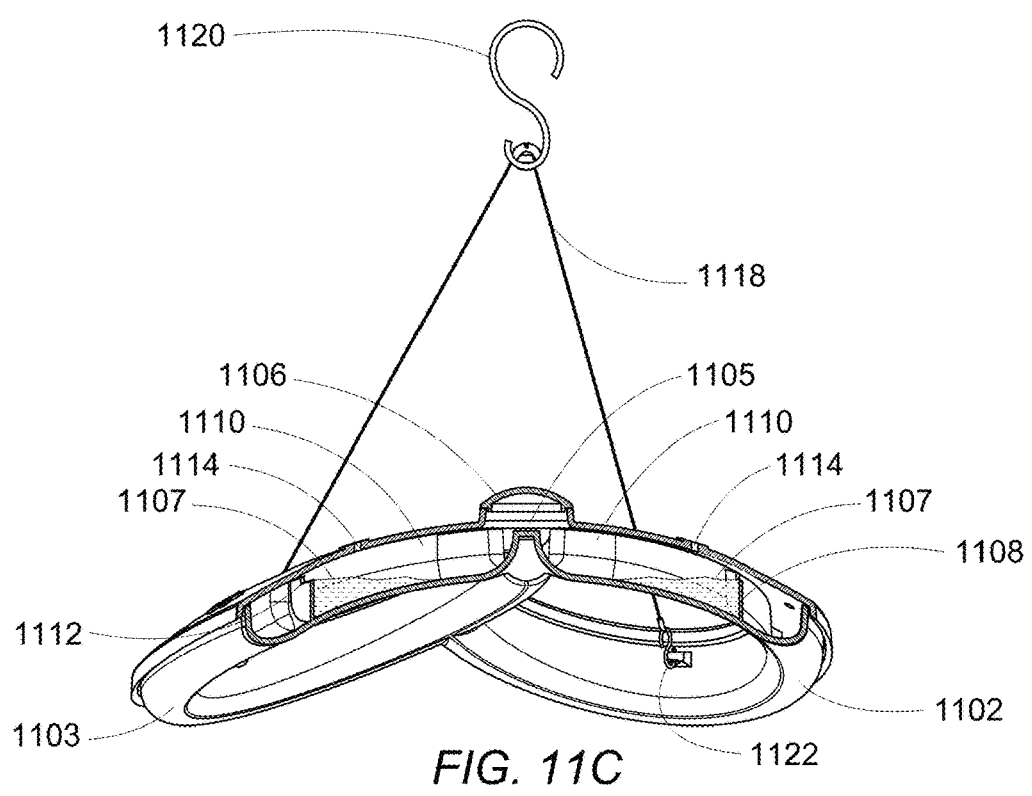

The illustrated birdfeeder 1000 also includes a number of receptacles 1007-1010. Each of the receptacles 1007-1010 is formed as a series of steps. When nectar is added to the central repository 1002, the nectar flows through notches or openings 1005 that allow nectar to flow from the repository 1002 into each of the receptacles 1007-1010. Each of the receptacles 1007-1010 includes partitions 1012 adjacent to but spaced from the walls of the housing 1001 forming the steps. As described above in connection with other embodiments, the partitions define feed chambers to support each of the feed ports 1016. Accordingly, nectar can be conveniently added via the central repository 1002 and then flows in cascading fashion through each of the receptacles 1007-1010 to fill all of the feed chambers associated with the feed ports 1016. FIGS. 11A-11C show another nectar birdfeeder 1100. The illustrated feeder 1100 is provided in the form of a cloverleaf with a number of receptacles sections 1101-1104 each connected to and in fluid communication with a central fill port 1105 accessed by way of a removable cover 1106. It will be appreciated that, due to the shape of the cloverleaf birdfeeder 1100, the outermost sections of the receptacles 1101-1104 are lower than the fill port 1105 such that nectar 1107 will flow from the fill port 1105 throughout the receptacles 1101-1104 under the influence of gravity.

The illustrated birdfeeder 1100 further includes a number of partitions 1108 defining feed chambers 1110. Each of the partitions includes an opening or notch 1112 to define a fill level for the associated chamber and to allow nectar 1107 to flow between chambers. Each chamber 1110 may include one or more feed ports 1114. The birdfeeder 1100 also includes a hanger assembly 1116. Hanger assembly 1116 includes a hook 1120 for hanging the birdfeeder 1100 on a support hook, a branch, or other support. The assembly 1116 also includes a number of support wires 1118, in this case, four support wires extending to the four receptacles 1101-1104. The wires 1118 are connected to the receptacles 1101-1104 by hooks 1122 connected to loops formed on the receptacles 1101-1104.

Figure 12A:
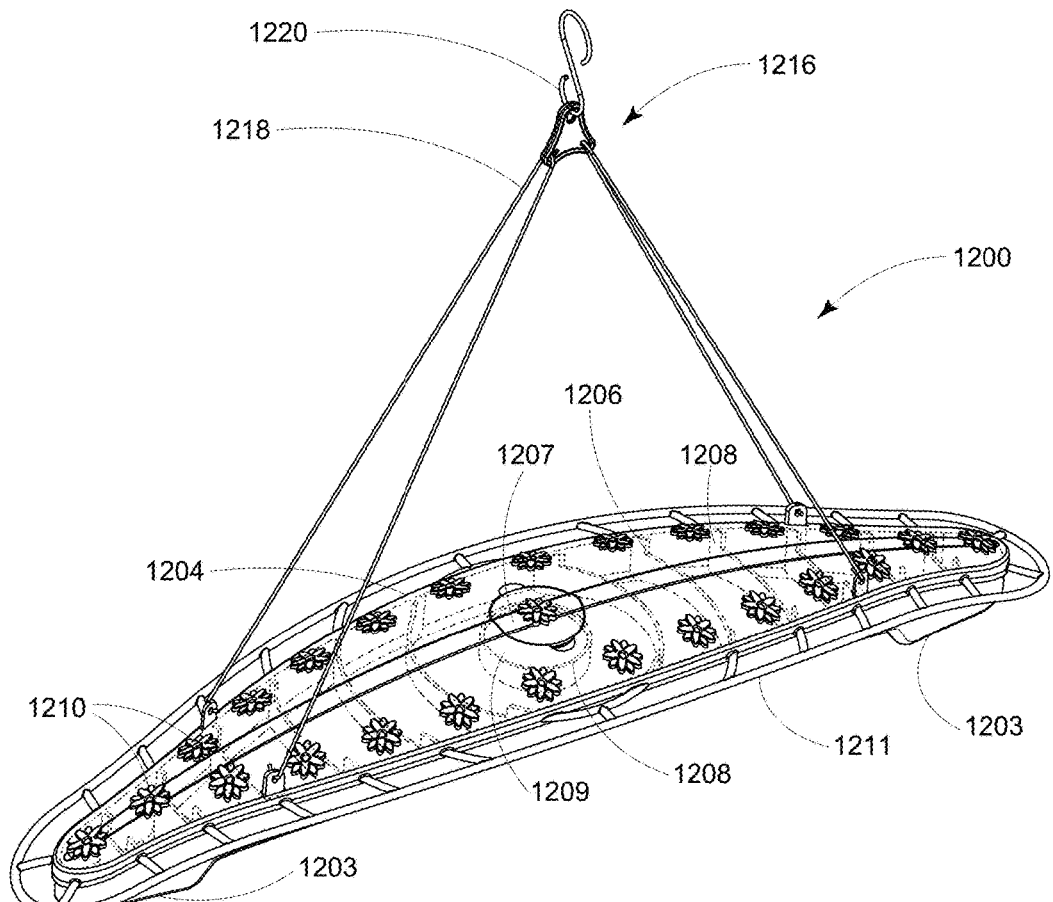
FIGS. 12A-12B show a lozenge nectar birdfeeder in accordance with the present invention.
Figure 12B:
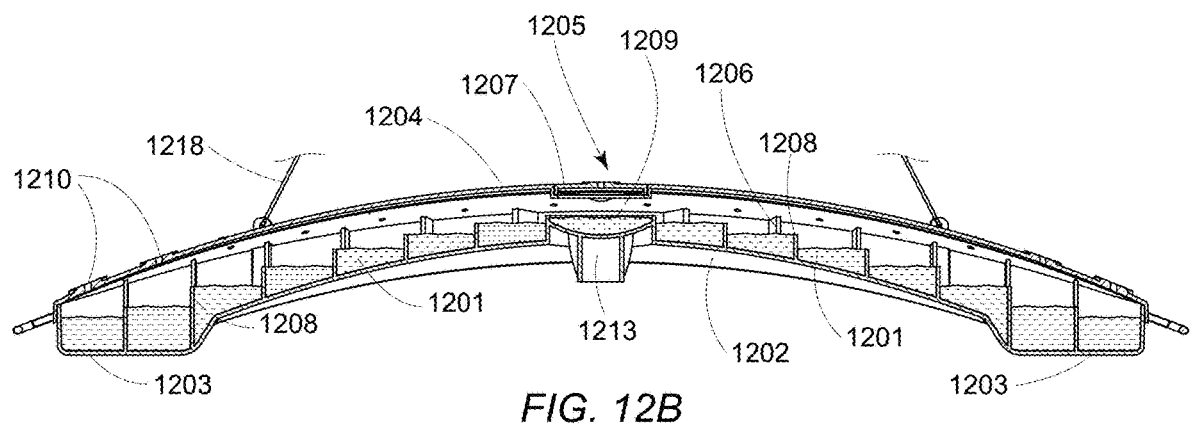

FIGS. 12A and 12B show a further nectar birdfeeder 1200 in accordance with the present invention. The birdfeeder 1200 includes a housing 1202 generally in the shape of a lozenge where the ends thereof 1203 are disposed at a lower elevation than a central portion of the housing 1202 in a display orientation. Nectar 1201 can be added to a central repository 1209 of the birdfeeder 1200 using a fill port 1205 accessed via a removable fill port cover 1207 which attaches to top cover 1204. The repository 1209 is defined by a generally circular partition 1208 which defines a fill level of the central repository 1209 and allows nectar to flow from the central repository to adjacent feed chambers. Successive feed chambers are defined by arcuate partitions 1208 with notches 1206. Each of the feed chambers, including the central repository 1209, includes one or more feed ports 1210. It will thus be appreciated that nectar can be added to the central repository 1209 via the fill port 1205 and then flows outwardly to successive feed chambers in a cascading fashion.

Hanger assembly 1216 includes a hook 1220 for hanging the birdfeeder 1200 on a support hook, a branch, or other support. The assembly 1216 also includes a number of support wires 1218, in this case, two looped wires extending to four mounts protruding through the top cover 1204. In this manner, the hanger wire 1214 can be hung over a hook, branch or other support and adjusted so that the housing 1202 hangs in a substantially level orientation. Additionally, a cylindrical pocket 1213 is formed as a feature of housing 1202 to permit the bird feeder to be mounted directly to a ground-mounted post instead of hanging if desired.

The illustrated birdfeeder 1200 further includes a number of feed ports 1210 that can be accessed by a bird resting on the perches 1211. In this case, the perches 1211 are formed as a continuous rail around the entire perimeter of the feeder, however, perches could also be provided only in proximity to the feed ports 1210.

Figure 13:
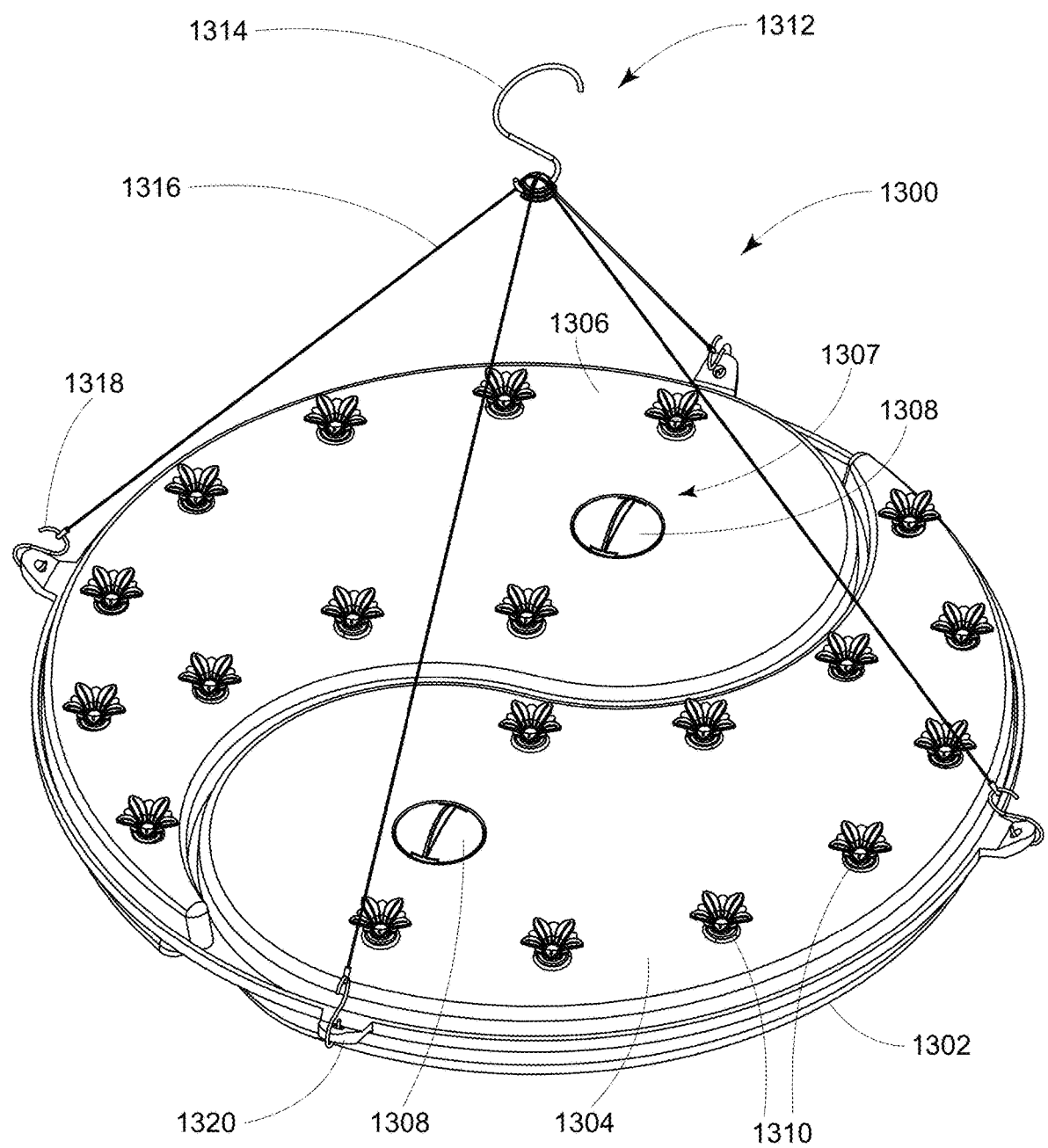
FIG. 13 shows a yin-yang nectar birdfeeder in accordance with the present invention.

FIG. 13 shows a still further nectar birdfeeder 1300 in accordance with the present invention. The birdfeeder 1300 includes a housing 1302 generally formed in a yin-yang configuration. The housing includes first and second nectar receptacles 1304 and 1306. The receptacles 1304 and 1306 can be filled via fill ports 1307 accessed via removable covers 1308. Each of the receptacles 1304 and 1306 includes a number of feed ports 1310. In the illustrated embodiment, there is little elevation difference between the feed ports in each of the receptacles 1304 and 1306. Accordingly, the birdfeeder 1300 may be implemented without providing partitions to separate each of the receptacles 1304 and 1306 into multiple feed chambers. However, if desired, one or more partitions may be provided in each of the receptacles 1304 and 1306 to divide each of the receptacles 1304 or 1306 into upper, lower and, optionally, intermediate feed chambers.

The illustrated birdfeeder 1300 also includes a hanger assembly 1312. The hanger assembly includes a hanging hook 1314 and a number of hanging wires 1316. The hook 1314 allows the birdfeeder 1300 to hang on a support hook, a branch, or other support. Each of the wires 1316 is connected to a support 1320 formed on the housing 1302 via a hook 1318. The illustrated assembly 1312 uses for wire segments extending from the hook 1314 to the hook 1318. These may be implemented, for example, using two or four wires.

Figure 14A:
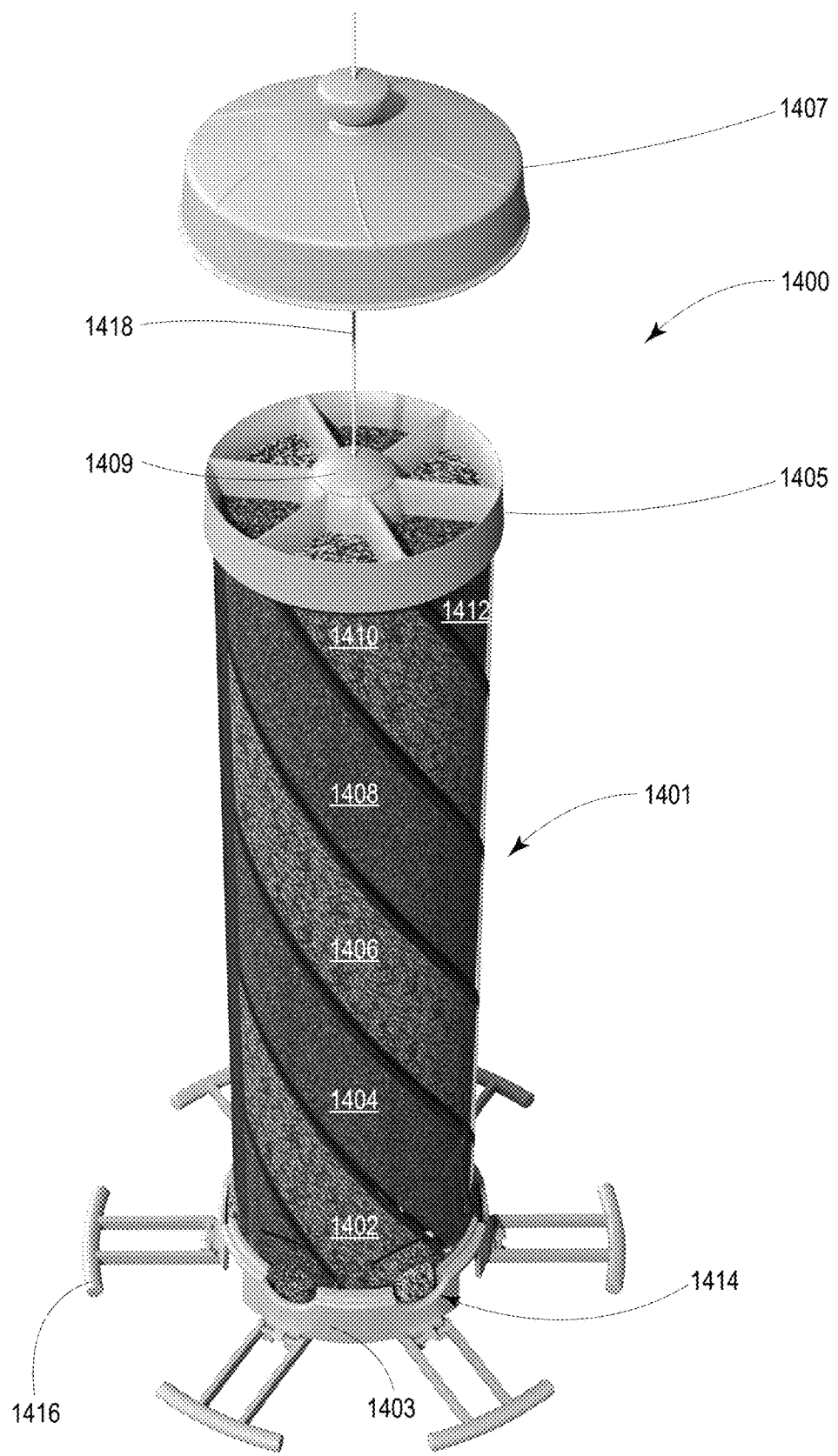
FIGS. 14A-14B show an auger-style seed birdfeeder with helical feed chambers in accordance with the present invention.
Figure 14B:
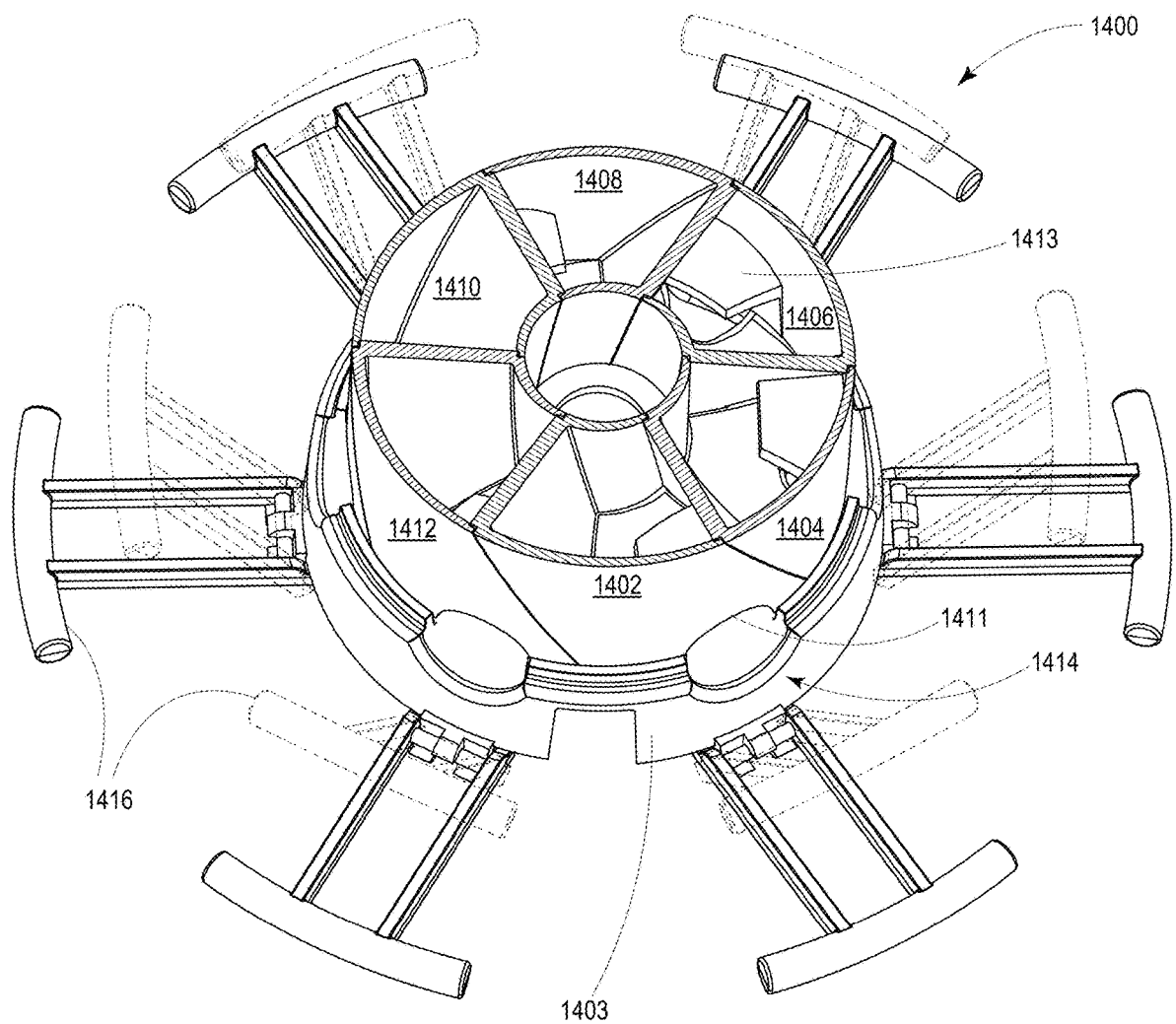

FIGS. 14A and 14B disclose a seed birdfeeder 1400 in accordance with the present invention. The birdfeeder 1400 includes a cylindrical housing assembly 1401 formed by discrete interlocking helical receptacles 1402, 1404, 1406, 1408, 1410, and 1412. The receptacles are assembled to define an overall auger appearance by the base 1403 and upper cap 1405, which also acts as a funnel to guide the seed into the individual receptacles. Seed can be added to the birdfeeder 1400 by lifting the cover 1407 disposed at a top end of the housing. A semi-spherical plug 1409 guides the seed into the various receptacles. The cover 1407 includes a central opening to allow passage of a hanger wire 1418.

As illustrated in FIG. 14A, the present invention uniquely permits different seeds or seed mixes to be added to each of the receptacles 1402, 1404, 1406, 1408, 1410, and 1412, which can attract different bird species, a result often desired by users and unavailable with traditional seed bird feeders. This helical fill process is also visually appealing and entertaining. In this regard, the receptacles 1404, 1406, 1408, 1410, and 1412 may be formed from translucent or substantially transparent materials.

Feed ports 1414 are provided at a bottom of the receptacles 1402, 1404, 1406, 1408, 1410, and 1412 to provide access to the feed. Perches 1416 are provided at least adjacent each of the feed ports 1414 to support birds while feeding. In this embodiment, the perches 1416 are hinged to allow them to be repositioned vertically, thus reducing the space required for storage, shipping and packaging.

As illustrated in FIG. 14B, an isometric section view, each interlocking receptacle 1402, 1404, 1406, 1408, 1410, and 1412 includes an opening 1411 and baffle 1413 which together with matching recesses in the base 1403 forms the feed port 1414.

Figure 15:
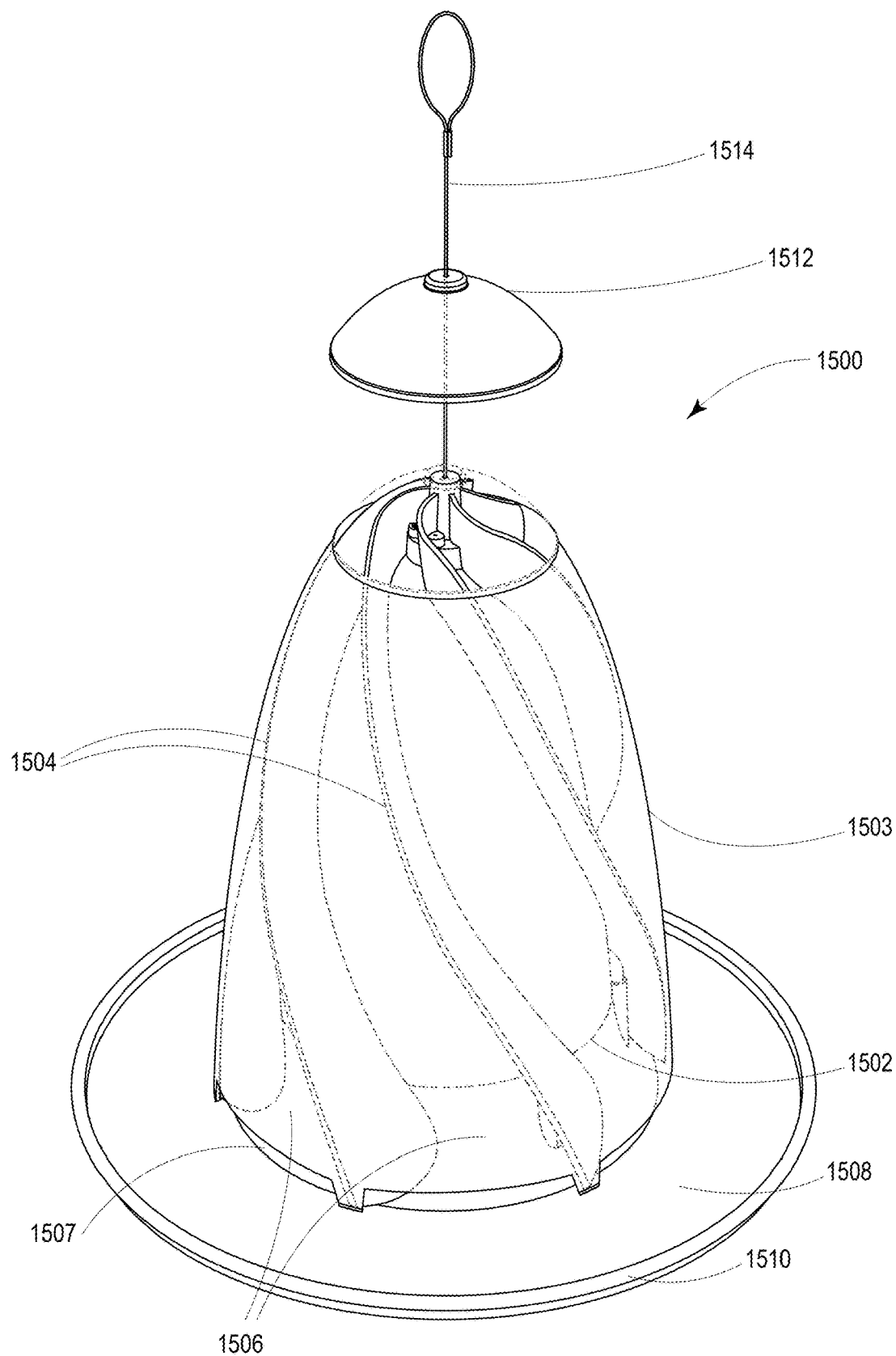
FIG. 15 shows an elliptical shape seed birdfeeder with helical feed chambers in accordance with the present invention.

FIG. 15 shows a further embodiment of a seed birdfeeder 1500 in accordance with the present invention. The birdfeeder 1500 generally includes an elliptical or hat shaped housing 1502. A number of helical dividers 1504 are provided to define separate seed chambers 1506. Feed ports 1507 provided at the bottom of the receptacles 1506 allow seeds to spill onto a tray 1508 disposed about the periphery of the housing 1502. Birds can rest on a continuous perch 1510 to feed on seeds that spill onto the tray 1508. If desired, different seeds or seed mixes may be added to different ones of the receptacles 1506 for an interesting and attractive appearance as well as to attract different species of birds. Seed can be added to the feeder 1500 by lifting the cover 1512 to access a fill port. An opening is provided in the cover 1512 to allow passage of a hanger wire 1514.

Figure 16A:
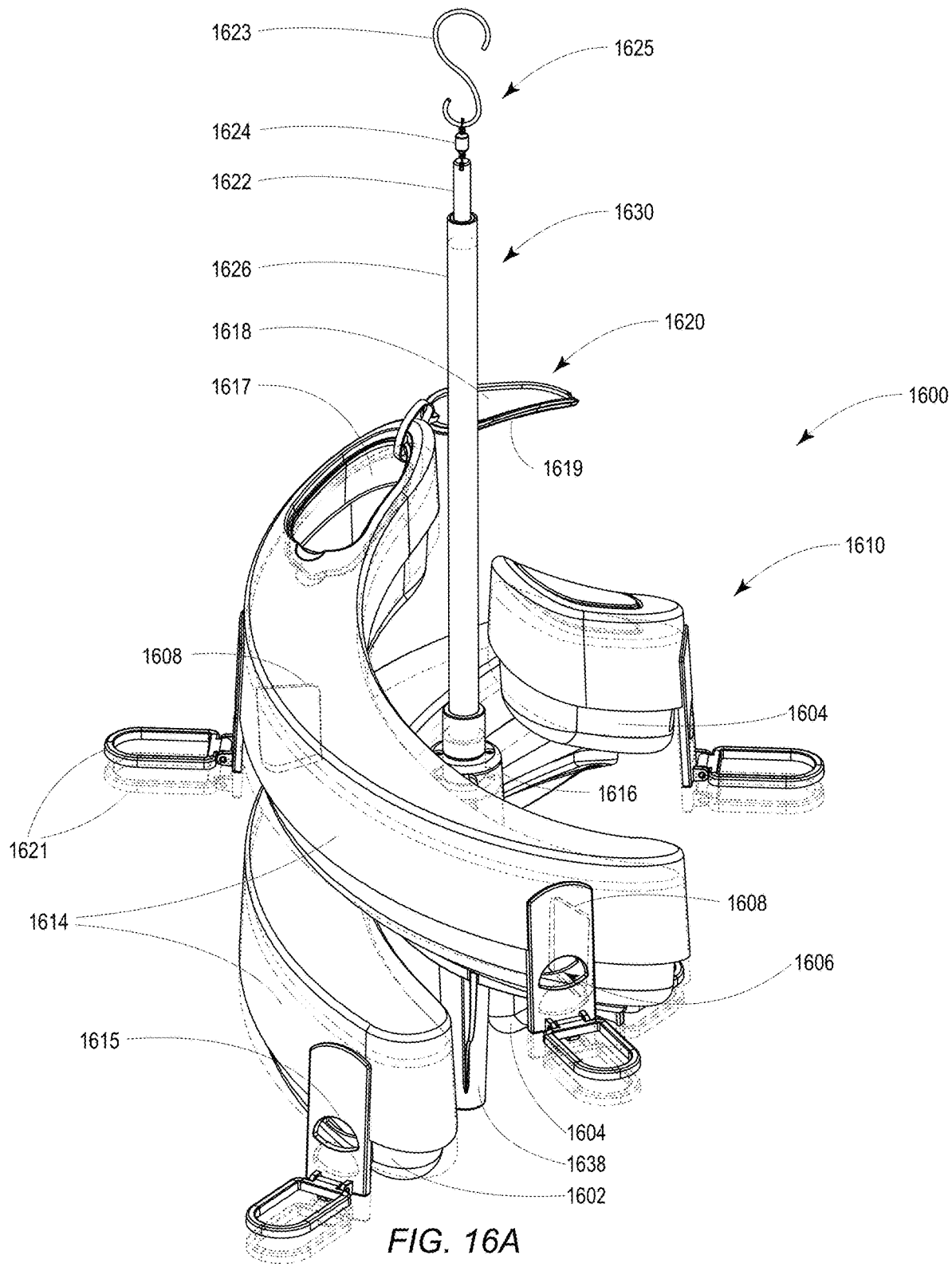
FIGS. 16A-16C show a double helix seed birdfeeder with a squirrel guard feature in accordance with the present invention.
Figure 16B:
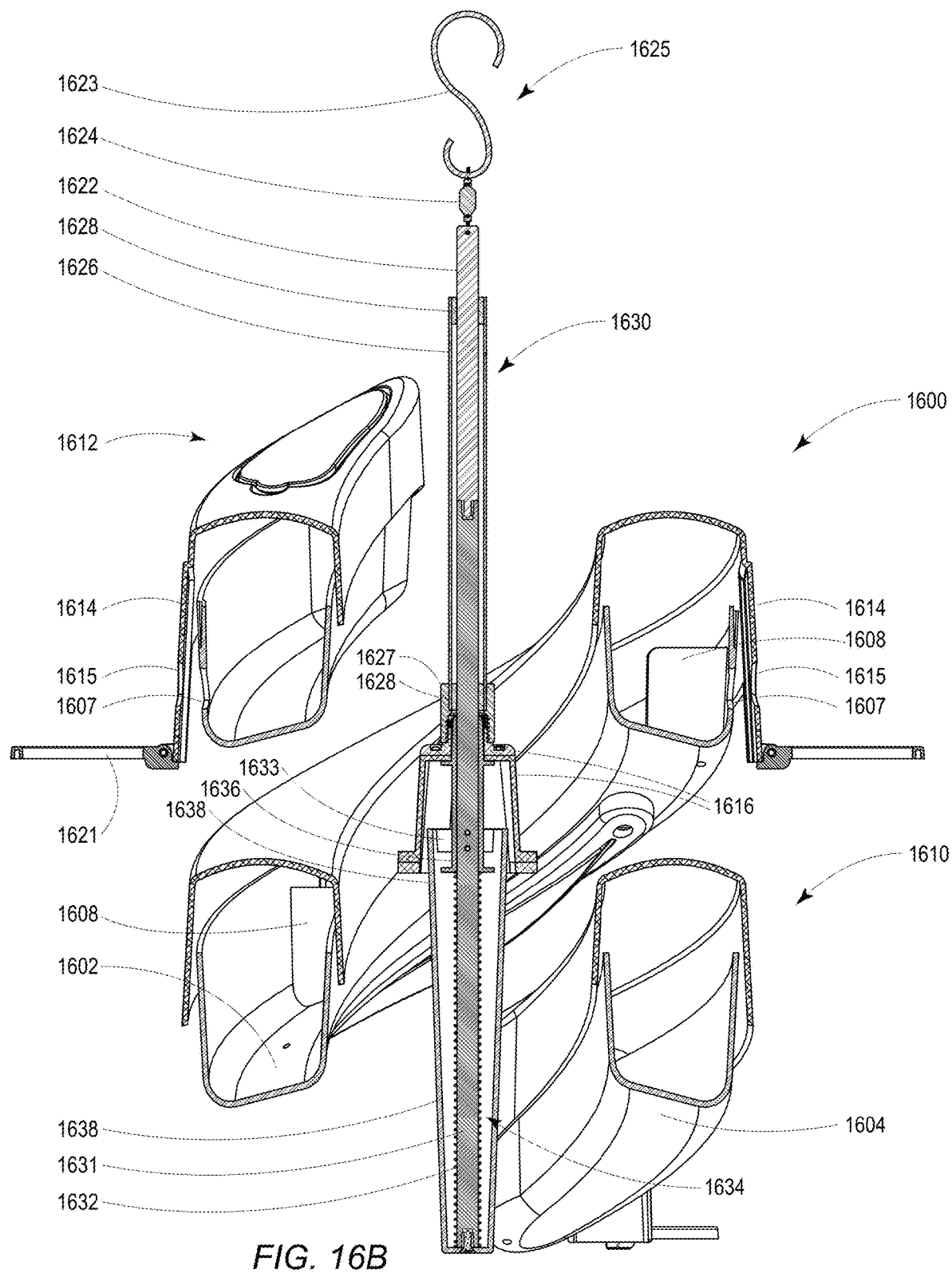
Figure 16C:
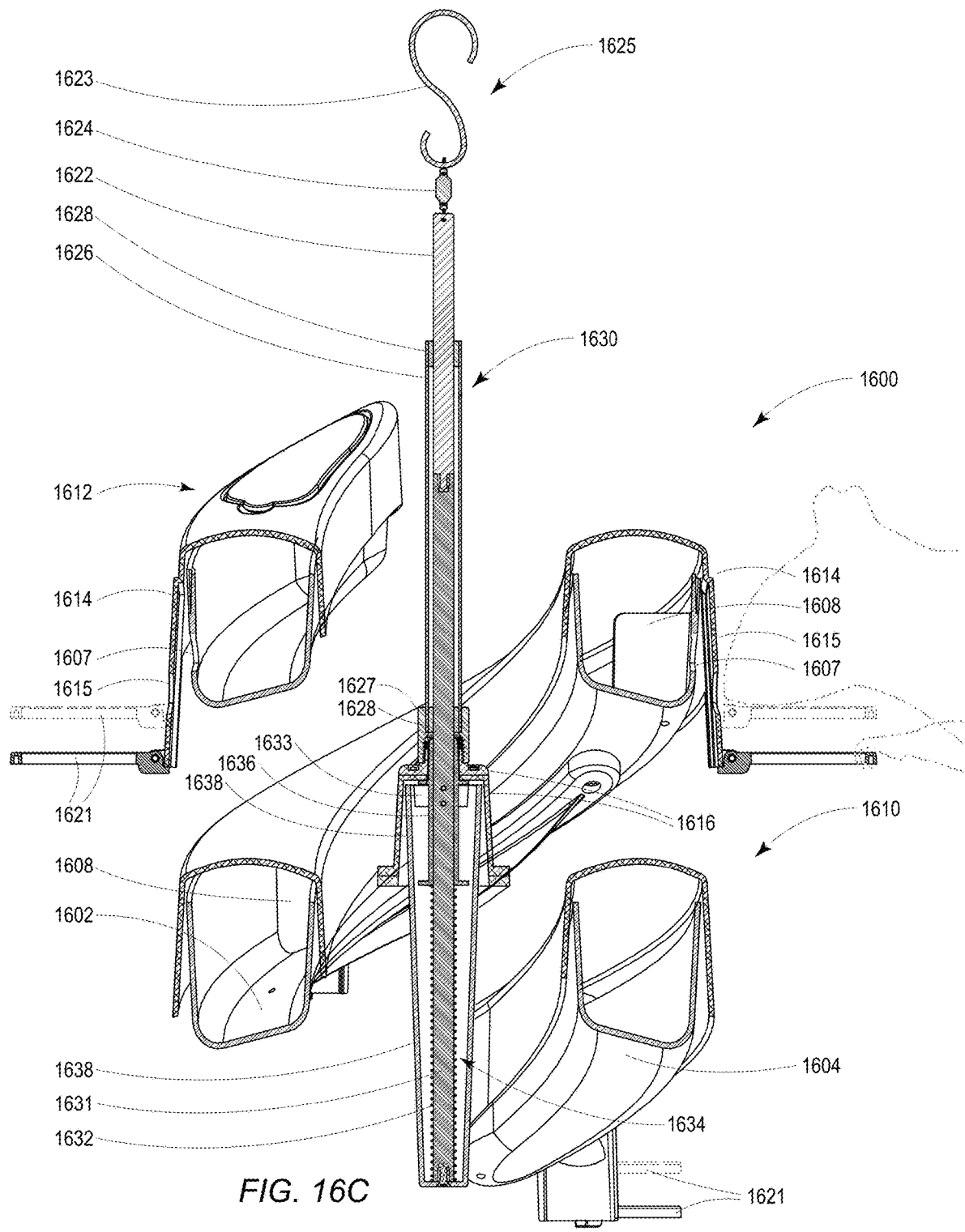

FIGS. 16A-16C show a seed birdfeeder 1600 including a squirrel shield assembly 1610 in accordance with the present invention. The illustrated birdfeeder 1600 generally has a double helix configuration similar to the embodiment of FIG. 8. However, in this case, a squirrel shield assembly 1610 extends over the receptacles 1602 and 1604 as well as the feed ports 1606 formed by feed port openings 1607. Seed is added to the birdfeeder 1600 at the fill port 1617 and flows through the receptacles 1602 and 1604 over the partitions 1608. The shield assembly 1610 moves up and down relative to the receptacles 1602 and 1604. When the shield assembly 1610 is in the raised position, as shown in FIG. 16B, the feed ports 1606 are exposed so that birds can access feed in the receptacles 1602 and 1604. When the shield assembly 1610 is in the lowered position, as shown in FIG. 16C, the shield assembly 1610 blocks the feed ports 1606 so that the feed cannot be accessed. As will be described in more detail below, a spring biases the shield assembly 1610 towards the raised position. However, when a squirrel exerts pressure on the shield assembly 1610 (including the shields 1614 and perches 1621), the shield assembly 1610 moves to the lowered position so that the squirrel cannot access the feed. This provides a disincentive for squirrels to climb onto the birdfeeder 1600, thereby avoiding damage to the birdfeeder 1600 as well as the waste and nuisance associated with spilling the feed.

The birdfeeder 1600 is formed from a number of assemblies including the spring post assembly 1634, the feeder hanger assembly 1625, the shield assembly 1610, the fill port assembly 1620, and the sleeve assembly 1630. All of the elements of the shield assembly 1610 move, as a unit, up and down in relation to the receptacles 1602 and 1604. The elements of the shield assembly 1610 comprise the shield subassembly 1612 including shields 1614, shield openings 1615 at the feed ports 1606, a center support 1616 for attaching the shield elements together, and the fill port opening 1617 to provide access to the fill port.

The fill port assembly 1620 includes a fill port 1618 and a fill port shield 1619. The fill port 1618 may be formed from a molded elastomer and includes an integral tether for retention. The fill port 1618 is dimensioned to provide a friction fit relative to the fill port opening 1617 so as to provide a seal against the elements. The fill port shield 1619 may be formed from metal or other material that is resistant to chewing by squirrels.

This sleeve assembly 1630 includes a sleeve nut 1627, a post sleeve 1626 and a sleeve bushing 1628. The sleeve nut 1627 is a knurled nut designed for hand tightening by a user. The post sleeve 1626 is dimensioned for a press fit into the sleeve nut 1627. The sleeve bushing 1628 press fits into the top and bottom sleeves.

The hanger assembly 1625 includes a spring post extender 1622, a hanger S-hook 1623 and a split ring swivel 1624. The S-hook 1623 allows the birdfeeder 1600 to be hung on a hook, branch, or other support. The swivel 1624 allows the birdfeeder 1600 to swivel in relation to the hook 1623.

The spring post assembly 1634 includes a spring post 1631, a helix compression spring 1632 and a spring post holder 1633. The illustrated birdfeeder 1600 further includes a spring top bushing 1636 and at lower housing support 1638. It will be appreciated that the spring 1632 thereby biases the shield assembly 1610 towards the raised position in relation to the receptacles 1602 and 1604 until the spring is compressed by the weight of a squirrel.

FIGS. 17A through 17E show another embodiment of a seed birdfeeder 1700 with a squirrel guard assembly 1730. The illustrated birdfeeder 1700 includes a cylindrical housing assembly 1701 formed by discrete interlocking helical receptacles 1702, 1704, 1706, 1708, 1710, and 1712, assembled together by a base 1703 and upper cap 1705, which also acts as a funnel to guide the seed into the individual receptacles. The housing assembly 1701 is similar to that described above in connection with FIGS. 14A and 14B, but also includes one or more torsion spring brackets 1727 and a base plate 1728. The base plate 1728 provides a stable surface, independent of the movable squirrel guard assembly 1730, on which the feeder may be placed, for instance during the addition of seed.

Figure 17A:
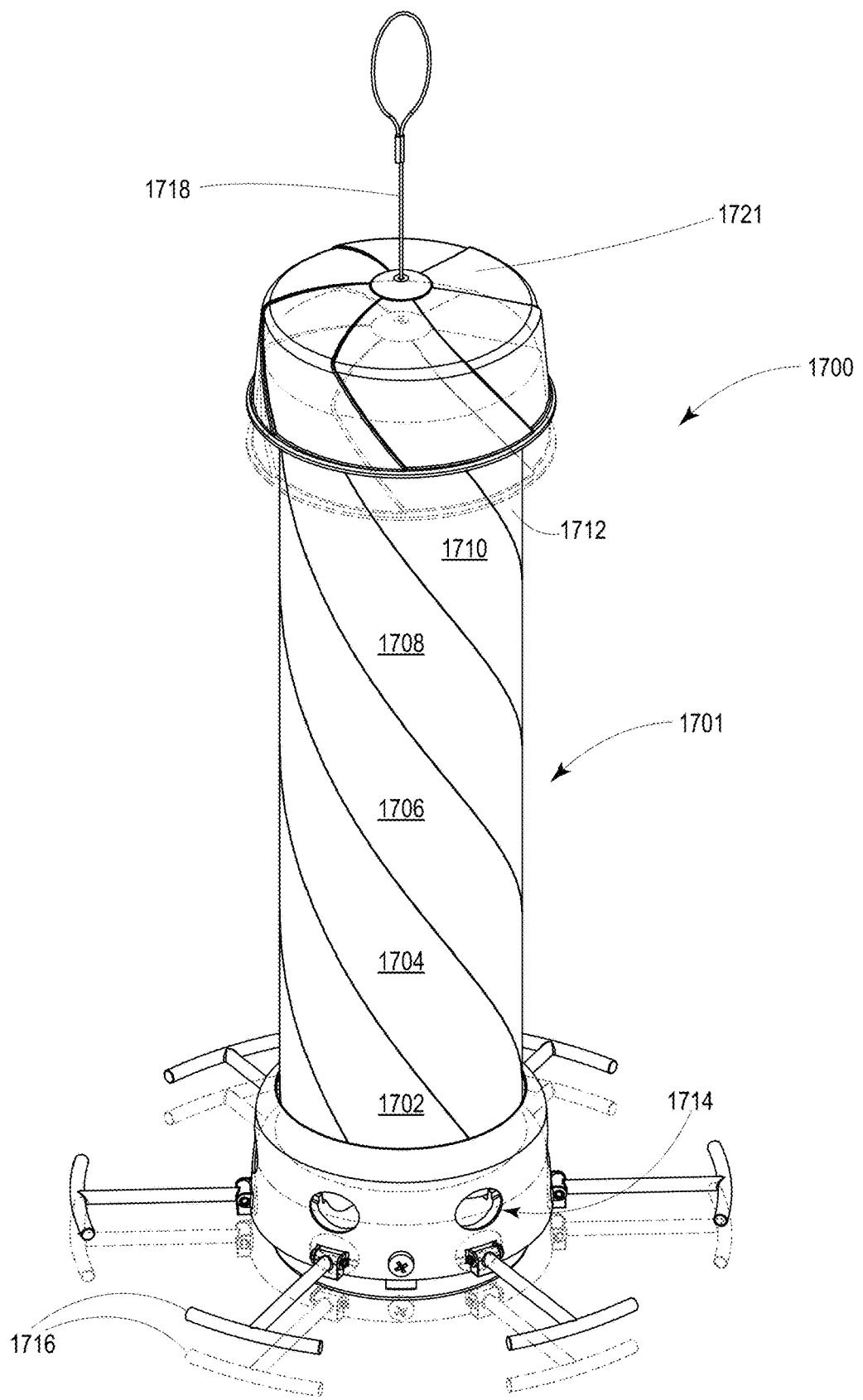
FIGS. 17A-17E show an auger seed birdfeeder with a squirrel guard feature in accordance with the present invention.
Figure 17B:
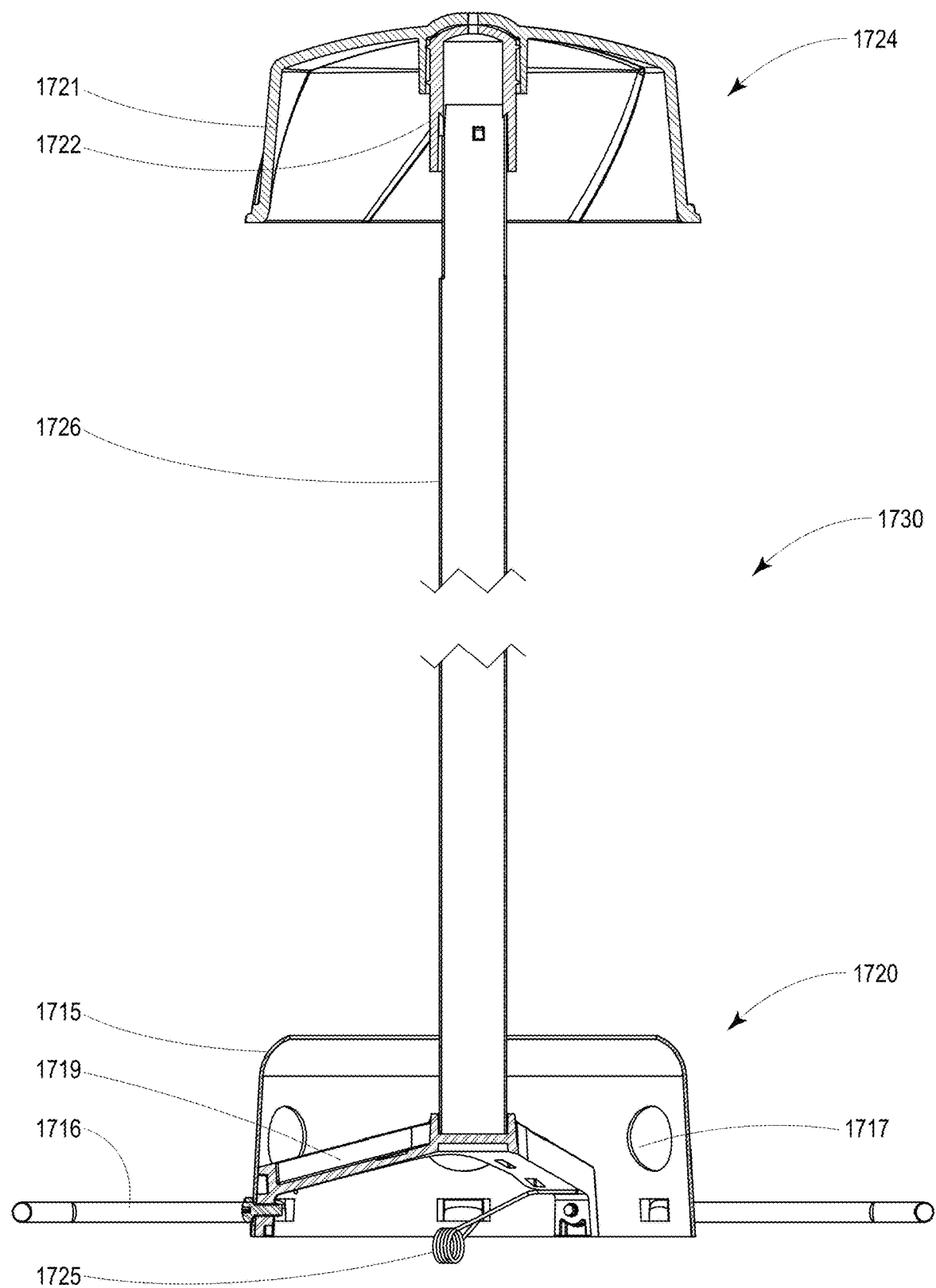

As shown in FIG. 17B, a sectional view with the non-moving components of the feeder hidden, the squirrel guard assembly 1730 includes a lower shield assembly 1720, an upper shield assembly 1724, and a connecting member 1726. The lower shield assembly 1720 is composed of a lower shield 1715, perches 1716, and a shield frame 1719. The lower shield 1715 and shield frame 1719 are rigidly attached using screws, snaps or similar methods. The lower shield 1715 includes a number of openings 1717 that are generally aligned with the feed ports 1714 of the birdfeeder housing, allowing birds to feed through the shield openings and into the feed ports. The upper shield assembly 1724 is composed of a roof 1721 and connecting member cap 1722. The connecting member 1726 is primarily vertical and rigidly connects the lower shield assembly 1720 and upper shield assembly 1724, so that if excess weight is applied to any of the components, the entire squirrel guard assembly 1730 is activated. In this embodiment, the connecting member 1726 is shown as a hollow tube but may also be a solid rod or similar. The connecting member cap 1722 is attached rigidly to the upper end of the connecting member 1726 and not only acts to connect the upper and lower shield assemblies, but also acts as a stop to limit the downward travel of the entire squirrel guard assembly 1730. The roof 1721 is removably attached to the connecting member cap 1722 to permit adding seed to the feeder.

Figure 17C:
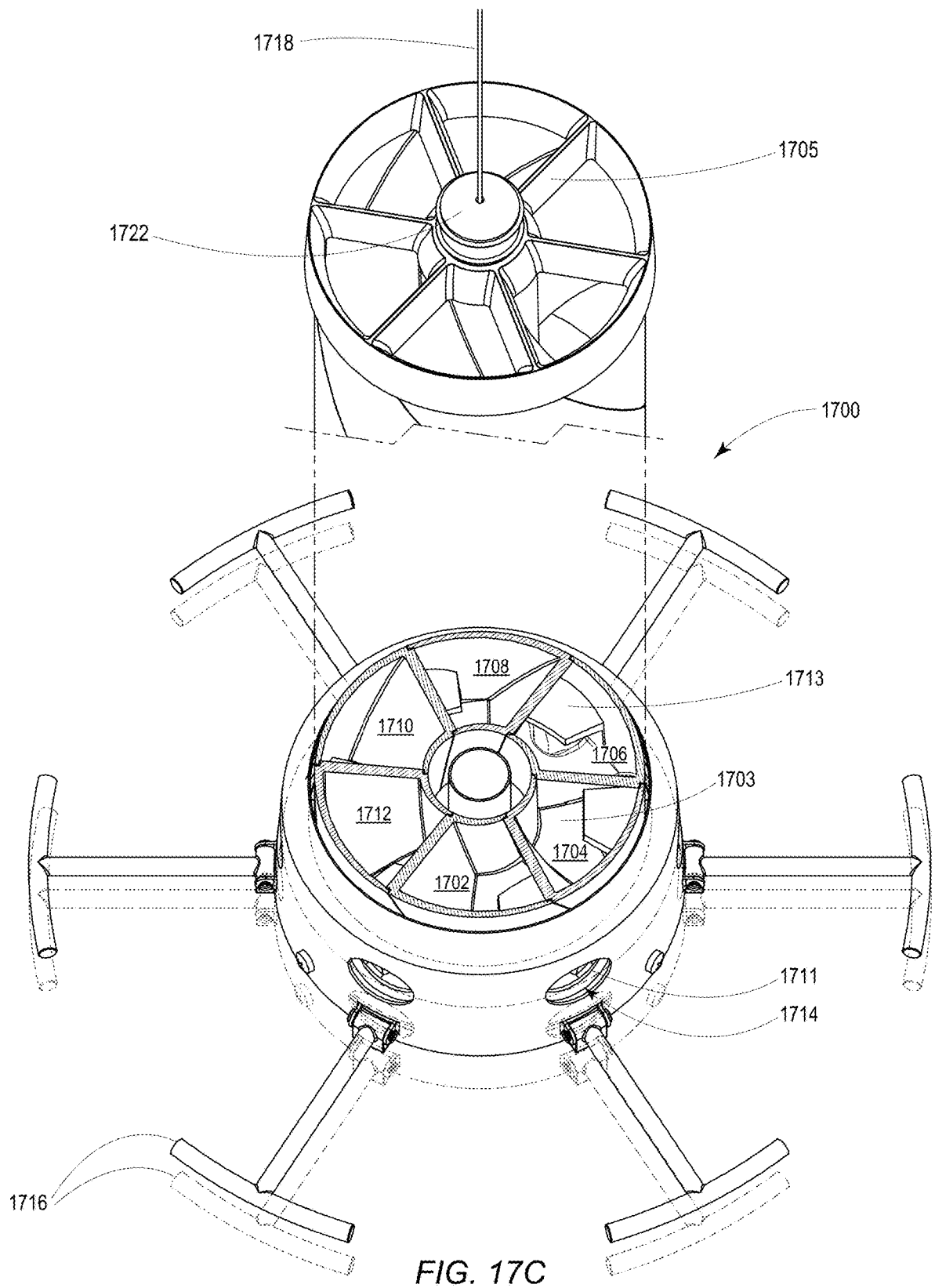

As illustrated in FIG. 17C, an isometric section view, each interlocking receptacle 1702, 1704, 1706, 1708, 1710, and 1712 includes an opening 1711 and baffle 1713 which together with a recess in the base 1703 forms the feed port 1714. Also visible in FIG. 17C is the lower shield assembly 1720 in its normal feeding position and in a lower position, shown in dashed lines, in which the feed ports 1714 are inaccessible.

Figure 17D:
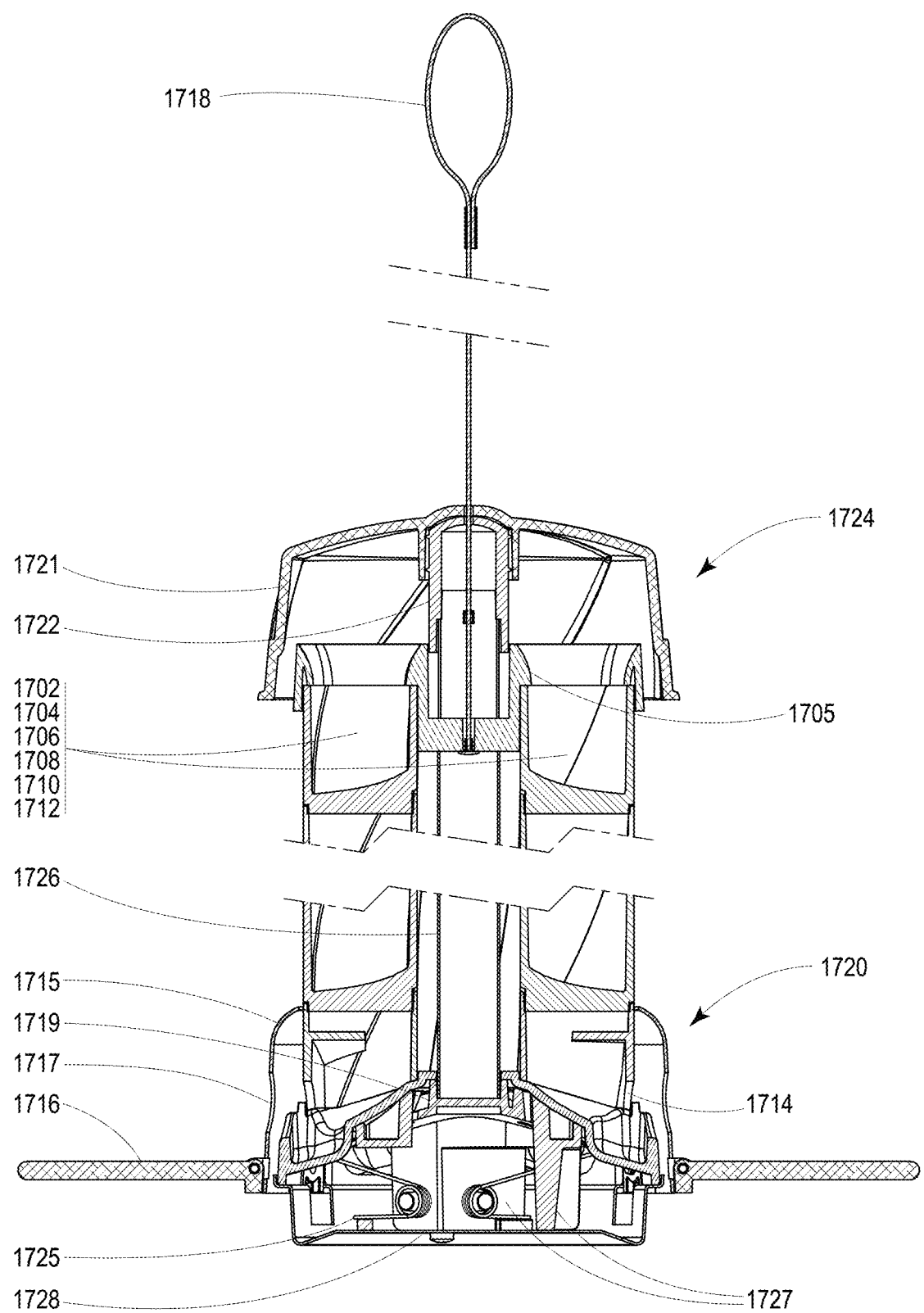
Figure 17E:
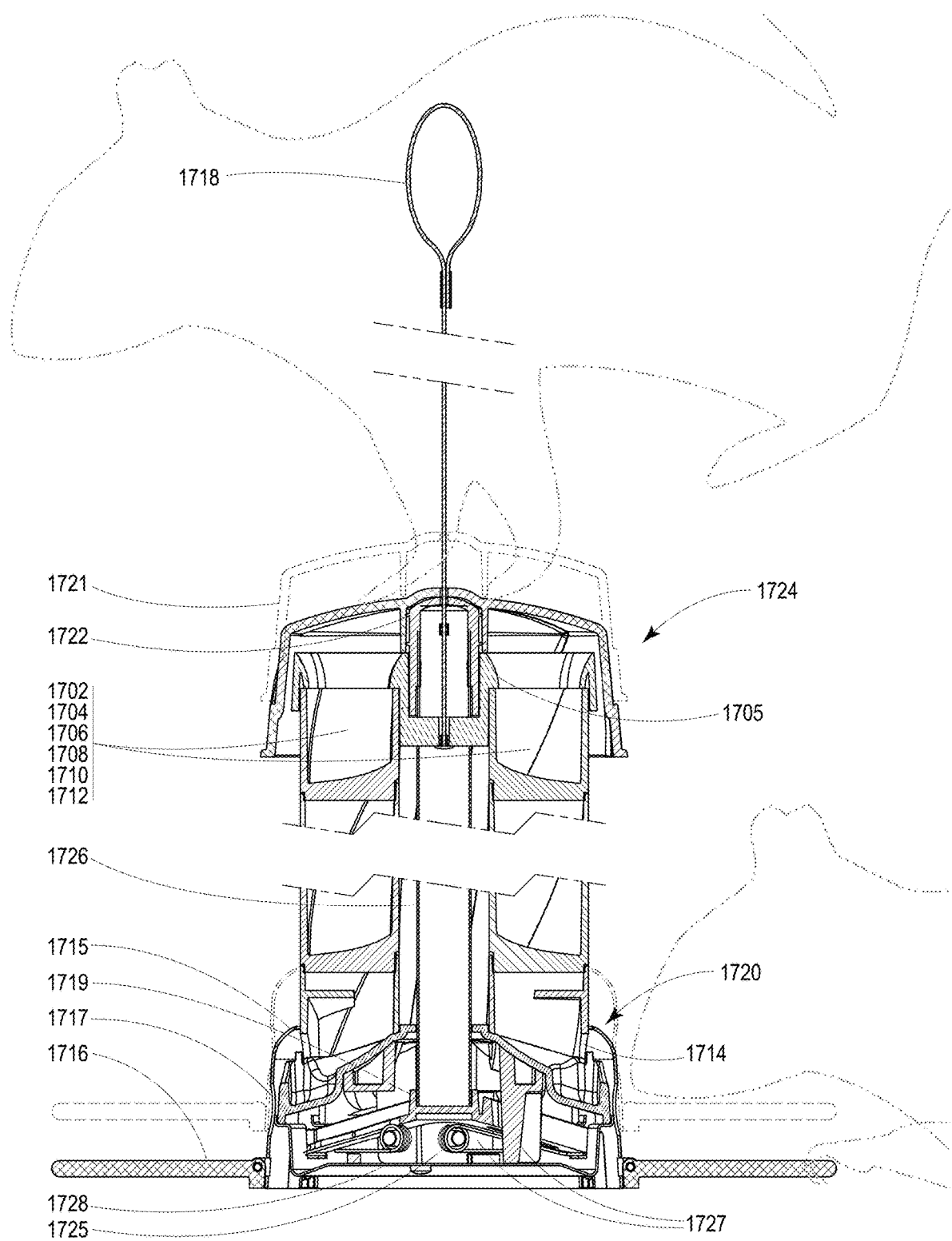

As described in FIGS. 17D and 17E, the hanging wire 1718 is attached to the upper cap 1705 so that the weight of the entire housing assembly 1701 is supported from a hook, branch or similar. The squirrel guard assembly 1730 is mounted so it can move up and down relative to the housing assembly 1701. For example, the squirrel guard assembly 1730 may be resiliently interconnected to the housing assembly 1701 so that the squirrel guard assembly 1730 is biased towards the open position via one or more torsion springs 1725 but moves to the closed position when the weight of a squirrel or other nuisance animal is exerted on the roof 1721 or any one of the perches 1716. In this manner, all of the feed ports are rendered inaccessible when a squirrel attempts to access the feed ports from above or below, as illustrated in FIG. 17E. Although this embodiment is illustrated with multiple torsion springs to provide a balanced force against the squirrel guard assembly 1730, a similar effect could be achieved with a single torsion spring, compression spring or tension spring with appropriate changes in related part design.

FIGS. 18A-18D show a still further embodiment of a nectar birdfeeder 1800 in accordance with the present invention. The birdfeeder 1800 includes a receptacle 1801 formed as a series of cups 1802, 1804, 1806, 1808 and 1810 interconnected by passageways 1803 extending from a slight recess 1805 in the upper cup 1802 to the next lower cup 1804 and so on. The uppermost cup 1802 includes a cover 1812 that can be removed or pivoted on a hinge to open the cover 1812 so as to add nectar 1807 to the receptacle 1801. Each remaining cup 1804, 1806, 1808 and 1810 has a cover 1814 which includes a primarily vertical enclosure wall 1815 which extends up against the underside of the next higher cover 1812 or 1814. These walls 1815 along with matching features in cups 1802, 1804, 1806, 1808 and 1810 create the various passageways 1803 between cups.

Figure 18A:
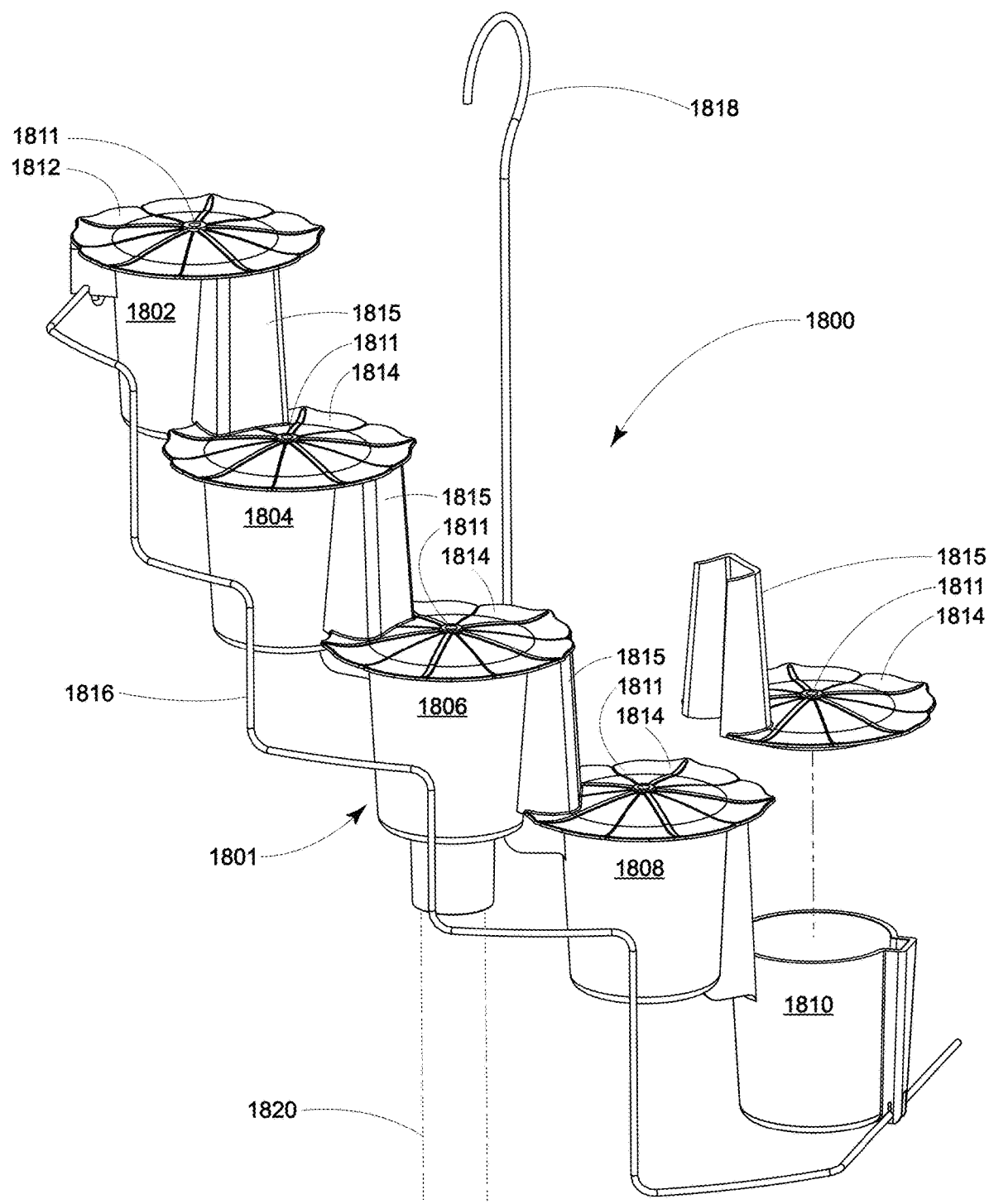
FIGS. 18A-18D illustrate a nectar birdfeeder configured as a series of cups in accordance with the present invention.
Figure 18B:
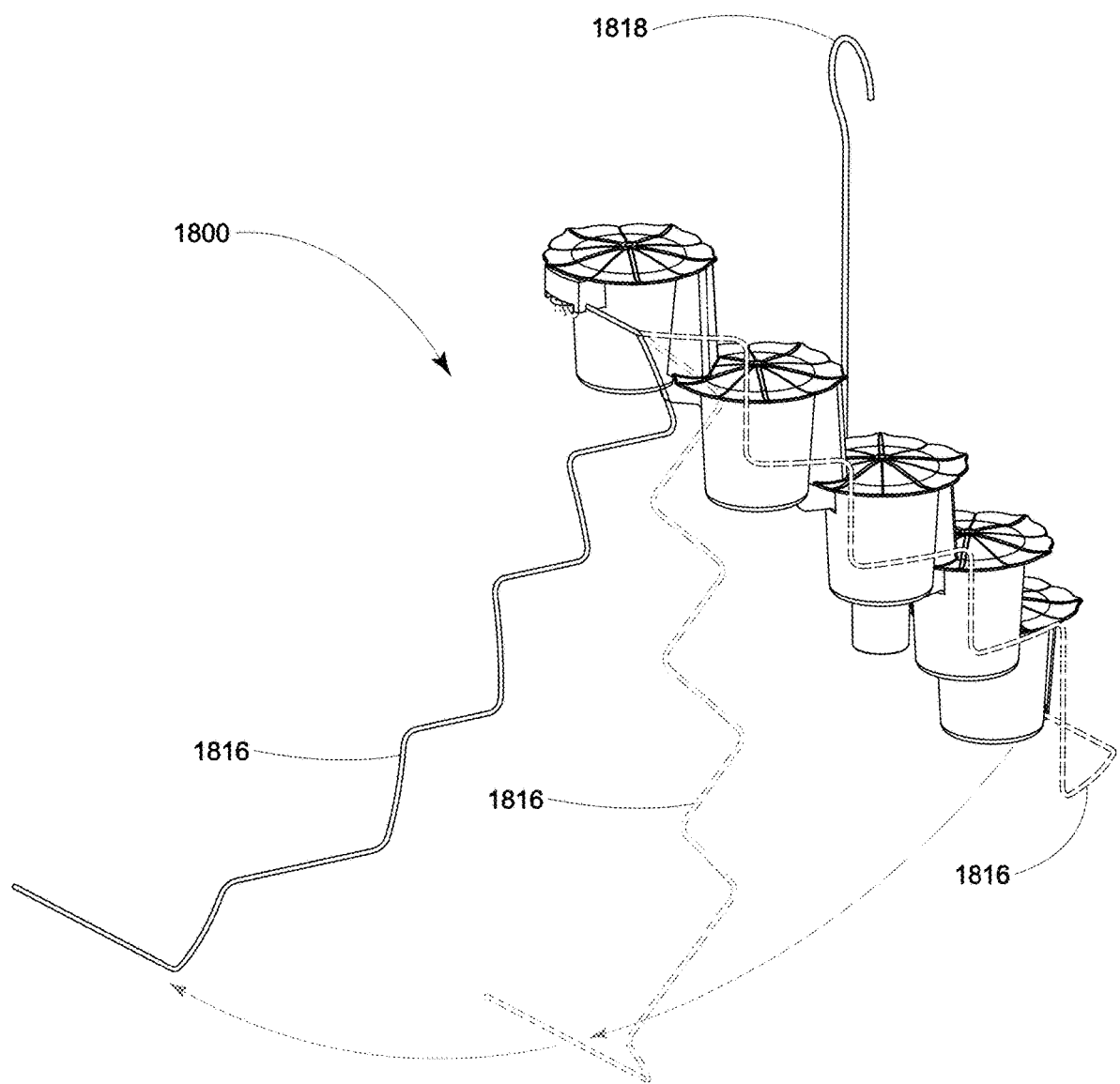
Figure 18C:
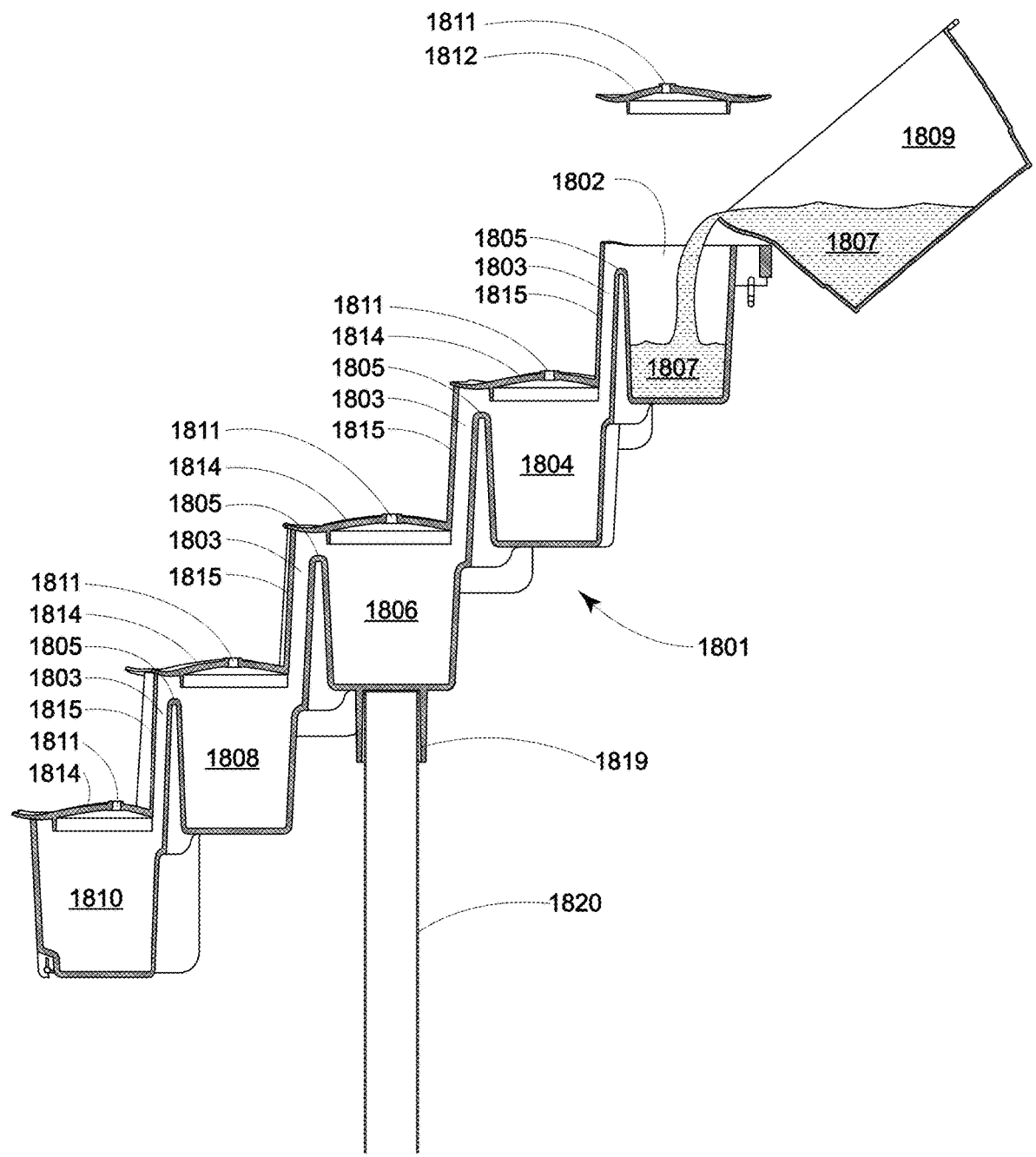
Figure 18D:
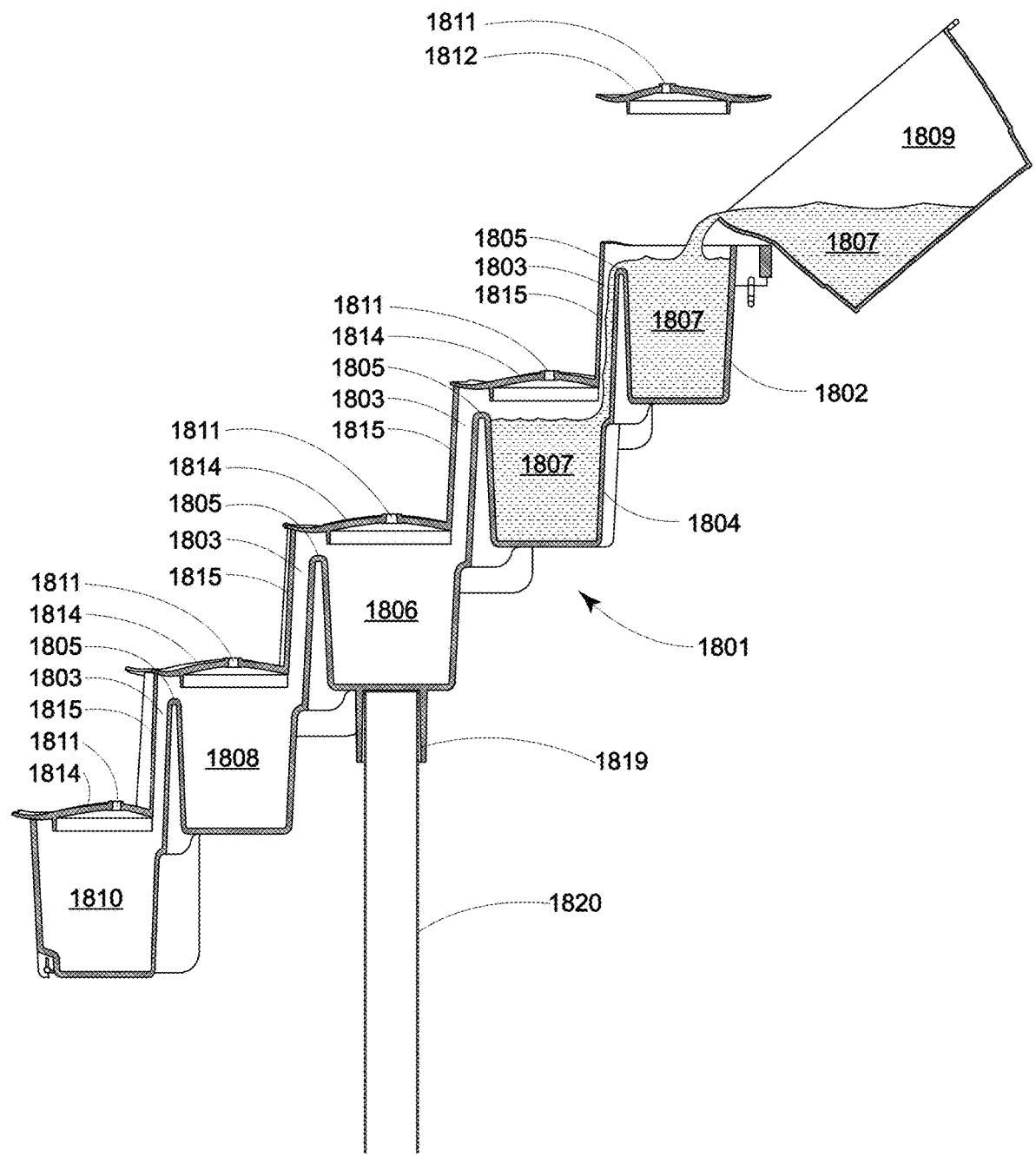

Referring to FIG. 18C, the nectar 1807 is poured into cup 1802 from vessel 1809. As shown in FIG. 18D, as nectar 1807 continues to be poured, it will then flow over the cup recess 1805 and into the next cup 1804. As nectar 1807 continues to be added, all downstream cups will be filled in this waterfall fashion.

The illustrated birdfeeder 1800 includes a number of feed ports 1811 on covers 1812 and 1814 of the receptacles 1802, 1804, 1806, 1808 and 1810. The feed ports 1811 include an opening dimensioned to allow a hummingbird to insert a portion of its beak or tongue to access feed in an interior of the receptacle 1801.

The illustrated birdfeeder 1800 also includes a support 1816. The support is pivotally mounted on the uppermost cup 1802 of the birdfeeder 1800 so that it can move between a deployed position, as shown in FIG. 18A and a stowed position as shown in FIGS. 18B-18C. In the deployed position, the support 1808 provides support for the birdfeeder in an upright position for refilling. In the stowed position, the support 1808 provides horizontal perches adjacent to each of the cups 1802, 1804, 1806, 1808 and 1810.

FIGS. 18A-18C show different mounting configurations for the birdfeeder 1800. Specifically, FIG. 18A shows a centrally disposed mounting hook 1818 that can be used to hang the birdfeeder 1800 from a branch, hook or other support. FIG. 18C includes a centrally disposed recess 1819 for mounting on a post 1820.

FIGS. 19A-20B illustrate a seed birdfeeder 1900 incorporating a squirrel guard in accordance with the present invention. The birdfeeder 1900 generally includes a shield assembly 1902 extending around a base assembly 1901 which features helical receptacles 1904. Each of the receptacles 1904 includes one or more seed ports 1906. The shield assembly 1902 generally includes one or more shield openings 1908 and associated perches 1910. The shield port openings 1908 are movable between an open position, where the opening 1908 is generally aligned with the seed ports 1906 to provide access to seed 1915, and a closed position (shown in phantom in FIGS. 19A-19B) where the opening 1908 is displaced relative to the feed port 1906 so as to prevent access to seed as will be described in more detail below. The birdfeeder 1900 further includes a top cover 1905 that can be removed to add seed to the receptacles 1904 via a dual funnel 1909.

Figure 19A:
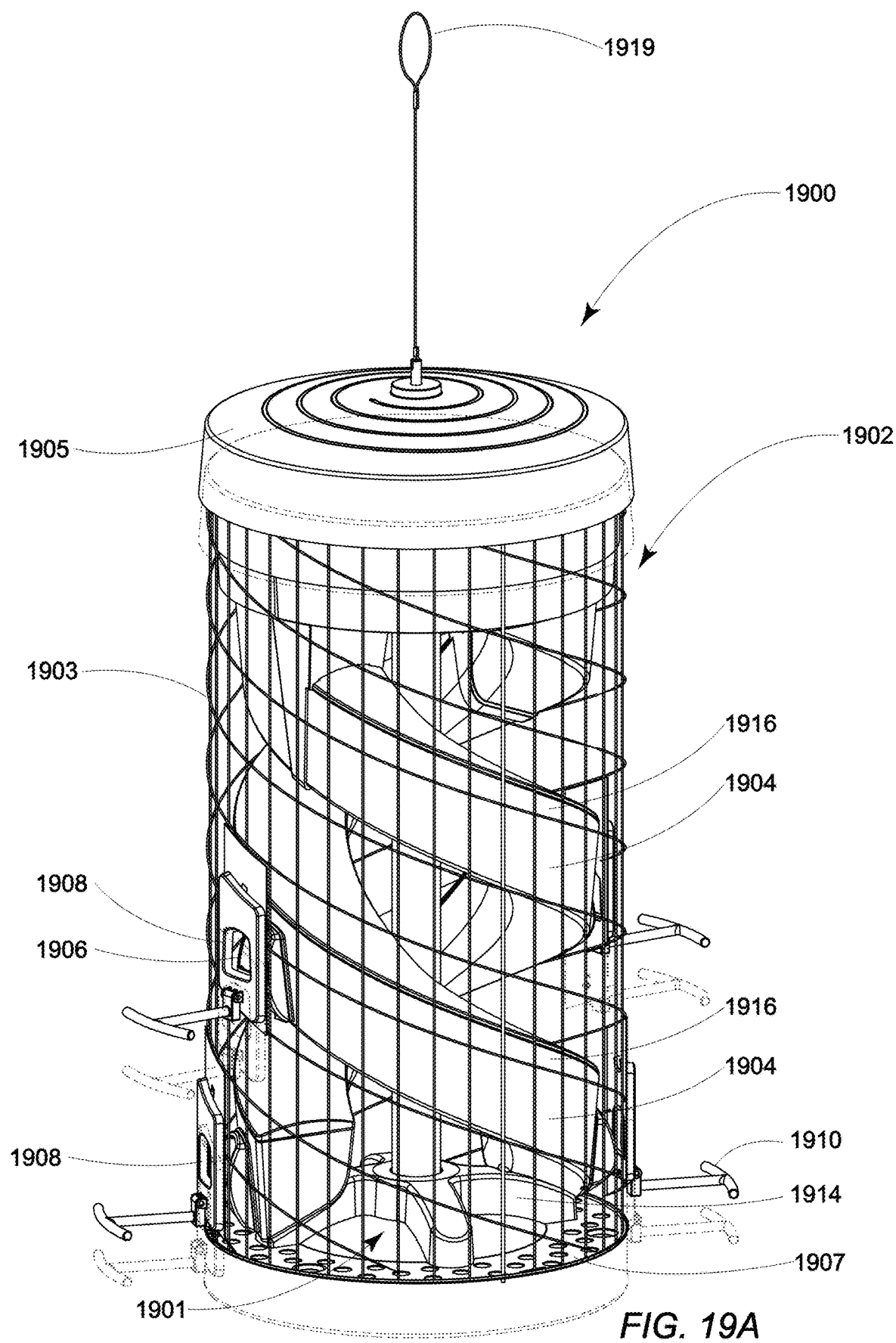
FIGS. 19A-19B show a double helix cage feeder in accordance with the present invention.
Figure 19B:
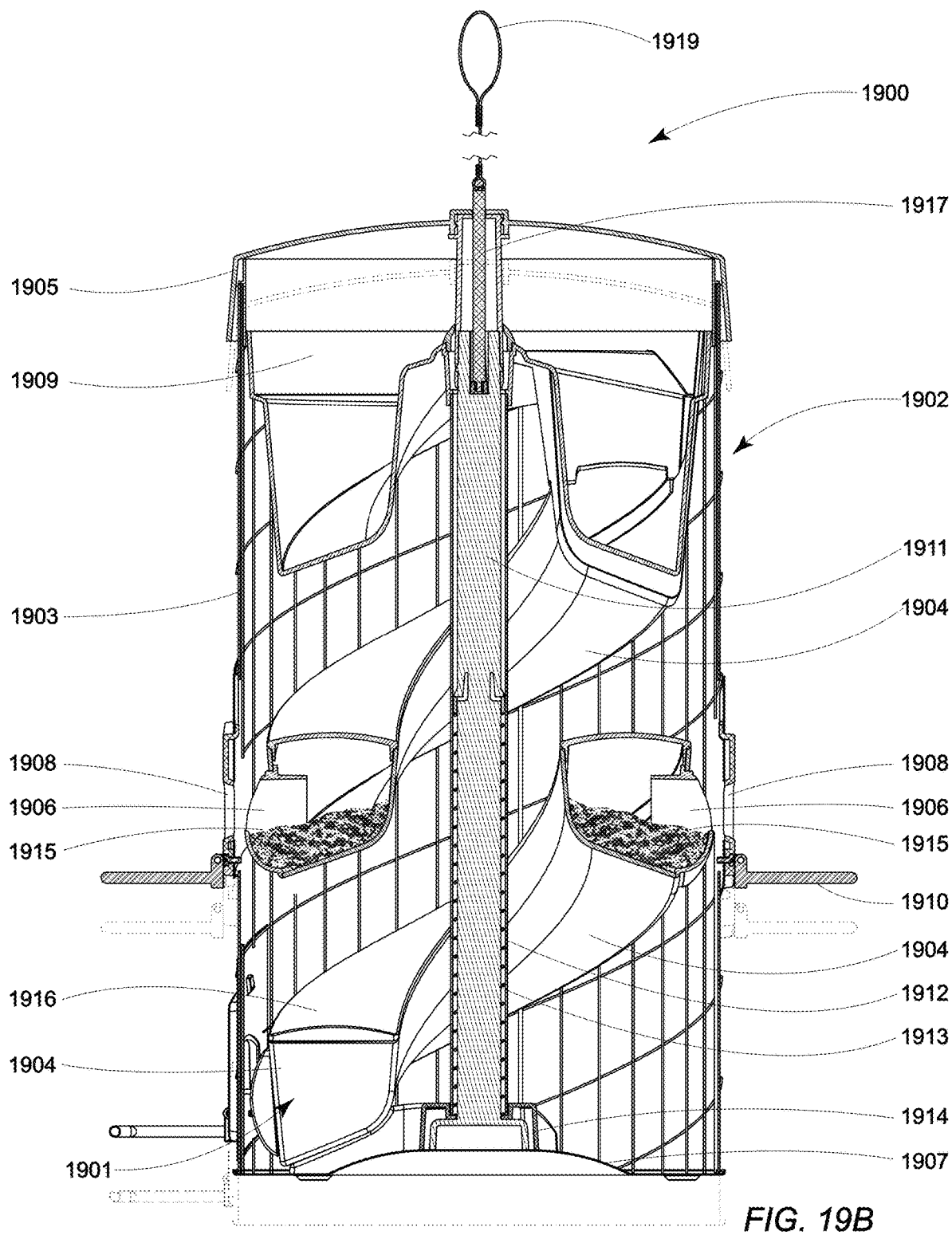

In the embodiment of FIG. 19A-19B, the housing of the shield assembly 1902 is formed as a cage. The cage 1903 can be formed from wires that are resistant to damage from squirrels, for example, steel wires. The wires are welded together to form a cage where the wires are spaced sufficiently closely to prevent squirrels from accessing the receptacles 1904. In the illustrated embodiment, the cage 1903 is formed with vertical and helical wires so as to mimic the helical configuration of the receptacles 1904.

Figure 20A:
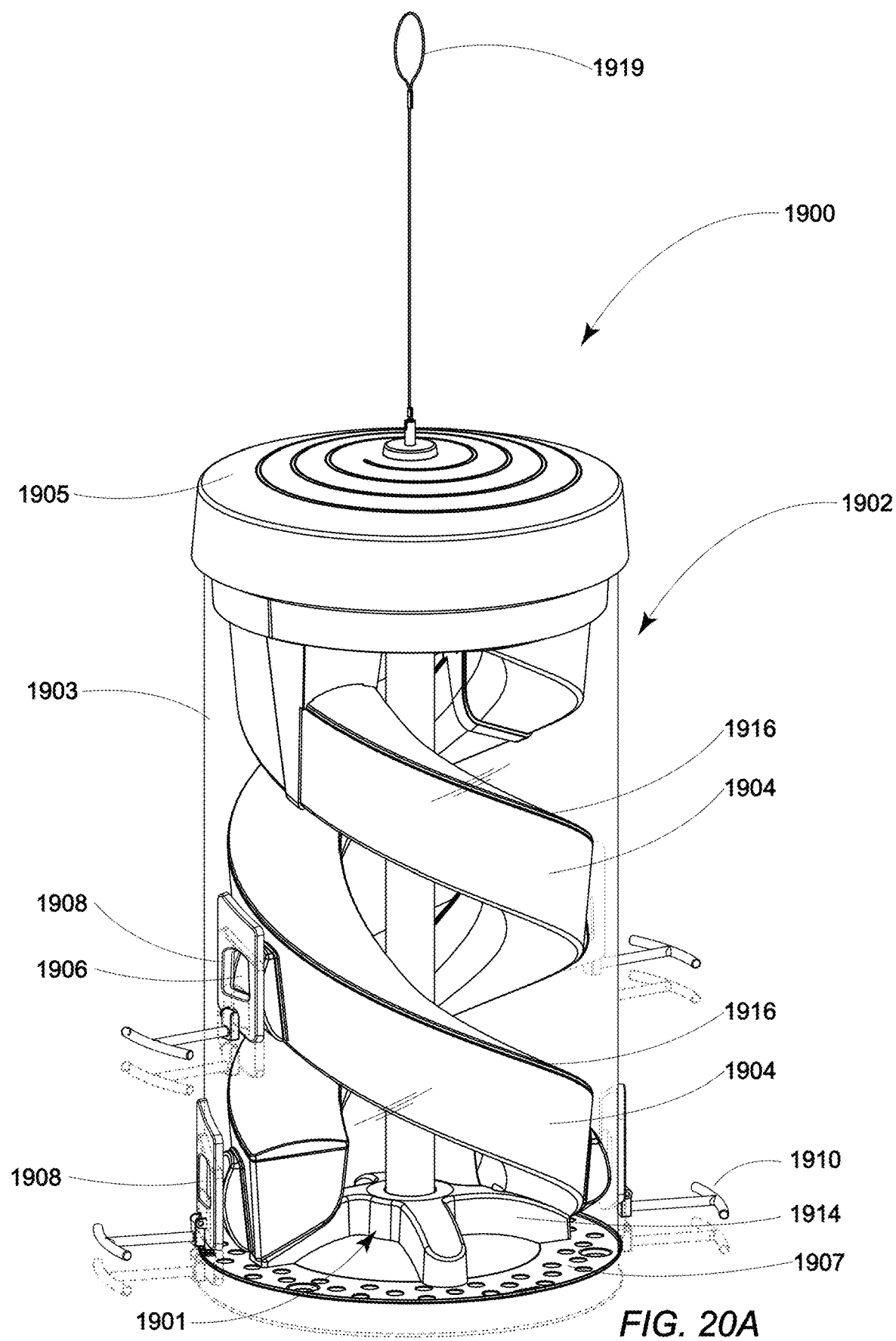
FIGS. 20A-20B show a further double helix feeder in accordance with the present invention.
Figure 20B:
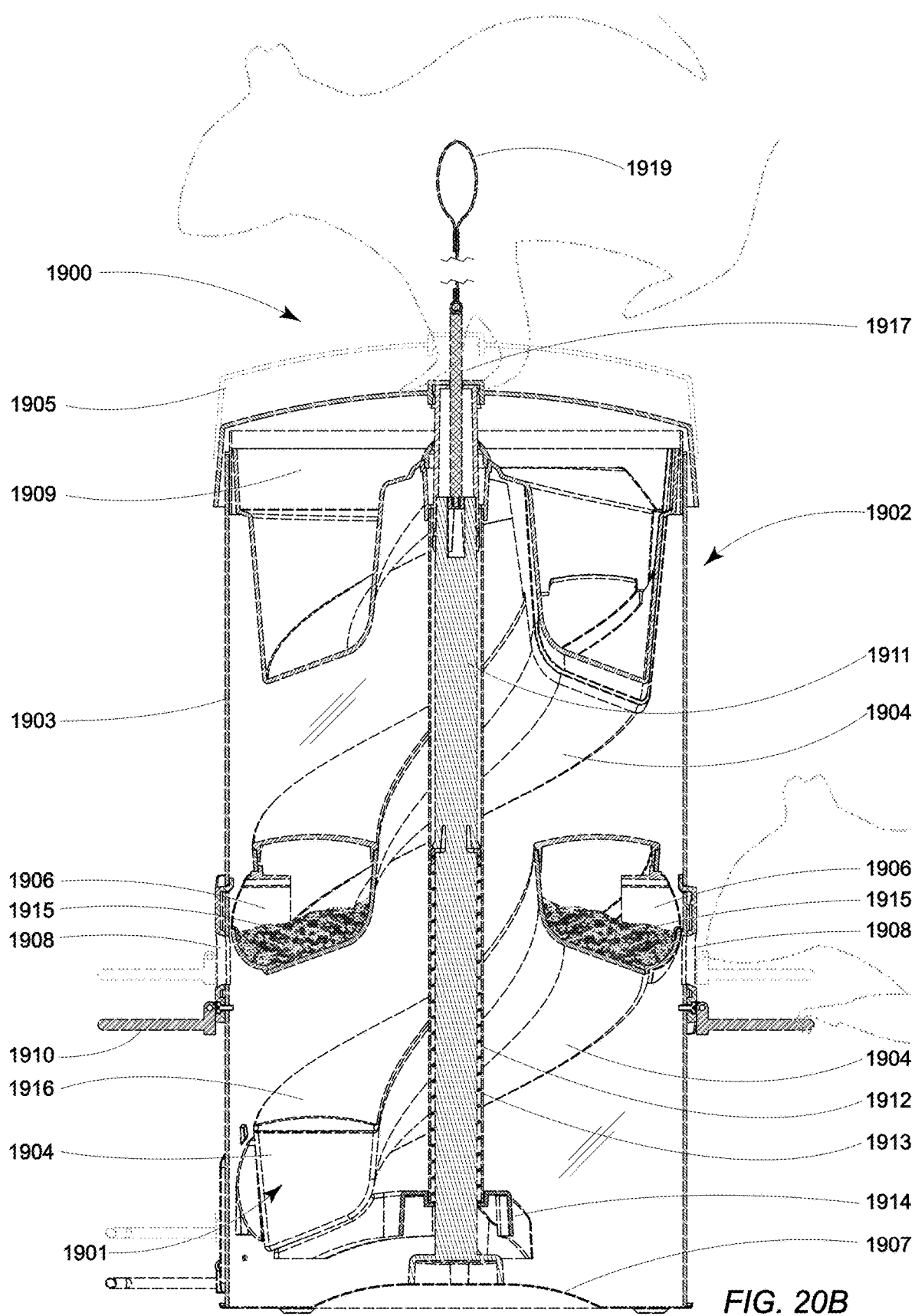

In the embodiment of FIGS. 20A-20B, the housing of the shield assembly 1902 is formed from clear extruded plastic. In this case, the diameter of the cylindrical housing 1903 is sufficiently large so that a squirrel cannot get its teeth around the housing to chew and cause damage.

FIGS. 19B and 20B show additional details of the feeder 1900, including shield assembly 1902. FIG. 19B illustrates the moving shield assembly 1902 in the normal feeding position with the activated or closed position indicated by phantom lines. FIG. 20B illustrates the moving shield assembly 1902 in the activated or closed position due to the weight of a squirrel or unwanted large bird, with the feeding or open position indicated by phantom lines. Specifically, the shield housing 1903, the shield ports forming the openings 1908, the perches 1910, the top cover 1905, and the bottom plate 1907 are interconnected via spring rod 1911 to form the shield assembly 1902 all of which move together. The base 1914, receptacles 1904, receptacle covers 1916, dual funnel 1909, center tube 1912, hanger extension rod 1917, and hanging wire 1919 form the base assembly 1901 which remains stationary in relation to the movable shield assembly 1902. In this regard, the shield assembly 1902 is interconnected to the base assembly 1901 via a resilient element 1913 such as a spring. In this manner, when a squirrel places weight on any part of the shield assembly 1902, as illustrated in FIG. 20B, including the top cover 1905, cage 1903, or perches 1910, the shield assembly 1902 is displaced relative to the receptacles 1904 and, in turn, the openings 1908 are displaced relative to the seed ports 1906 so as to prevent access to seeds.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A birdfeeder, comprising:
    a housing having at least a first receptacle for receiving a flowable bird feed, said receptacle defining a feed flow path from a top portion of said receptacle to a bottom portion thereof;
    a plurality of upwardly extending partitions disposed in said feed flow path of said receptacle so as to define a plurality of feed chambers, each of said partitions extending across a lower portion of said feed flow path, at a location of each respective one of said partitions, and defining an opening such that said partition defines a feed level of an associated feed chamber;
    a plurality of feed ports, each associated with a different one of said feed chambers and being positioned to provide access to said flowable bird feed relative to said feed level of said respective one of said chambers; and
    a fill port, adjacent said top end of said receptacle, for adding said flowable bird feed such that said flowable bird feed is supplied to each of said feed chambers by cascading flow of said flowable bird feed along said flow path across said partitions.

2. The birdfeeder of claim 1, wherein said housing is provided in the form of one of a helix, a staircase, and a pyramid.

3. The birdfeeder of claim 1, wherein said housing includes first and second receptacles provided in the form of a double helix.

4. The birdfeeder of claim 3, further comprising cross members extending between a first helix and a second helix of said double helix.

5. The birdfeeder of claim 1, wherein said housing is provided in the form of one of a cloverleaf and a lozenge.

6. The birdfeeder of claim 1, further comprising a cover, extending across said fill port, to protect said receptacle against the elements.

7. The birdfeeder of claim 6, wherein said cover is hingedly connected to said housing so as to move between an open position for adding said flowable bird feed and a closed position to protect said receptacle against elements.

8. The birdfeeder of claim 1, further comprising at least one support element for supporting said birdfeeder in an upright position so as to facilitate filling with said flowable bird feed.

9. The birdfeeder of claim 8, wherein said support element is movable between a first position for supporting said birdfeeder and a second position wherein said support element is stowed.

10. The birdfeeder of claim 8, wherein said support element is removably attachable to said housing.

11. The birdfeeder of claim 1, wherein said housing includes first and second receptacles defining first and second feed flow paths, and said fill port comprises a central repository for receiving said flowable bird feed and feeding said flowable bird feed to said first and second receptacles.

12. The birdfeeder of claim 1, further comprising a central column support for supporting said housing.

13. The birdfeeder of claim 1, further comprising a squirrel shield assembly for selectively shielding each of said plurality of feed ports from access by squirrels.

14. The birdfeeder of claim 13, wherein said squirrel shield assembly is supported on said housing via a resilient element such that said shield assembly moves from an open configuration to a closed configuration in response to weight placed on one of said squirrel shield and a roost associated with one of said feed ports.

15. The birdfeeder of claim 13, wherein said squirrel shield assembly is formed from metal.

16. The birdfeeder of claim 1, further comprising a roost, associated with one of said feed ports, for supporting a bird.

17. The birdfeeder of claim 16, wherein said roost is movable between a first position for supporting a bird and a second position for stowage.

18. A method for using a birdfeeder, comprising:
    providing a birdfeeder including a housing having at least a first receptacle for receiving
    a flowable bird feed, said receptacle defining a feed flow path from a top portion of said receptacle to a bottom portion thereof, a plurality of upwardly extending partitions disposed in said feed flow path of said receptacle so as to define a plurality of feed chambers, each of said partitions extending across a lower portion of said feed flow path, at a location of each respective one of said partitions, and defining an opening such that said partition defines a feed level of an associated feed chamber, a plurality of feed ports, each associated with a different one of said feed chambers and being positioned to provide access to said flowable bird feed relative to said feed level of said respective one of said chambers, and a fill port, adjacent said top end of said receptacle, for adding said flowable bird feed to said receptacle; adding said flowable bird feed to said receptacle via the fill port such that an uppermost feed chamber of said receptacle is filled with said flowable bird feed to a level of a first opening of a first partition associated with said uppermost feed chamber; and continuing to add said flowable bird feed to said receptacle via said fill port such that said flowable bird feed flows through said first opening of said first partition to a succeeding feed chamber of said receptacle.

19. The method of claim 18, wherein said receptacle comprises at least three feed chambers and said method further comprises adding said flowable bird feed to said receptacle such that each of said feed chambers is filled with said flowable bird feed in a cascading fashion.

\* \* \* \* \*